United States Patent
Hara et al.

(10) Patent No.: US 12,466,958 B2
(45) Date of Patent: Nov. 11, 2025

(54) COLORING COMPOSITION, INK JET RECORDING METHOD, IMAGE RECORDED MATERIAL, AND COLORING AGENT COMPOUND

(71) Applicant: FUJIFILM Corporation, Tokyo (JP)

(72) Inventors: Akihiro Hara, Kanagawa (JP); Daisuke Sasaki, Kanagawa (JP); Hiromichi Numazawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 337 days.

(21) Appl. No.: 18/165,332

(22) Filed: Feb. 7, 2023

(65) Prior Publication Data

US 2023/0183489 A1  Jun. 15, 2023

Related U.S. Application Data

(63) Continuation of application No. PCT/JP2021/022899, filed on Jun. 16, 2021.

(30) Foreign Application Priority Data

Sep. 1, 2020 (JP) ................. 2020-147010

(51) Int. Cl.
| | | |
|---|---|---|
| *C09B 23/08* | (2006.01) | |
| *B41J 2/21* | (2006.01) | |
| *C09D 5/32* | (2006.01) | |
| *C09D 11/02* | (2014.01) | |
| *C09D 11/328* | (2014.01) | |

(52) U.S. Cl.
CPC ............... *C09B 23/083* (2013.01); *B41J 2/21* (2013.01); *C09D 5/32* (2013.01); *C09D 11/328* (2013.01)

(58) Field of Classification Search
CPC ....... C09B 23/083; C09D 5/32; C09D 11/328; B41J 2/21
See application file for complete search history.

(56) References Cited

U.S. PATENT DOCUMENTS

| | | |
|---|---|---|
| 6,611,367 B1 | 8/2003 | Naya et al. |
| 2002/0017636 A1 | 2/2002 | Harada et al. |
| 2002/0046680 A1* | 4/2002 | Noro ............ C09D 11/38 106/31.77 |

FOREIGN PATENT DOCUMENTS

| | | | | |
|---|---|---|---|---|
| EP | 3299422 | | 3/2018 | |
| JP | H-04353840 A | * | 12/1992 | ............ G03C 1/053 |
| JP | 2000141898 | | 5/2000 | |
| JP | 2000292758 | | 10/2000 | |
| JP | 2001348520 | | 12/2001 | |
| JP | 2002090521 | | 3/2002 | |
| JP | 2004067870 | | 3/2004 | |
| SU | 1024862 A | * | 6/1983 | ............ G03C 1/10 |

OTHER PUBLICATIONS

"International Search Report (Form PCT/ISA/210) of PCT/JP2021/022899", mailed on Sep. 21, 2021, with English translation thereof, pp. 1-6.
"Written Opinion of the International Searching Authority (Form PCT/ISA/237) of PCT/JP2021/022899", mailed on Sep. 21, 2021, with English translation thereof, pp. 1-6.
"Search Report of Europe Counterpart Application", issued on Jan. 31, 2024, pp. 1-6.

* cited by examiner

*Primary Examiner* — Bijan Ahvazi
(74) *Attorney, Agent, or Firm* — JCIPRNET

(57) ABSTRACT

Provided is a coloring composition containing a coloring agent compound represented by Formula 1 and a medium.

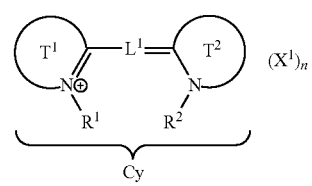

(1)

Description of $T^1$, $T^2$, $R^1$, $R^2$, $X^1$, and n Formula 1 are omitted.

20 Claims, No Drawings

COLORING COMPOSITION, INK JET RECORDING METHOD, IMAGE RECORDED MATERIAL, AND COLORING AGENT COMPOUND

CROSS-REFERENCE TO RELATED APPLICATION

This application is a Continuation of International Application No. PCT/JP2021/022899, filed Jun. 16, 2021, which claims priority to Japanese Patent Application No. 2020-147010 filed Sep. 1, 2020. Each of the above applications is hereby expressly incorporated by reference, in its entirety, into the present application.

BACKGROUND OF THE INVENTION

1. Field of the Invention

The present disclosure relates to a coloring composition, an ink jet recording method, an image recorded material, and a coloring agent compound.

2. Description of the Related Art

In recent years, it has been proposed to develop various applications utilizing characteristics of a near-infrared absorbing dye. For example, the near-infrared absorbing dye has been used for a wide variety of applications of optical films such as an infrared ray cut films or a heat ray shielding film for plasma display panel or CCD (imaging element); photothermal conversion materials for recordable optical disc or flash welding development material; information display materials for security inks or invisible bar code inks; and diagnostic markers and medical materials such as drug for photodynamic therapy. As a characteristic performance of the near-infrared absorbing dye, it is required to have strong absorption to infrared light or in an infrared region while exhibiting as low absorbability to a visible region (invisibility) as possible. In addition, it is also required that the infrared absorbing ability is maintained for a long time.

For example, JP2000-292758A discloses a compound consisting of a cyanine coloring agent moiety having a sulfo group and bipyridine. JP2002-90521A discloses a cyanine dye in which a cyanine coloring agent moiety having a sulfo group and a potassium cation form an intramolecular salt. JP2000-141898A discloses a compound consisting of a cyanine cation and an anion.

SUMMARY OF THE INVENTION

The near-infrared absorbing dye is required to have excellent invisibility and to maintain the infrared absorbing ability for a longer time than in the related art.

The present disclosure has been made in view of such circumstances, and according to an embodiment of the present invention, there are provided a coloring composition that an image recorded material which has excellent invisibility and in which infrared absorbing ability is maintained for a longer time than in the related art is obtained; and an ink jet recording method.

In addition, according to another embodiment of the present invention, there is provided an image recorded material which has excellent invisibility and in which infrared absorbing ability is maintained for a longer time than in the related art.

In addition, according to another embodiment of the present invention, there is provided a novel coloring agent compound that an image recorded material which has excellent invisibility and in which infrared absorbing ability is maintained for a longer time than in the related art can be obtained.

The present disclosure includes the following aspects.

<1> A coloring composition comprising:
a coloring agent compound represented by Formula 1; and
a medium.

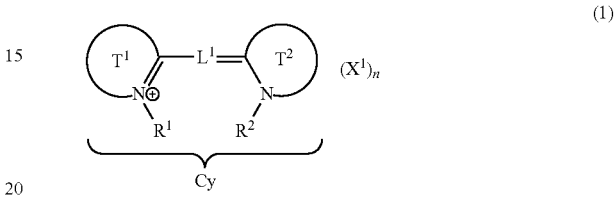

In Formula 1, $L^1$ represents a methine chain consisting of an odd number of methine groups, $R^1$ and $R^2$ each independently represent an aliphatic group or an aromatic group, $T^1$ and $T^2$ each independently represent a non-metal atomic group forming a 5-membered or 6-membered nitrogen-containing heterocyclic ring which may be fused, Cy is an anionic moiety, and $X^1$ represents an organic cation represented by Formula 2-1, Formula 2-2, or Formula 2-3, or an organic cation having a structure represented by Formula 2-4, and n represents a number required to neutralize charge, which is not 0.

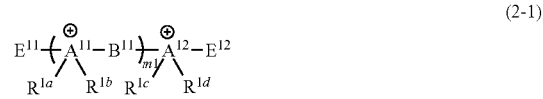

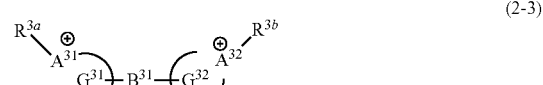

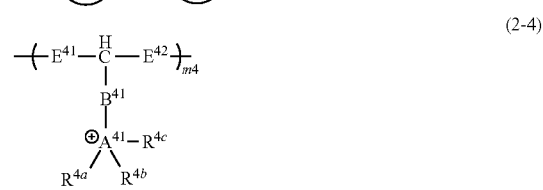

In Formula 2-1, $A^{11}$ and $A^{12}$ each independently represent a nitrogen atom or a phosphorus atom, $B^{11}$'s each independently represent a divalent linking group, $R^{1a}$, $R^{1b}$, $R^{1c}$, $R^{1d}$, $E^{11}$, and $E^{12}$ each independently represent an aliphatic group or an aromatic group, where $R^{1a}$, $R^{1b}$, $R^{1c}$, and $R^{1d}$ may be bonded to each other to form a ring, and m1 is an integer of 1 or more, In Formula 2-2, $A^{21}$, $A^{22}$, and $A^{23}$ each independently represent a nitrogen atom or a phosphorus atom, $B^{21}$ and $B^{22}$ each independently represent a divalent linking group, $R^{2a}$ and $R^{2b}$ each independently represent an aliphatic group or an aromatic group, m2 is an integer of 0 or more, $G^{21}$ represents a non-metal atomic group forming an aromatic ring including $A^{21}$ in the ring, and $G^{22}$ represents a non-metal atomic group forming an aromatic ring including $A^{23}$ in the ring.

In Formula 2-3, $A^{31}$ and $A^{32}$ each independently represent a nitrogen atom or a phosphorus atom, $B^{31}$ represents a divalent linking group, $R^{3a}$ and $R^{3b}$ each independently represent an aliphatic group or an aromatic group, $G^{31}$ represents a non-metal atomic group forming an aromatic ring including $A^{31}$ in a ring, and $G^{32}$ represents a non-metal atomic group forming an aromatic ring including $A^{32}$ in the ring.

In Formula 2-4, $A^{41}$'s each independently represent a nitrogen atom or a phosphorus atom, $B^{41}$'s each independently represent a single bond or a divalent linking group, $R^{4a}$, $R^{4b}$, and $R^{4c}$ each independently represent an aliphatic group or an aromatic group, $E^{41}$ and $E^{42}$ each independently represent a single bond or an aliphatic group, where one of $R^{4a}$, $R^{4b}$, and $R^{4c}$ may be bonded to $E^{41}$ or $E^{42}$ to form a ring, and m4 is an integer of 2 or more.

<2> The coloring composition according to <1>,
in which in Formula 2-1, Formula 2-2, and Formula 2-3, $B^{11}$, $B^{21}$, $B^{22}$, and $B^{31}$ are each independently a divalent linking group having 2 to 8 carbon atoms.

<3> The coloring composition according to <1> or <2>,
in which in Formula 2-1, Formula 2-2, Formula 2-3, and Formula 2-4, $A^{11}$, $A^{12}$, $A^{21}$, $A^{22}$, $A^{23}$, $A^{31}$, $A^{32}$, and $A^{41}$ are nitrogen atoms.

<4> The coloring composition according to any one of <1> to <3>,
in which $X^1$ in Formula 1 represents the organic cation represented by Formula 2-1 or the organic cation having the structure represented by Formula 2-4.

<5> The coloring composition according to any one of <1> to <4>,
in which Cy in Formula 1 is represented by Formula 4,

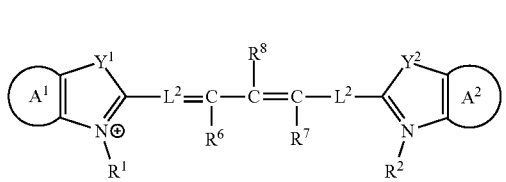

(4)

in Formula 4, $Y^1$ and $Y^2$ each independently represent $CR^3R^4$—, —O—, —S—, —Se—, or —$NR^5$—, where $R^3$, $R^4$, and $R^5$ each independently represent a hydrogen atom, an aliphatic group, or an aromatic ring group and $R^3$ and $R^4$ may be bonded to each other to form a ring, $A^1$ and $A^2$ each independently represent a non-metal atomic group forming an aromatic ring or an aromatic heterocyclic ring, $L^2$'s each independently represent a methine chain consisting of one, two, or three methine groups, where $L^2$ does not have a substituent, $R^6$ and $R^7$ each independently represent a hydrogen atom or an aliphatic group, where $R^6$ and $R^7$ may be linked to each other to form a ring, and $R^8$ is represented by Formula A, —$S^4$-$T^4$     Formula A in Formula A, $S^4$ represents a single bond, an alkylene group, an alkenylene group, an alkynylene group, —O—, —S—, —$NR^{L1}$—, —C(=O)—, —C(=O)O—, —C(=O)$NR^{L1}$—, —S(=O)$_2$—, —$OR^{L2}$—, or a group including a combination of at least two of these groups, where $R^{L1}$'s each independently represent a hydrogen atom, a halogen atom, an alkyl group, an aryl group, or a monovalent heterocyclic group and $R^{L2}$ represents an alkylene group, an arylene group, or a divalent heterocyclic group, and $T^4$ represents a hydrogen atom, a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group.

<6> The coloring composition according to <5>,
in which $A^1$ and $A^2$ in Formula 4 each independently represent a non-metal atomic group forming a benzene ring or a naphthalene ring.

<7> The coloring composition according to any one of <1> to <6>,
in which the medium is a liquid.

<8> The coloring composition according to any one of <1> to <7>,
in which the medium is a liquid comprising water.

<9> The coloring composition according to any one of <1> to <8>,
in which the medium comprises water and an organic solvent having a boiling point of 100° C. or higher.

<10> The coloring composition according to any one of <1> to <9>,
in which the coloring composition is an ink.

<11> The coloring composition according to <10>,
in which the coloring composition is for ink jet recording.

<12> An ink jet recording method comprising:
a step of applying the coloring composition according to <11> onto a substrate.

<13> An image recorded material comprising:
a substrate; and
an infrared absorbing image which is a solidified product of the coloring composition according to <10> or <11> and is disposed on the substrate.

<14> An image recorded material comprising:
a substrate; and
an infrared absorbing image disposed on the substrate,
in which the infrared absorbing image comprises a coloring agent compound represented by Formula 1, and
a maximal absorption wavelength of the infrared absorbing image is in a range of 700 nm to 1,300 nm.

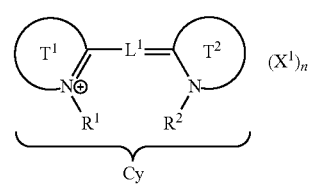

(1)

In Formula 1, $L^1$ represents a methine chain consisting of an odd number of methine groups, $R^1$ and $R^2$ each independently represent an aliphatic group or an aromatic group, $T^1$ and $T^2$ each independently represent a non-metal atomic group forming a 5-membered or 6-membered nitrogen-containing heterocyclic ring which may be fused, Cy is an anionic moiety, and $X^1$ represents an organic cation represented by Formula 2-1, Formula 2-2, or Formula 2-3, or an organic cation having a structure represented by Formula 2-4, and n represents a number required to neutralize charge, which is not 0.

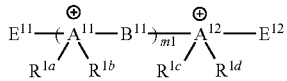
(2-1)

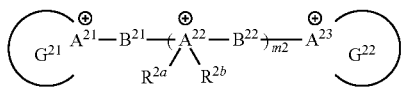
(2-2)

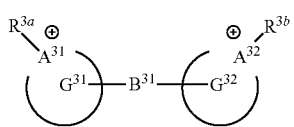
(2-3)

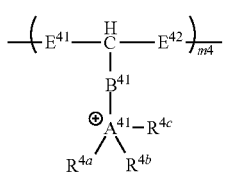
(2-4)

In Formula 2-1, $A^{11}$ and $A^{12}$ each independently represent a nitrogen atom or a phosphorus atom, $B^{11}$'s each independently represent a divalent linking group, $R^{1a}$, $R^{1b}$, $R^{1c}$, $R^{1d}$, $E^{11}$, and $E^{12}$ each independently represent an aliphatic group or an aromatic group, where $R^{1a}$, $R^{1b}$, $R^{1c}$, and $R^{1d}$ may be bonded to each other to form a ring, and m1 is an integer of 1 or more.

In Formula 2-2, $A^{21}$, $A^{22}$, and $A^{23}$ each independently represent a nitrogen atom or a phosphorus atom, $B^{21}$ and $B^{22}$ each independently represent a divalent linking group, $R^{2a}$ and $R^{2b}$ each independently represent an aliphatic group or an aromatic group, m2 is an integer of 0 or more, $G^{21}$ represents a non-metal atomic group forming an aromatic ring including $A^{21}$ in the ring, and $G^{22}$ represents a non-metal atomic group forming an aromatic ring including $A^{23}$ in the ring.

In Formula 2-3, $A^{31}$ and $A^{32}$ each independently represent a nitrogen atom or a phosphorus atom, $B^{31}$ represents a divalent linking group, $R^{3a}$ and $R^{3b}$ each independently represent an aliphatic group or an aromatic group, $G^{31}$ represents a non-metal atomic group forming an aromatic ring including $A^{31}$ in a ring, and $G^{32}$ represents a non-metal atomic group forming an aromatic ring including $A^{32}$ in the ring.

In Formula 2-4, $A^{41}$'s each independently represent a nitrogen atom or a phosphorus atom, $B^{41}$'s each independently represent a single bond or a divalent linking group, $R^{4a}$, $R^{4b}$, and $R^{4c}$ each independently represent an aliphatic group or an aromatic group, $E^{41}$ and $E^{42}$ each independently represent a single bond or an aliphatic group, where one of $R^{4a}$, $R^{4b}$, and $R^{4c}$ may be bonded to $E^{41}$ or $E^{42}$ to form a ring, and m4 is an integer of 2 or more.

<15> A coloring agent compound represented by Formula 1.

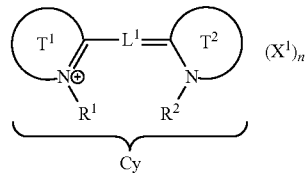
(1)

In Formula 1, $L^1$ represents a methine chain consisting of an odd number of methine groups, $R^1$ and $R^2$ each independently represent an aliphatic group or an aromatic group, $T^1$ and $T^2$ each independently represent a non-metal atomic group forming a 5-membered or 6-membered nitrogen-containing heterocyclic ring which may be fused, Cy is an anionic moiety, and $X^1$ represents an organic cation represented by Formula 2-1, Formula 2-2, or Formula 2-3, or an organic cation having a structure represented by Formula 2-4, and n represents a number required to neutralize charge, which is not 0.

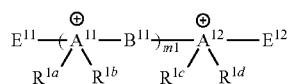
(2-1)

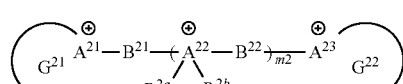
(2-2)

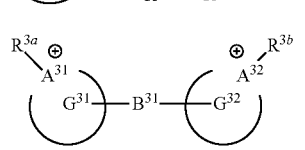
(2-3)

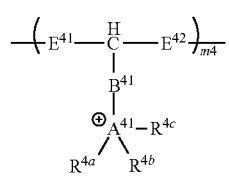
(2-4)

In Formula 2-1, $A^{11}$ and $A^{12}$ each independently represent a nitrogen atom or a phosphorus atom, $B^{11}$'s each independently represent a divalent linking group, $R^{1a}$, $R^{1b}$, $R^{1c}$, $R^{1d}$, $E^{11}$, and $E^{12}$ each independently represent an aliphatic group or an aromatic group, where $R^{1a}$, $R^{1b}$, $R^{1c}$, and $R^{1d}$ may be bonded to each other to form a ring, and m1 is an integer of 1 or more.

In Formula 2-2, $A^{21}$, $A^{22}$, and $A^{23}$ each independently represent a nitrogen atom or a phosphorus atom, $B^{21}$ and $B^{22}$ each independently represent a divalent linking group, $R^{2a}$ and $R^{2b}$ each independently represent an aliphatic group or an aromatic group, m2 is an integer of 0 or more, $G^{21}$ represents a non-metal atomic group forming an aromatic ring including $A^{21}$ in the ring, and $G^{22}$ represents a non-metal atomic group forming an aromatic ring including $A^{23}$ in the ring.

In Formula 2-3, $A^{31}$ and $A^{32}$ each independently represent a nitrogen atom or a phosphorus atom, $B^{31}$ represents a divalent linking group, $R^{3a}$ and $R^{3b}$ each independently represent an aliphatic group or an aromatic group, $G^{31}$ represents a non-metal atomic group forming an aromatic ring including $A^{31}$ in a ring, and $G^{32}$ represents a non-metal atomic group forming an aromatic ring including $A^{32}$ in the ring.

In Formula 2-4, $A^{41}$'s each independently represent a nitrogen atom or a phosphorus atom, $B^{41}$'s each independently represent a single bond or a divalent linking group, $R^{4a}$, $R^{4b}$, and $R^{4c}$ each independently represent an aliphatic group or an aromatic group, $E^{41}$ and $E^{42}$ each independently represent a single bond or an aliphatic group, where one of $R^{4a}$, $R^{4b}$, and $R^{4c}$ may be bonded to $E^{41}$ or $E^{42}$ to form a ring, and m4 is an integer of 2 or more.

<16> The coloring agent compound according to <15>, in which in Formula 2-1, Formula 2-2, and Formula 2-3, $B^{11}$, $B^{21}$, $B^{22}$, and $B^{31}$ are each independently a divalent linking group having 2 to 8 carbon atoms.

<17> The coloring agent compound according to <15> or <16>,
in which in Formula 2-1, Formula 2-2, Formula 2-3, and Formula 2-4, $A^{11}, A^{12}, A^{21}, A^{22}, A^{23}, A^{31}, A^{32}$, and $A^{41}$ are nitrogen atoms.

<18> The coloring agent compound according to any one of <15> to <17>,
in which $X^1$ in Formula 1 represents the organic cation represented by Formula 2-1 or the organic cation having the structure represented by Formula 2-4.

<19> The coloring agent compound according to any one of <15> to <18>,
in which Cy in Formula 1 is represented by Formula 4.

(4)

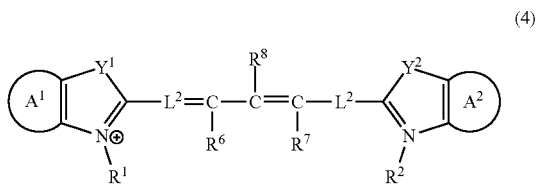

In Formula 4, $Y^1$ and $Y^2$ each independently represent $CR^3R^4$—, —O—, —S—, —Se—, or —$NR^5$—, where $R^3$, $R^4$, and $R^5$ each independently represent a hydrogen atom, an aliphatic group, or an aromatic ring group and $R^3$ and $R^4$ may be bonded to each other to form a ring, $A^1$ and $A^2$ each independently represent a non-metal atomic group forming an aromatic ring or an aromatic heterocyclic ring, $L^2$'s each independently represent a methine chain consisting of one, two, or three methine groups, where $L^2$ does not have a substituent, $R^6$ and $R^7$ each independently represent a hydrogen atom or an aliphatic group, where $R^6$ and $R^7$ may be linked to each other to form a ring, and $R^8$ is represented by Formula A, —$S^A$-$T^A$  Formula A in Formula A, $S^A$ represents a single bond, an alkylene group, an alkenylene group, an alkynylene group, —O—, —S—, —$NR^{L1}$—, —C(=O)—, —C(=O)O—, —C(=O)$NR^{L1}$—, —S(=O)$_2$—, —$OR^{L2}$—, or a group including a combination of at least two of these groups, where $R^{L1}$'s each independently represent a hydrogen atom, a halogen atom, an alkyl group, an aryl group, or a monovalent heterocyclic group and $R^{L2}$ represents an alkylene group, an arylene group, or a divalent heterocyclic group, and $T^A$ represents a hydrogen atom, a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group.

<20> The coloring agent compound according to <19>, in which $A^1$ and $A^2$ in Formula 4 each independently represent a non-metal atomic group forming a benzene ring or a naphthalene ring.

According to the present disclosure, there are provided a coloring composition that an image recorded material which has excellent invisibility and in which infrared absorbing ability is maintained for a longer time than in the related art is obtained; and an ink jet recording method.

In addition, according to the present disclosure, there is provided an image recorded material which has excellent invisibility and in which infrared absorbing ability is maintained for a longer time than in the related art.

In addition, according to the present disclosure, there is provided a novel coloring agent compound that an image recorded material which has excellent invisibility and in which infrared absorbing ability is maintained for a longer time than in the related art can be obtained.

DESCRIPTION OF THE PREFERRED EMBODIMENTS

Hereinafter, the coloring composition, ink jet recording method, image recorded material, and coloring agent compound according to the embodiments of the present disclosure will be described in detail.

In the present specification, the numerical ranges shown using "to" means ranges including the numerical values described before and after "to" as the minimum value and the maximum value.

In a numerical range described in a stepwise manner in the present specification, an upper limit value or a lower limit value described in a certain numerical range may be replaced with an upper limit value or a lower limit value in another numerical range described in a stepwise manner. In addition, in the numerical range described in the present specification, an upper limit value and a lower limit value described in a certain numerical range may be replaced with values shown in Examples.

In the present specification, in a case where a plurality of substances corresponding to each component in a composition is present, the amount of each component in the composition means the total amount of the plurality of substances present in the composition, unless otherwise specified.

In the present specification, a combination of two or more preferred aspects is a more preferred aspect.

In the present specification, the meaning of the term "step" includes not only an independent step but also a step whose intended purpose is achieved even in a case where the step is not clearly distinguished from other steps.

In the present specification, "(meth)acrylate" is a concept including both acrylate and methacrylate. In addition, "(meth)acryl" is a concept that includes both acryl and methacryl.

In the present specification, a monovalent heterocyclic group refers to a group obtained by removing one hydrogen atom from a heterocyclic compound, and a divalent heterocyclic group refers to a group obtained by removing two hydrogen atoms from a heterocyclic compound.

[Coloring Agent Compound]

The coloring agent compound according to the embodiment of the present disclosure is represented by Formula 1.

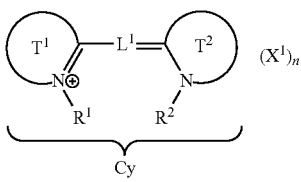

(1)

In Formula 1, $L^1$ represents a methine chain consisting of an odd number of methine groups. $R^1$ and $R^2$ each independently represent an aliphatic group or an aromatic group. $T^1$ and $T^2$ each independently represent a non-metal atomic group forming a 5-membered or 6-membered nitrogen-containing heterocyclic ring which may be fused. Cy is an anionic moiety, and $X^1$ represents an organic cation represented by Formula 2-1, Formula 2-2, or Formula 2-3, or an organic cation having a structure represented by Formula 2-4. n represents a number required to neutralize charge, which is not 0.

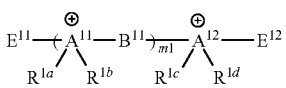

(2-1)

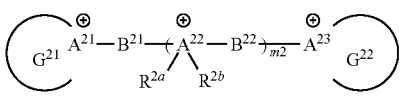

(2-2)

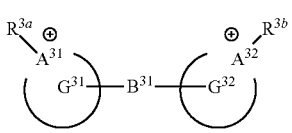

(2-3)

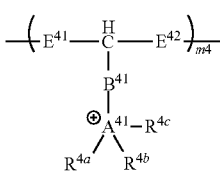

(2-4)

In Formula 2-1, $A^{11}$ and $A^{12}$ each independently represent a nitrogen atom or a phosphorus atom. $B^{11}$'s each independently represent a divalent linking group. $R^{1a}$, $R^{1b}$, $R^{1c}$, $R^{1d}$, $E^{11}$, and $E^{12}$ each independently represent an aliphatic group or an aromatic group. $R^{1a}$, $R^{1b}$, $R^{1c}$, and $R^{1d}$ may be bonded to each other to form a ring. m1 is an integer of 1 or more.

In Formula 2-2, $A^{21}$, $A^{22}$, and $A^{23}$ each independently represent a nitrogen atom or a phosphorus atom. $B^{21}$ and $B^{22}$ each independently represent a divalent linking group. $R^{2a}$ and $R^{2b}$ each independently represent an aliphatic group or an aromatic group. m2 is an integer of 0 or more. $G^{21}$ represents a non-metal atomic group forming an aromatic ring including $A^{21}$ in the ring. $G^{22}$ represents a non-metal atomic group forming an aromatic ring including $A^{23}$ in the ring.

In Formula 2-3, $A^{31}$ and $A^{32}$ each independently represent a nitrogen atom or a phosphorus atom. $B^{31}$ represents a divalent linking group. $R^{3a}$ and $R^{3b}$ each independently represent an aliphatic group or an aromatic group. $G^{31}$ represents a non-metal atomic group forming an aromatic ring including $A^{31}$ in a ring. $G^{32}$ represents a non-metal atomic group forming an aromatic ring including $A^{32}$ in the ring.

In Formula 2-4, $A^{41}$'s each independently represent a nitrogen atom or a phosphorus atom. $B^{41}$'s each independently represent a single bond or a divalent linking group. $R^{4a}$, $R^{4b}$, and $R^{4c}$ each independently represent an aliphatic group or an aromatic group. $E^{41}$ and $E^{42}$ each independently represent a single bond or an aliphatic group. One of $R^{4a}$, $R^{4b}$, and $R^{4c}$ may be bonded to $E^{41}$ or $E^{42}$ to form a ring. m4 is an integer of 2 or more.

The coloring agent compound represented by Formula 1 is excellent in infrared absorbing ability, and is excellent invisibility due to small absorption in the visible region. In addition, the coloring agent compound represented by Formula 1 can maintain the infrared absorbing ability for a longer time than in the related art.

The cyanine coloring agent tend to form an associate. In a case where the cyanine coloring agent forms an associate, since the cyanine coloring agent absorbs light having a long wavelength, the cyanine coloring agent has excellent invisibility and durability such as light resistance and moist heat resistance. The coloring agent compound represented by Formula 1 has the cyanine coloring agent structure, and the organic cation represented by Formula 2-1, Formula 2-2, or Formula 2-3, the organic cation having a structure represented by Formula 2-4. Since these organic cations have a flexible molecular structure, it is presumed that these organic cations have a high effect of binding the cyanine coloring agents to each other at a position where the associate can be appropriately formed. As a result, it is considered that the cyanine coloring agent using the organic cation, according to the present application, has an improved association-forming ability in the coloring composition, and can maintain the infrared absorbing ability for a longer time that in the related art.

In the related art, a coloring agent compound in which a cyanine coloring agent structure as a cationic moiety and a counter anion form a salt; and a coloring agent compound in which a cyanine coloring agent structure as an anionic moiety and a metal cation form a salt have been known (for example, JP2002-90521A and JP2000-141898A). However, with these coloring agent compounds, the associate is less likely to be formed in the coloring composition, and maintenance of the infrared absorbing ability cannot be expected.

In addition, JP2000-292758A discloses a coloring agent compound in which a cyanine coloring agent structure as an anionic moiety and an organic cation having a bipyridine skeleton form a salt. However, since the bipyridine skeleton has a rigid molecular structure, it is presumed that the effect of binding the cyanine coloring agents to each other at a position where the associate can be appropriately formed is low. As a result, with the cyanine coloring agent using the organic cation having a bipyridine skeleton, the associate is less likely to be formed in the coloring composition, and maintenance of the infrared absorbing ability cannot be expected.

Hereinafter, the coloring agent compound represented by Formula 1 will be specifically described.

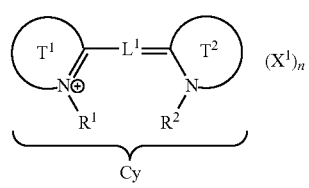

(1)

In Formula 1, $L^1$ represents a methine chain consisting of an odd number of methine groups. $R^1$ and $R^2$ each independently represent an aliphatic group or an aromatic group. $T^1$ and $T^2$ each independently represent a non-metal atomic group forming a 5-membered or 6-membered nitrogen-containing heterocyclic ring which may be fused. Cy is an anionic moiety, and $X^1$ represents an organic cation represented by Formula 2-1, Formula 2-2, or Formula 2-3, or an organic cation having a structure represented by Formula 2-4. n represents a number required to neutralize charge, which is not 0.

In Formula (1), $L^1$ represents a methine chain consisting of an odd number of methine groups. $L^1$ preferably represents a methine chain consisting of 5, 7, or 9 methine groups, and more preferably represents a methine chain consisting of 5 or 7 methine groups.

A methine group at the center of the methine chain preferably has a substituent represented by Formula A. $S^A$ and $T^A$ in Formula A will be described later.

$$*-S^A\text{-}T^A \qquad \text{Formula A}$$

Methine groups other than the methine group at the center of the methine chain may have a substituent, but it is preferable that the methine group do not have a substituent.

The methine chain may have a crosslinking structure at any position. For example, in the methine chain, carbon atoms constituting the methine chain may be bonded to each other to form a ring structure. The ring structure is not particularly limited, but an aliphatic ring is preferable and a 5-membered aliphatic ring or a 6-membered aliphatic ring is more preferable.

Specifically, $L^1$ is preferably a group represented by Formula L1-1, L1-2, L2-1, or L2-2, and more preferably a group represented by Formula L1-2 or Formula L2-2.

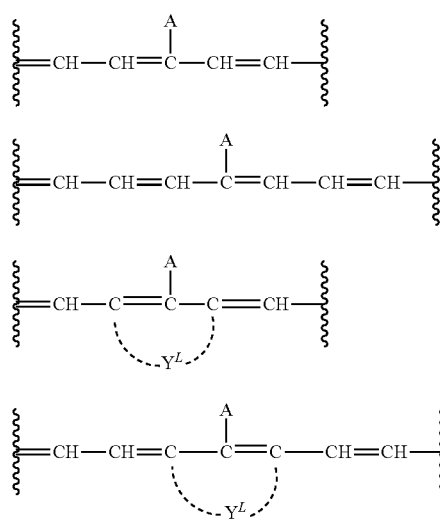

In Formulae L1-1, L1-2, L2-1, and L2-2, A represents the substituent represented by Formula A, and wave line portions each independently represent a bonding position with a structure other than $L^1$ in Formula 1.

In Formulae L2-1 and L2-2, $Y^L$ represents a non-metal atomic group forming an aliphatic ring or a heterocycle, and preferably represents a non-metal atomic group forming an aliphatic ring. $Y^L$ is preferably an alkylene group, and examples of the alkylene group include $-CH_2CH_2-$ and $-CH_2C(Z)_2-CH_2-$. The aliphatic ring is preferably a 5-membered aliphatic ring or a 6-membered aliphatic ring. Z's each independently represent a hydrogen atom or an alkyl group. Z is preferably a hydrogen atom or an alkyl group having 1 to 8 carbon atoms, and more preferably a hydrogen atom or a methyl group. Two Z's may be bonded to each other to form a ring structure.

The group represented by Formula L2-1 or L2-2 is preferably a group represented by Formula L3-1, L3-2, L3-3, or L3-4.

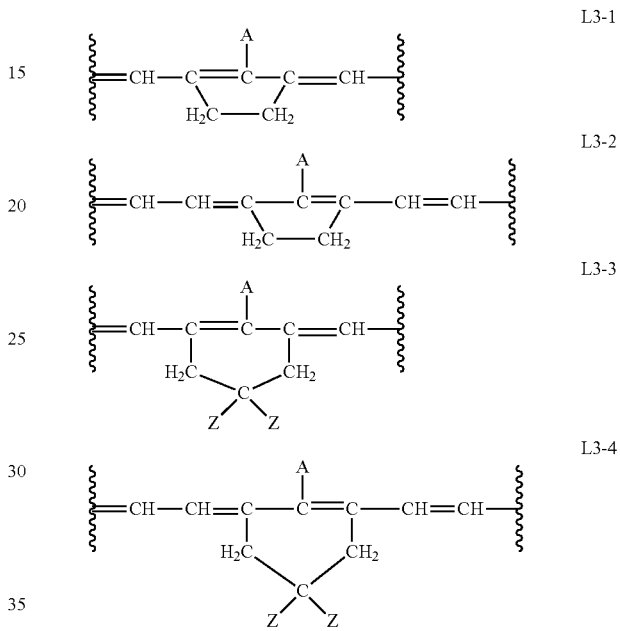

In Formulae L3-3 and L3-4, Z's each independently represent a hydrogen atom or an alkyl group. Z is preferably a hydrogen atom or an alkyl group having 1 to 8 carbon atoms, and more preferably a hydrogen atom or a methyl group. Two Z's may be bonded to each other to form a ring structure.

In Formulae L3-1 to L3-4, A represents the substituent represented by Formula A, and wave line portions each independently represent a bonding position with a structure other than $L^1$ in Formula 1.

In Formula A, $S^A$ represents a single bond, an alkylene group, an alkenylene group, an alkynylene group, $-O-$, $-S-$, $-NR^{L1}-$, $-C(=O)-$, $-C(=O)O-$, $-C(=O)NR^{L1}-$, $-S(=O)_2-$, $-OR^{L2}-$, or a group including a combination of at least two thereof. From the viewpoint of invisibility, $S^A$ is preferably a single bond, an alkylene group, an alkenylene group, or an alkynylene group, and more preferably a single bond.

The alkylene group is preferably an alkylene group having 1 to 10 carbon atoms, more preferably an alkylene group having 1 to 4 carbon atoms, and still more preferably a methylene group or an ethylene group.

The alkenylene group is preferably an alkenylene group having 2 to 10 carbon atoms, more preferably an alkenylene group having 2 to 4 carbon atoms, and still more preferably an alkenylene group having 2 or 3 carbon atoms.

The alkynylene group is preferably an alkynylene group having 2 to 10 carbon atoms, more preferably an alkynylene group having 2 to 4 carbon atoms, and still more preferably an alkynylene group having 2 or 3 carbon atoms.

The alkylene group, the alkenylene group, and the alkynylene group may be linear or branched, and some or all of the carbon atoms included in each of the groups may form a cyclic structure.

Hereinafter, unless specified otherwise, the above-described contents are adopted to the description of the alkylene group, the alkenylene group, and the alkynylene group in the present disclosure.

In —C(=O)O—, the carbon atom may be bonded to $L^1$ and the oxygen atom may be bonded to $T^4$, or the oxygen atom may be bonded to $L^1$ and the carbon atom may be bonded to $T^4$.

In —C(=O)NR$^{L1}$—, the carbon atom may be bonded to $L^1$ and the nitrogen atom may be bonded to $T^4$, or the nitrogen atom may be bonded to $L^1$ and the carbon atom may be bonded to $T^4$.

In Formula A, in a case where $S^A$ is —NR$^{L1}$— or —C(=O)NR$^{L1}$—, R$^{L1}$ represents a hydrogen atom, a halogen atom, an alkyl group, an aryl group, or a monovalent heterocyclic group, preferably a hydrogen atom, an alkyl group, or an aryl group and more preferably a hydrogen atom.

Examples of the halogen atom include a fluorine atom (F atom), a chlorine atom (Cl atom), a bromine atom (Br atom), and an iodine atom (I atom). Among these, the halogen atom is preferably a Cl atom or a Br atom, and more preferably a Cl atom.

The alkyl group is preferably an alkyl group having 1 to 10 carbon atoms, more preferably an alkyl group having 1 to 4 carbon atoms, still more preferably an alkyl group having 1 or 2 carbon atoms.

The aryl group is preferably an aryl group having 6 to 20 carbon atoms, and more preferably a phenyl group or a naphthyl group.

A heterocycle in the monovalent heterocyclic group is preferably a 5-membered ring or a 6-membered ring. In addition, the heterocycle may form a fused ring with an aliphatic ring, an aromatic ring, or another heterocycle. Examples of a heteroatom in the heterocycle include an N atom, an O atom, and an S atom, and an N atom is preferable.

Examples of the heterocycle include a pyridine ring, a piperidine ring, a furan ring, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a pyrrolidone ring, a thiazole ring, a pyrazine ring, a thiadiazine ring, a benzoquinoline ring, and a thiadiazole ring.

In Formula A, in a case where $S^A$ is —OR$^{L2}$—, R$^{L2}$ represents an alkylene group, an arylene group, or a divalent heterocyclic group, preferably an alkylene group.

The alkylene group is preferably an alkylene group having 1 to 10 carbon atoms, more preferably an alkylene group having 1 to 4 carbon atoms, still more preferably an alkylene group having 1 or 2 carbon atoms.

The arylene group is preferably an arylene group having 6 to 20 carbon atoms, more preferably a phenylene group or a naphthylene group, and still more preferably a phenylene group.

The divalent heterocyclic group preferably has a structure in which one hydrogen is removed from the monovalent heterocyclic group in R$^{L1}$.

In Formula A, $T^4$ represents a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group. Among these, $T^4$ is preferably an aryl group, a monovalent heterocyclic group, or a trialkylsilyl group.

Examples of the halogen atom include a fluorine atom (F atom), a chlorine atom (Cl atom), a bromine atom (Br atom), and an iodine atom (I atom). Among these, the halogen atom is preferably a Cl atom or a Br atom, and more preferably a Cl atom.

The alkyl group is preferably an alkyl group having 1 to 10 carbon atoms, more preferably an alkyl group having 1 to 4 carbon atoms, still more preferably an alkyl group having 1 or 2 carbon atoms.

In Formula A, in a case where $T^4$ represents an alkyl group, $T^4$ may form a ring structure with another carbon atom in the methine chain. The ring structure is preferably a 5-membered ring or a 6-membered ring.

The aryl group is preferably an aryl group having 6 to 20 carbon atoms, more preferably a phenyl group or a naphthyl group, and still more preferably a phenyl group.

A heterocycle in the monovalent heterocyclic group is preferably a 5-membered ring or a 6-membered ring. In addition, the heterocycle may form a fused ring with an aliphatic ring, an aromatic ring, or another heterocycle.

Examples of a heteroatom in the heterocycle include an N atom, an O atom, and an S atom, and an N atom is preferable.

Examples of the heterocycle include a pyridine ring, a triazine ring, a piperidine ring, a furan ring, a furfuran ring, a Meldrum's acid ring, a barbituric acid ring, a succinimide ring, a thiophene ring, a pyrrole ring, a quinoline ring, a morpholine ring, a thiomorpholine ring, an indole ring, an imidazole ring, a pyrazole ring, a carbazole ring, a phenothiazine ring, a phenoxazine ring, an indoline ring, a pyrrolidone ring, a thiazole ring, a pyrazine ring, a thiadiazine ring, a benzoquinoline ring, and a thiadiazole ring.

The heterocycle may form a salt structure. For example, the pyridine ring may form a pyridinium salt, or may be present as a pyridinium ion.

The aryl group and the monovalent heterocyclic group may have a substituent. Examples of the substituent include an alkyl group, an alkoxy group, a halogen atom, an alkenyl group, an alkynyl group, an aryl group, a monovalent heterocyclic group, a nitro group, a cyano group, —OR$^T$, —C(=O)R$^T$, —C(=O)OR$^T$, —OC(=O)R$^T$, —N(R$^T$)$_2$, —NHC(=O)R$^T$, —C(=O)N(R$^T$)$_2$, —NHC(=O)OR$^T$, —OC(=O)N(R$^T$)$_2$, —NHC(=O)N(R$^T$)$_2$, —SR$^T$, —S(=O)$_2$R$^T$, —S(=O)$_2$OR$^T$, —NHS(=O)$_2$R$^T$, and —S(=O)$_2$N(R$^T$)$_2$.

R$^T$'s each independently represent a hydrogen atom, an alkyl group, an aryl group, or a monovalent heterocyclic group, and a hydrogen atom, an alkyl group, or an aryl group is preferable.

The alkyl group in R$^T$ is preferably an alkyl group having 1 to 12 carbon atoms, more preferably an alkyl group having 1 to 6 carbon atoms, still more preferably a methyl group or an ethyl group.

The aryl group in R$^T$ is preferably an aryl group having 6 to 20 carbon atoms, more preferably a phenyl group or a naphthyl group, and still more preferably a phenyl group.

A heterocycle in the monovalent heterocyclic group in R$^T$ is preferably a 5-membered ring or a 6-membered ring. In addition, the heterocycle may form a fused ring with an aliphatic ring, an aromatic ring, or another heterocycle.

Examples of a heteroatom in the heterocycle include an N atom, an O atom, and an S atom, and an N atom is preferable.

Examples of the heterocycle include a pyridine ring, a piperidine ring, a piperazine ring, a pyrrolidine ring, a furan ring, a tetrahydrofuran ring, a tetrahydropyran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a pyrrolidone ring, a thiazole ring, a pyrazine ring, a thiadiazine ring, a benzoquinoline ring, and a thiadiazole ring.

The monovalent heterocyclic group in $R^T$ may further have a substituent. Examples of the substituent include the groups represented by $R^T$, and a preferred aspect thereof is also the same.

Examples of the amino group include an unsubstituted amino group and a substituted amino group, and a diarylamino group or a diheteroarylamino group is preferable.

Examples of a substituent in the substituted amino group include an alkyl group, an aryl group, and a monovalent heterocyclic group. The alkyl group, the aryl group, or the monovalent heterocyclic group in the substituted amino group has the same meaning as the alkyl group, the aryl group, or the monovalent heterocyclic group represented by $T^A$, and preferred aspects thereof are also the same.

The trialkylsilyl group is preferably a trialkylsilyl group in which the number of carbon atoms in the alkyl group is 1 to 10, and more preferably a trialkylsilyl group in which the number of carbon atoms in the alkyl group is 1 to 4. Examples of the trialkylsilyl group include a trimethylsilyl group, a dimethylbutylsilyl group, a triethylsilyl group, and a triisopropylsilyl group.

The trialkoxysilyl group is preferably a trialkoxysilyl group in which the number of carbon atoms in the alkoxy group is 1 to 10, and more preferably a trialkoxysilyl group in which the number of carbon atoms in the alkoxy group is 1 to 4. Examples of the trialkoxysilyl group include a trimethoxysilyl group and a triethoxysilyl group.

In a case where $S^A$ represents a single bond or an alkylene group and $T^A$ represents an alkyl group, from the viewpoint of invisibility, the total number of carbon atoms included in $S^A$ and $T^A$ is preferably 3 or more, more preferably 4 or more, and still more preferably 5 or more.

In addition, from the viewpoint of dispersibility, the total number of carbon atoms is preferably 20 or less and more preferably 10 or less. Among these, from the viewpoint of dispersibility, it is preferable that, $T^A$ in Formula A is a heterocyclic group including a nitrogen atom, an aryl group, or a halogen atom.

Specific examples of the substituent (substituent A) represented by Formula A include the following substituents A-1 to A-55. However, the substituent A in the present disclosure is not limited thereto. In the following substituents A-1 to A-55, i-$C_{10}$ represents an isodecyl group, i-$C_8$ represents an isooctyl group, and * represents a bonding site with $L^1$ in Formula 1.

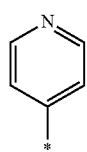

A-1

-continued

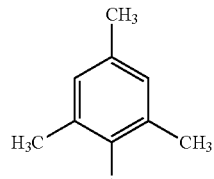

A-2

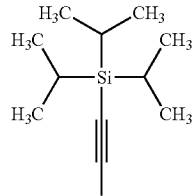

A-3

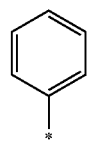

A-4

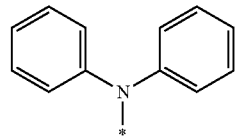

A-5

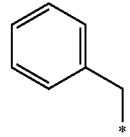

A-6

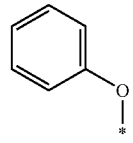

A-7

A-8

A-9

A-10

A-11

A-12

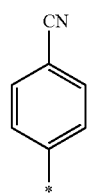

A-13

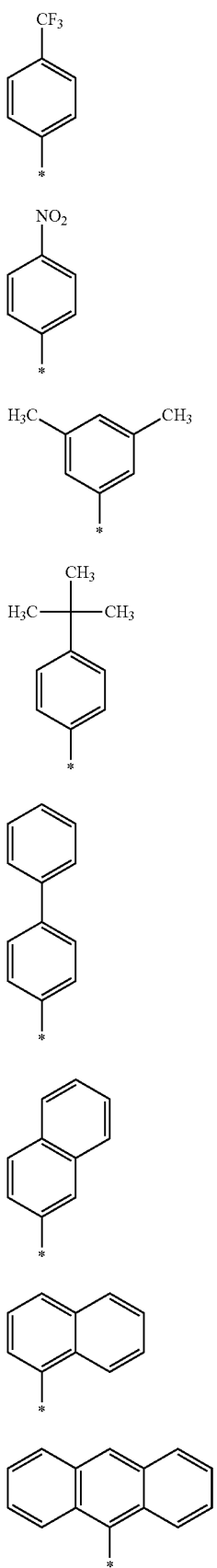
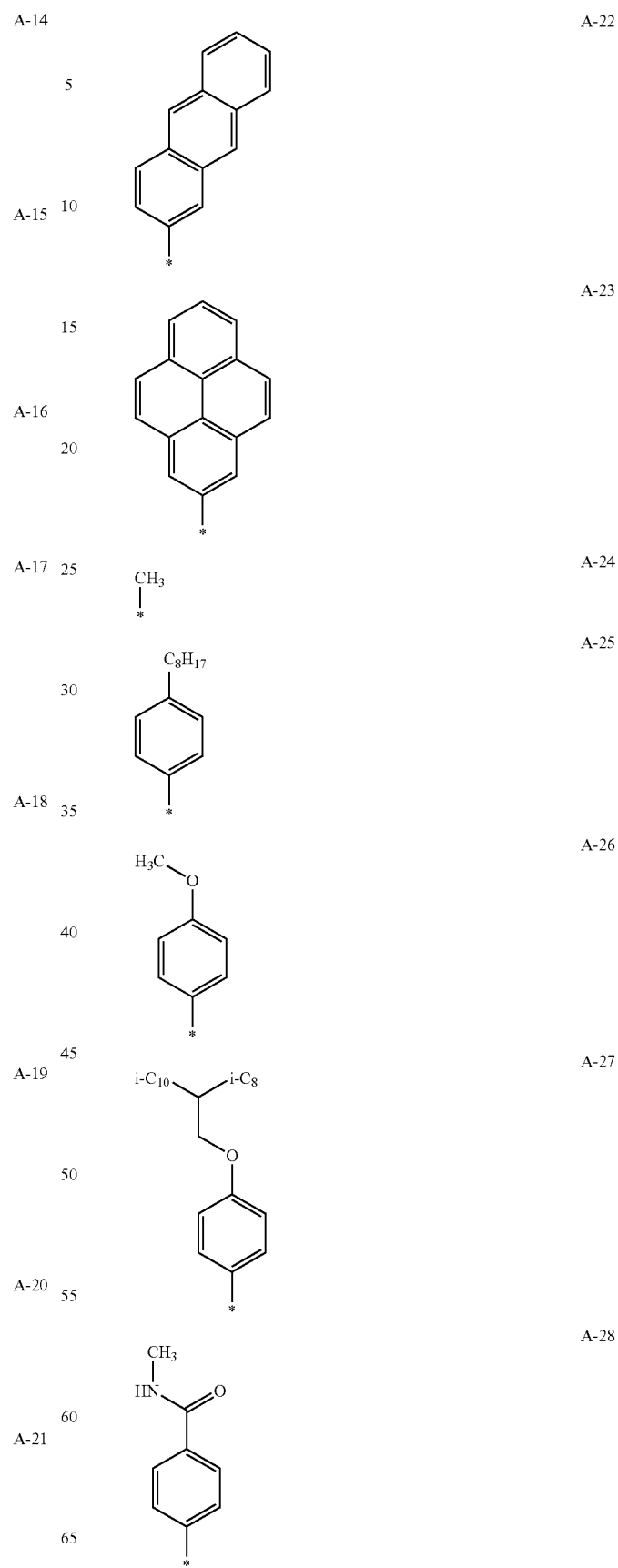

-continued
A-20 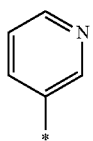
A-21 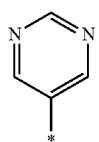
A-22 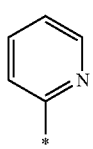
A-23 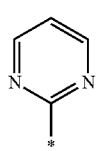
A-24 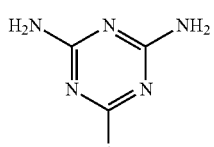
A-25 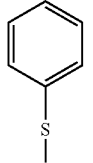
A-26 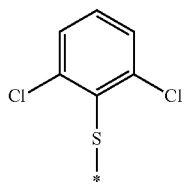
A-27 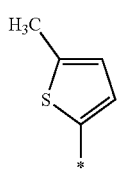
A-28 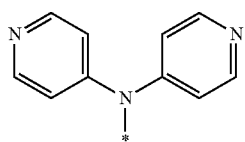
-continued
A-29 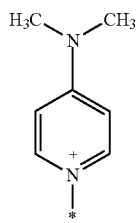
A-30
A-31 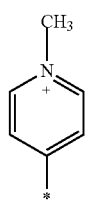
A-32 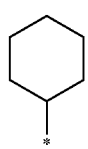
A-33 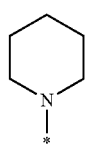
A-34 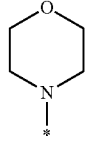
A-35 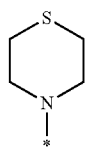
A-36 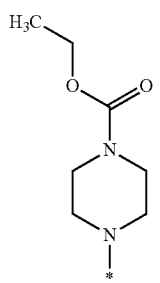
A-37
A-38
A-39
A-40
A-41
A-42
A-43
A-44
A-45 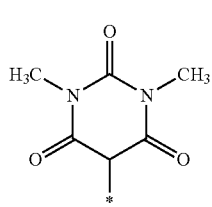

-continued

A-46 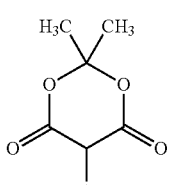

A-47 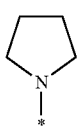

A-48 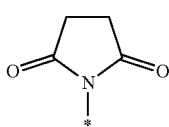

A-49 

A-50 

A-51 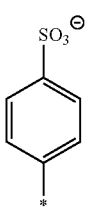

A-52 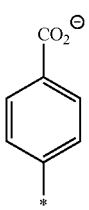

A-53 

A-54 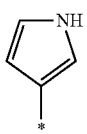

A-55 

Among the substituents A-1 to A-55, from the viewpoint that the cyanine coloring agent is more likely to form an associate, the substituent A-1, A-4, A-5, A-8, A-10, A-24, A-34, A-39, A-41 to 43, A-48, or A49 to A55 is preferable.

Hereinafter, specific examples of the methine chain represented by $L^1$ will be shown, but the methine chain represented by $L^1$ is not limited to the following specific examples. In the following specific examples, wave line portions each independently represent a bonding position with a structure other than $L^1$ in Formula 1. Me represents a methyl group, Et represents an ethyl group, and Ph represents a phenyl group.

LA1
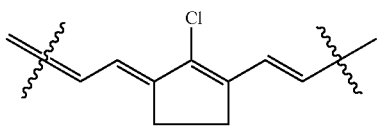

LA2
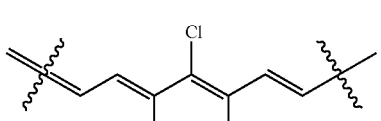

LA3
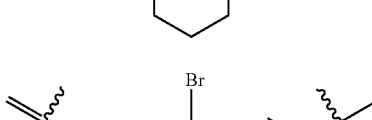

LA4
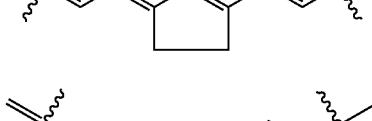

LA5
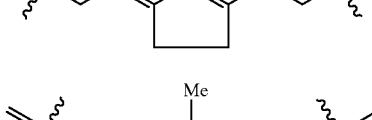

LA6
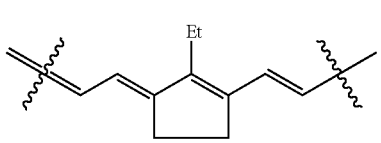

LA7
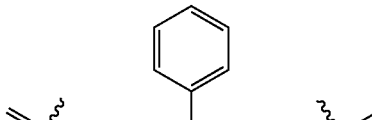

LA8
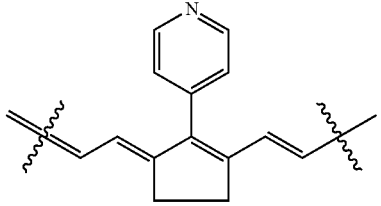

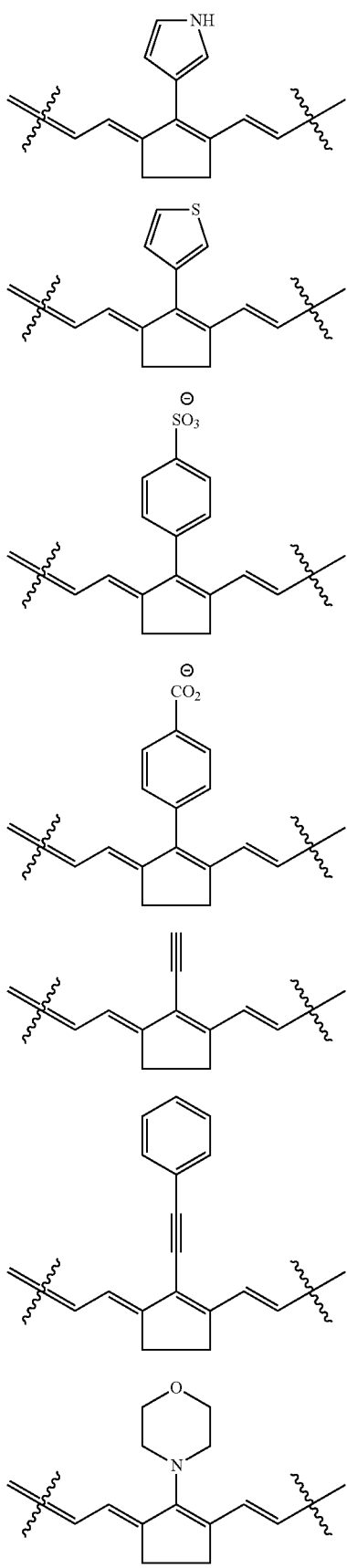
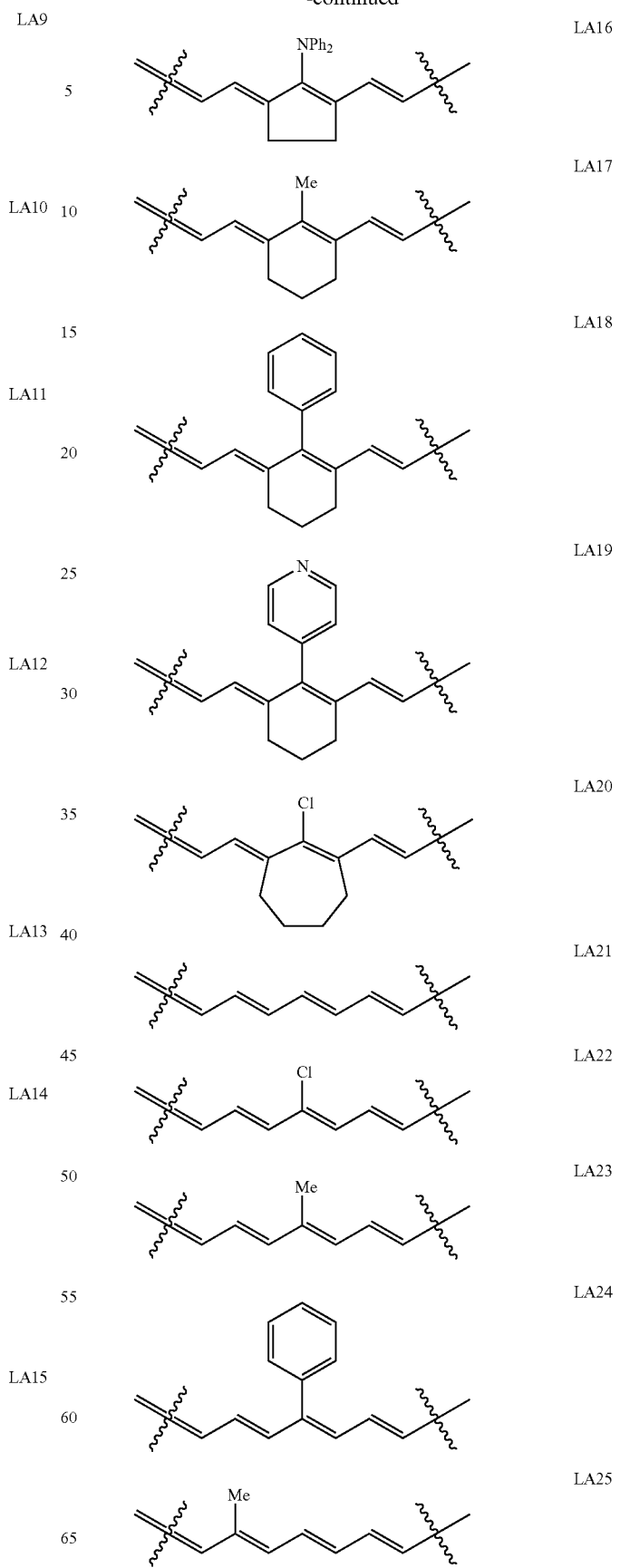

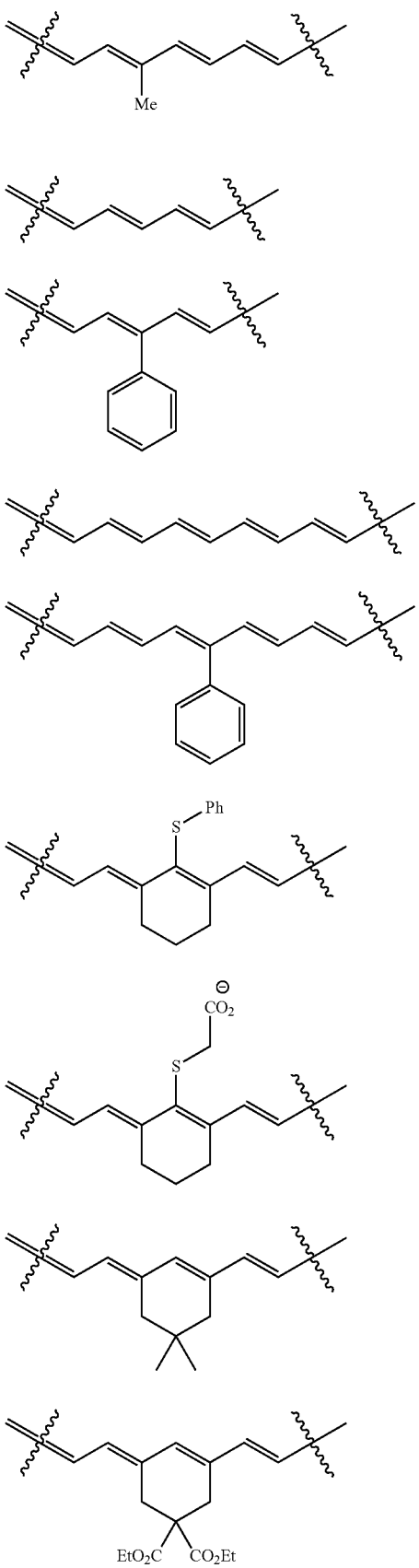

From the viewpoint that the cyanine coloring agent is more likely to form an associate, the methine chain represented by $L^1$ is preferably LA1 to LA8, LA11 to 19, LA21 to 24, or LA27 to 30.

[$R^1$ and $R^2$]

$R^1$ and $R^2$ each independently represent an aliphatic group or an aromatic group. The aliphatic group and the aromatic group may have a substituent. Examples of the substituent include a halogen atom (for example, a fluorine atom, a chlorine atom, a bromine atom, and an iodine atom), a cyano group, a nitro group, an aliphatic group, an aromatic group, a heterocyclic group, $-OR^{10}$, $-COR^{11}$, $-COOR^{12}$, $-OCOR^{13}$, $-NR^{14}R^{15}$, $-NHCOR^{16}$, $-CONR^{17}R^{18}$, $-NHCONR^{19}R^{20}$, $-NHCOOR^{21}$, $-SR^{22}$, $-SO_2R^{23}$, $-SO_2OR^{24}$, $-NHSO_2R^{25}$, and $SO_2NR^{26}R^{27}$. $R^{10}$ to $R^{27}$ each independently represent a hydrogen atom, an aliphatic group, an aromatic group, or a heterocyclic group. Examples thereof include a hydroxy group, a carboxy group, a sulfo group, an alkoxy group, and an amino group. Among these, the substituent is preferably an aliphatic group, an aromatic group, $-OR^{10}$, $-COOR^{12}$, or $-SO_2OR^{24}$, and more preferably an aromatic group or $-SO_2OR^{24}$. In a case where $R^{12}$ in $-COOR^{12}$ is a hydrogen atom (that is, a carboxy group), the hydrogen atom may be dissociated (that is, a carboxylate group) or may be in a state of salt. In addition, in a case where $R^{24}$ in $-SO_2OR^{24}$ is a hydrogen atom (that is, a sulfo group), the hydrogen atom may be dissociated (that is, a sulfonate group) or may be in a state of salt.

Examples of the aliphatic group include an alkyl group, an alkenyl group, an alkynyl group, and an aralkyl group. Examples of the aromatic group include an aryl group.

The alkyl group represented by each of $R^1$ and $R^2$ may be cyclic or chain-like. The chain-like alkyl group may be a linear alkyl group or a branched alkyl group. The number of carbon atoms in the alkyl group (in a case of having a substituent, the number of carbon atoms in a portion excluding the substituent) is preferably 1 to 20, more preferably 1 to 12, and still more preferably 1 to 8. Examples of the alkyl group include a methyl group, an ethyl group, an n-propyl group, an isopropyl group, a butyl group, a t-butyl group, a cyclopropyl group, a cyclohexyl group, and a 2-ethylhexyl group. Examples of the alkyl group having a substituent include a 2-hydroxyethyl group, a 2-carboxyethyl group, a 2-methoxyethyl group, a 2-phenoxyethyl group, a 2-(1-naphthoxy)ethyl group, a 2-diethylaminoethyl group, a 2-sulfoethyl group, a 2-methoxypropyl group, a 3-methoxypropyl group, a 3-sulfopropyl group, a 3-sulfobutyl group, and a 4-sulfobutyl group.

The alkenyl group represented by each of $R^1$ and $R^2$ may be cyclic or chain-like. The chain-like alkenyl group may be a linear alkenyl group or a branched alkenyl group. The number of carbon atoms in the alkenyl group (in a case of having a substituent, the number of carbon atoms in a portion excluding the substituent) is preferably 2 to 20, more preferably 2 to 12, and still more preferably 2 to 8. Examples of the alkenyl group include a vinyl group, an allyl group, a 1-propenyl group, a 2-butenyl group, a 2-pentenyl group, and a 2-hexenyl group.

The alkynyl group represented by each of $R^1$ and $R^2$ may be cyclic or chain-like. The chain-like alkynyl group may be a linear alkynyl group or a branched alkenyl group. The number of carbon atoms in the alkynyl group (in a case of having a substituent, the number of carbon atoms in a portion excluding the substituent) is preferably 2 to 20, more preferably 2 to 12, and still more preferably 2 to 8. Examples of the alkynyl group include an ethynyl group and a 2-propynyl group.

An alkyl portion in the aralkyl group represented by each of $R^1$ and $R^2$ is the same as the above-described alkyl group. An aryl portion in the aralkyl group, which may have a substituent, is the same as the above-described aryl group. Examples of the aralkyl group include a benzyl group and a phenethyl group.

The number of carbon atoms in the aryl group (in a case of having a substituent, the number of carbon atoms in a portion excluding the substituent) represented by each of $R^1$ and $R^2$ is preferably 6 to 25, more preferably 6 to 15, and still more preferably 6 to 10. Examples of the aryl group include a phenyl group and a naphthyl group.

Examples of the aryl group having a substituent include a 4-carboxyphenyl group, a 4-acetamidophenyl group, a 3-methanesulfonamidophenyl group, a 4-methoxyphenyl group, a 3-carboxyphenyl group, a 3,5-dicarboxyphenyl group, a 4-methanesulfonamidophenyl group, and a 4-butanesulfonamidophenyl group.

[$T^1$ and $T^2$]

$T^1$ and $T^2$ each independently represent a non-metal atomic group forming a 5-membered or 6-membered nitrogen-containing heterocyclic ring which may be fused.

The nitrogen-containing heterocyclic ring may be fused with another heterocyclic ring, aromatic ring, or aliphatic ring.

The nitrogen-containing heterocyclic ring is preferably a 5-membered ring. It is more preferable that a benzene ring or a naphthalene ring is fused to a 5-membered nitrogen-containing heterocyclic ring.

Examples of the nitrogen-containing heterocyclic ring include an oxazole ring, an isoxazole ring, a benzoxazole ring, a naphthoxazole ring, an oxazolocarbazole ring, an oxazolodibenzofuran ring, a thiazole ring, a benzothiazole ring, a naphthothiazole ring, an indolenine ring, a benzoindolenine ring, an imidazole ring, a benzimidazole ring, a naphthimidazole ring, a quinoline ring, a pyridine ring, a pyrrolopyridine ring, a furopyrrole ring, an indolizine ring, an imidazoquinoxaline ring, and a quinoxaline ring. Among these, the nitrogen-containing heterocyclic ring is preferably a quinoline ring, an indolenine ring, a benzoindolenine ring, a benzoxazole ring, a benzothiazole ring, or a benzimidazole ring, and more preferably an indolenine ring, a benzoindolenine ring, a benzothiazole ring, or a benzimidazole ring.

The nitrogen-containing heterocyclic ring and the ring fused thereto may have a substituent.

Examples of the substituent include a halogen atom, a cyano group, a nitro group, an aliphatic group, an aromatic group, a heterocyclic group, —$OR^{10}$, —$COR^{11}$, —$COOR^{12}$, —$OCOR^{13}$, —$NR^{14}R^{15}$, —$NHCOR^{16}$, —$CONR^{17}R^{18}$, —$NHCONR^{19}R^{20}$, —$NHCOOR^{21}$, —$SR^{22}$, —$SO_2R^{23}$, —$SO_2OR^{24}$, —$NHSO_2R^{25}$, and $SO_2NR^{26}R^{27}$. $R^{10}$ to $R^{27}$ each independently represent a hydrogen atom, an aliphatic group, an aromatic group, or a heterocyclic group. In a case where $R^{12}$ in —$COOR^{12}$ is a hydrogen atom (that is, a carboxy group), the hydrogen atom may be dissociated (that is, a carboxylate group) or may be in a state of salt. In addition, in a case where $R^{24}$ in —$SO_2OR^{24}$ is a hydrogen atom (that is, a sulfo group), the hydrogen atom may be dissociated (that is, a sulfonate group) or may be in a state of salt. Among these, the substituent is preferably —$COOR^{12}$ or —$SO_2OR^{24}$, and more preferably —$SO_2OR^{24}$.

Examples of the halogen atom include a fluorine atom, a chlorine atom, a bromine atom, and an iodine atom.

Examples of the aliphatic group and the aromatic group represented by each of $R^{10}$ to $R^{27}$ include the same as the aliphatic group and the aromatic group represented by each of $R^1$ and $R^2$.

The heterocyclic group may have a substituent. Examples of the substituent include the substituent which may be included in the above-described aliphatic group, and a preferred range thereof is also the same.

A heterocycle in the heterocyclic group is preferably a 5-membered ring or a 6-membered ring. The heterocycle may a single ring or a fused ring. Examples of the heterocycle include a pyridine ring, a piperidine ring, a furan ring group, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a thiazole ring, a pyrazine ring, a thiadiazine ring, a benzoquinoline ring, and a thiadiazole ring.

Among these, the substituent is preferably —$COOR^{12}$ or —$SO_2OR^{24}$, and more preferably —$SO_2OR^{24}$.

[Cy]

Cy is an anionic moiety. Cy has one or more anionic groups such that the charge is negative as a whole of the anionic moiety. In a case where the anionic group is a monovalent anionic group, Cy has two or more anionic groups. A position of the anionic group is not particularly limited. The anionic group may be included in $L^1$, $R^1$, and $R^2$, or may be included in a substituent of $T^1$ and $T^2$. The anionic group is preferably a sulfo group or a carboxy group, and more preferably a sulfo group.

Cy is preferably an anionic moiety represented by Formula 3.

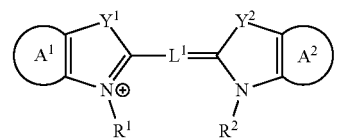

(3)

In Formula 3, $Y^1$ and $Y^2$ each independently represent $CR^3R^4$—, —O—, —S—, —Se—, or —$NR^5$—. $R^3$, $R^4$, and $R^5$ each independently represent a hydrogen atom, an aliphatic group, or an aromatic ring group. $R^3$ and $R^4$ may be bonded to each other to form a ring. $A^1$ and $A^2$ each independently represent a non-metal atomic group forming an aromatic ring or an aromatic heterocyclic ring. $L^1$, $R^1$, and $R^2$ have the same meaning as $L^1$, $R^1$, and $R^2$ in Formula 1.

[$Y^1$ and $Y^2$]

$Y^1$ and $Y^2$ each independently represent $CR^3R^4$—, —O—, —S—, —Se—, or —$NR^5$—. $Y^1$ and $Y^2$ are each independently preferably $CR^3R^4$—, —O—, or —S—, and more preferably $CR^3R^4$—.

Examples of the aliphatic group and the aromatic group represented by each of $R^3$, $R^4$, and $R^5$ include the same as the aliphatic group and the aromatic group represented by each of $R^1$ and $R^2$.

Among these, $R^3$, $R^4$, and $R^5$ are each independently preferably an alkyl group. The alkyl group preferably has 1 to 10 carbon atoms, more preferably has 1 to 5 carbon atoms, and still more preferably has 1 to 3 carbon atoms. The alkyl group may be any of a linear alkyl group, a branched alkyl group, or a cyclic alkyl group. Among these, $R^3$, $R^4$, and $R^5$ are each independently preferably a linear alkyl group or a branched alkyl group, more preferably a linear alkyl group, still more preferably a methyl group or an ethyl group, and particularly preferably a methyl group.

[$A^1$ and $A^2$]

$A^1$ and $A^2$ each independently represent a non-metal atomic group forming an aromatic ring or an aromatic heterocyclic ring. The aromatic ring and the aromatic heterocyclic ring may have a substituent.

Examples of the substituent which may be included in the aromatic ring and the aromatic heterocyclic ring formed by each of $A^1$ and $A^2$ include the same substituent which may be included in the nitrogen-containing heterocyclic ring formed by each of $T^1$ and $T^2$ in Formula 1 and in the ring fused thereto.

Among these, the substituent is preferably —$COOR^{12}$ or —$SO_2OR^{24}$, and more preferably —$SO_2OR^{24}$.

Examples of the aromatic ring formed by each of $A^1$ and $A^2$ include a benzene ring and a naphthalene ring.

The aromatic heterocyclic ring formed by each of $A^1$ and $A^2$ is preferably an aromatic heterocyclic ring in which at least one of atoms forming the ring is a nitrogen atom, an oxygen atom, or a sulfur atom. The aromatic heterocyclic ring formed by each of $A^1$ and $A^2$ may be fused with another ring (an aliphatic ring, an aromatic ring, or a heterocyclic ring).

The aromatic heterocyclic ring formed by each of $A^1$ and $A^2$ is preferably a 5-membered ring to a 10-membered ring.

Examples of the aromatic heterocyclic ring formed by each of $A^1$ and $A^2$ include a pyridine ring, a dibenzofuran ring, and a carbazole ring.

From the viewpoint that the cyanine coloring agent is more likely to form an associate, $A^1$ and $A^2$ are each independently preferably a non-metal atomic group forming an aromatic ring, and more preferably a non-metal atomic group forming a benzene ring or a naphthalene ring.

The anionic moiety represented by Formula 3 is preferably an anionic moiety represented by Formula 3A or Formula 3B.

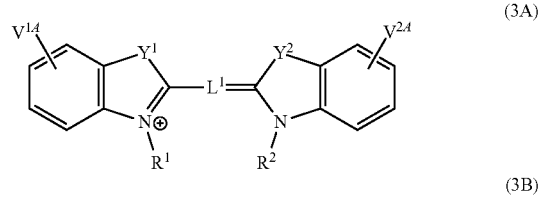

(3A)

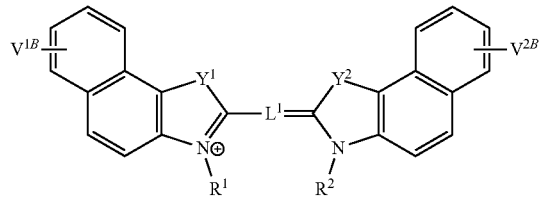

(3B)

$R^1$, $R^2$, $Y^1$, and $Y^2$ in Formula 3A have the same meaning as $R^1$, $R^2$, $Y^1$, and $Y^2$ in Formula 3.

$V^{1A}$ and $V^{2A}$ each independently represent a hydrogen atom or a substituent.

Examples of the substituent represented by each of $V^{1A}$ and $V^{2A}$ include a halogen atom, a cyano group, a nitro group, an aliphatic group, an aromatic group, a heterocyclic group, —$OR^{10}$, —$COR^{11}$, —$COOR^{12}$, —$OCOR^{13}$, —$NR^{14}R^{15}$, —$NHCOR^{16}$, —$CONR^{17}R^{18}$, —$NHCONR^{19}R^{20}$, —$NHCOOR^{21}$, —$SR^{22}$, —$SO_2R^{23}$, —$SO_2OR^{24}$, —$NHSO_2R^{25}$, and $SO_2NR^{26}R^{27}$. $R^{10}$ to $R^{27}$ each independently represent a hydrogen atom, an aliphatic group, an aromatic group, or a heterocyclic group. In a case where $R^{12}$ in —$COOR^{12}$ is a hydrogen atom (that is, a carboxy group), the hydrogen atom may be dissociated (that is, a carboxylate group) or may be in a state of salt. In addition, in a case where $R^{24}$ in —$SO_2OR^{24}$ is a hydrogen atom (that is, a sulfo group), the hydrogen atom may be dissociated (that is, a sulfonate group) or may be in a state of salt.

Among these, the substituent represented by each of $V^{1A}$ and $V^{2A}$ is preferably —$COOR^{12}$ or —$SO_2OR^{24}$, and more preferably —$SO_2OR^{24}$.

$V^{1A}$ and $V^{2A}$ may be the same or different from each other, but from the viewpoint of ease of production, it is preferable to be the same.

In a case where $V^{1A}$ is a substituent, a bonding position of $V^{1A}$ to the benzene ring is not particularly limited, but from the viewpoint that the cyanine coloring agent is more likely to form an associate, the bonding position is preferably the farthest position from the nitrogen atom bonded to $R^1$. Similarly, in a case where $V^{2A}$ is a substituent, a bonding position of $V^{2A}$ to the benzene ring is not particularly limited, but from the viewpoint that the cyanine coloring agent is more likely to form an associate, the bonding position is preferably the farthest position from the nitrogen atom bonded to $R^2$.

$R^1$, $R^2$, $Y^1$, and $Y^2$ in Formula 3B have the same meaning as $R^1$, $R^2$, $Y^1$, and $Y^2$ in Formula 3. $V^{1B}$ and $V^{2B}$ each independently represent a hydrogen atom or a substituent.

Examples of the substituent represented by each of $V^{1B}$ and $V^{2B}$ include the same as the substituent represented by each of $V^{1A}$ and $V^{2A}$.

Among these, the substituent represented by each of $V^{1B}$ and $V^{2B}$ is preferably —$COOR^{12}$ or —$SO_2OR^{24}$, and more preferably —$SO_2OR^{24}$.

$V^{1B}$ and $V^{2B}$ may be the same or different from each other, but from the viewpoint of ease of production, it is preferable to be the same.

In a case where VB is a substituent, a bonding position of $V^{1B}$ to the naphthalene ring is not particularly limited, but from the viewpoint that the cyanine coloring agent is more likely to form an associate, the bonding position is preferably the farthest position from the nitrogen atom bonded to $R^1$. Similarly, in a case where $V^{2B}$ is a substituent, a bonding position of $V^{2B}$ to the naphthalene ring is not particularly limited, but from the viewpoint that the cyanine coloring agent is more likely to form an associate, the bonding position is preferably the farthest position from the nitrogen atom bonded to $R^2$.

From the viewpoint that the cyanine coloring agent is more likely to form an associate, Cy is more preferably an anionic moiety represented by Formula 4.

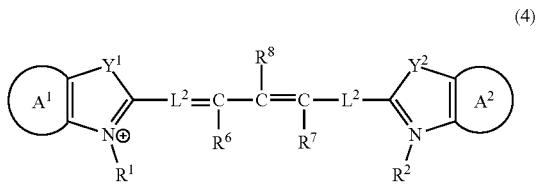

(4)

In Formula 4, $Y^1$ and $Y^2$ each independently represent $CR^3R^4$—, —O—, —S—, —Se—, or —$NR^5$—. $R^3$, $R^4$, and $R^5$ each independently represent a hydrogen atom, an aliphatic group, or an aromatic ring group. $R^3$ and $R^4$ may be bonded to each other to form a ring. $A^1$ and $A^2$ each independently represent a non-metal atomic group forming an aromatic ring or an aromatic heterocyclic ring. $L^2$'s each independently represent a methine chain consisting of one, two, or three methine groups, in which $L^2$ does not have a substituent. $R^6$ and $R^7$ each independently represent a hydrogen atom or an aliphatic group. $R^6$ and $R^7$ may be linked to each other to form a ring. $R^8$ is represented by Formula A.

—$S^A$-$T^A$                  Formula A

In Formula A, $S^A$ represents a single bond, an alkylene group, an alkenylene group, an alkynylene group, —O—, —S—, —$NR^{L1}$—, —C(=O)—, —C(=O)O—, —C(=O)$NR^{L1}$, —S(=O)$_2$—, —$OR^{L2}$—, or a group including a combination of at least two of these groups, where $R^{L1}$'s each independently represent a hydrogen atom, a halogen atom, an alkyl group, an aryl group, or a monovalent heterocyclic group and $R^{L2}$ represents an alkylene group, an arylene group, or a divalent heterocyclic group, and $T^A$ represents a hydrogen atom, a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group.

$R^1$, $R^2$, $R^3$, $R^4$, $R^5$, $Y^1$, and $Y^2$ in Formula 4 have the same meaning as $R^1$, $R^2$, $R^3$, $R^4$, $R^5$, $Y^1$, and $Y^2$ in Formula 3.

$L^2$'s each independently represent a methine chain consisting of one, two, or three methine groups. It is preferable that $L^2$'s are each independently a methine chain consisting of one or two methine groups.

Two $L^2$'s may be the same or different from each other, but from the viewpoint of ease of production, it is preferable to be the same.

$R^6$ and $R^7$ each independently represent a hydrogen atom or an aliphatic group. It is preferable that $R^6$ and $R^7$ are hydrogen atoms, or are aliphatic groups and are linked to each other to form a ring. The ring formed by linking $R^6$ and $R^7$ to each other is preferably a 5-membered aliphatic ring or a 6-membered aliphatic ring. In addition, examples of —$R^6R^7$— in which $R^6$ and $R^7$ are linked to each other include —$CH_2CH_2$— and —$CH_2C(Z)_2$—$CH_2$—. Z is preferably a hydrogen atom or an alkyl group having 1 to 8 carbon atoms, and more preferably a hydrogen atom or a methyl group. Two Z's may be bonded to each other to form a ring structure.

$R^8$ represents a substituent represented by Formula A. A preferred aspect of the substituent represented by Formula A is as described above.

Hereinafter, in Formula 1, specific examples of a basic nucleus 1 and a basic nucleus 2 which are bonded to the methine chain represented by $L^1$ will be shown. In Formula 1, for convenience, the basic nucleus 1 is described as a cationic structure in which the nitrogen atom is cationic, and the basic nucleus 2 is described as a neutral structure in which the nitrogen atom is not charged. Since a conjugated carbon chain is formed between the nitrogen atom included in the basic nucleus 1 and the nitrogen atom included in the basic nucleus 2, it is considered that electrons are actually delocalized. Therefore, in Formula 1, it is also possible to describe the basic nucleus 1 as a neutral structure and the basic nucleus 2 as a cationic structure. In the following specific examples, all the basic nucleus are described as having a cationic structure, but in the coloring agent compound represented by Formula 1, in a case where one basic nucleus has a cationic structure, the other basic nucleus is described as a neutral structure. The basic nucleus 1 and the basic nucleus 2 are not limited to the following specific examples. In the following specific examples, wave line portions each independently represent a bonding position with $L^1$ in Formula 1.

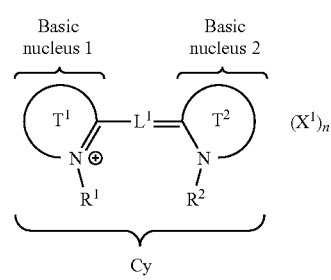

(1)

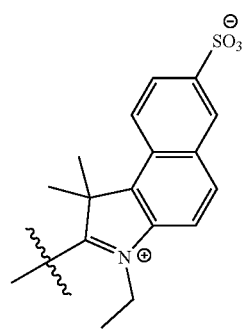

TA1

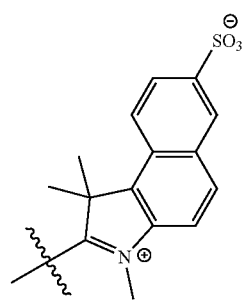

TA2

TA3
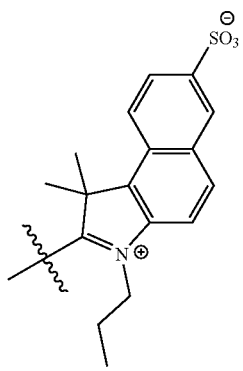
TA4
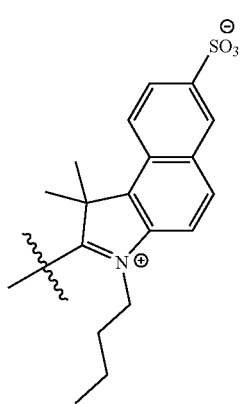
TA5
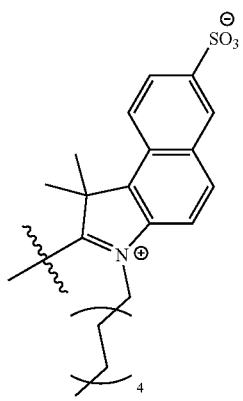
TA6
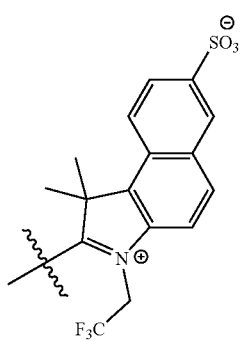
TA7
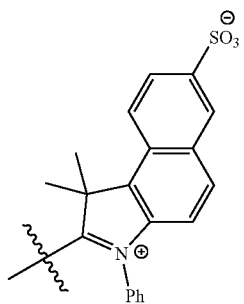
TA8
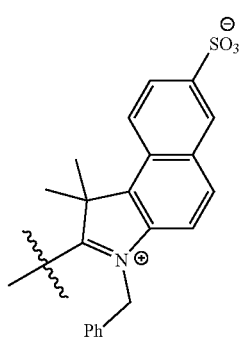
TA9
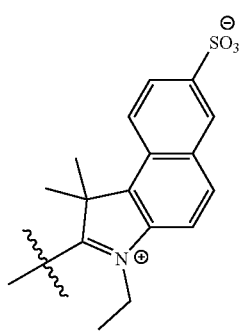
TA10
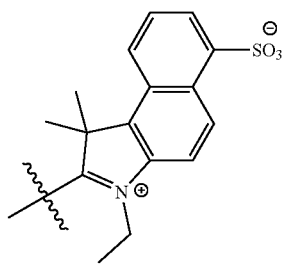
TA11
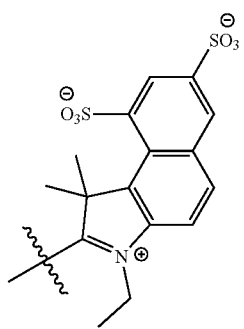

-continued
TA12 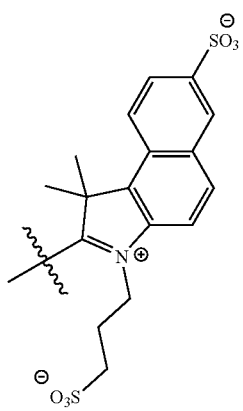
TA13 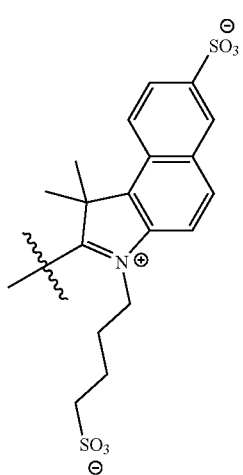
TA14 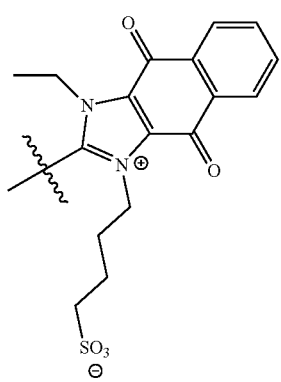
TA15 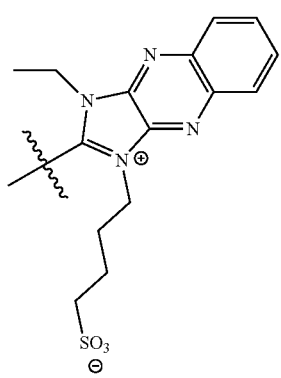
-continued
TA16 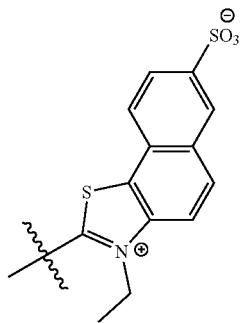
TA17 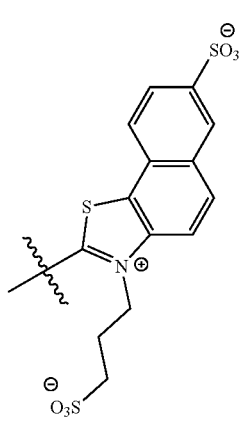
TA18 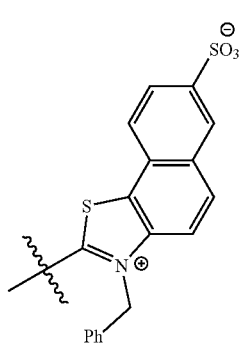
TA19 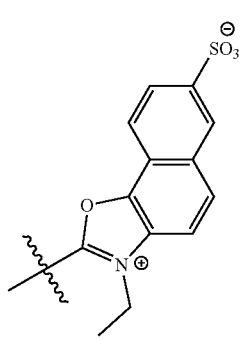

-continued
TA20
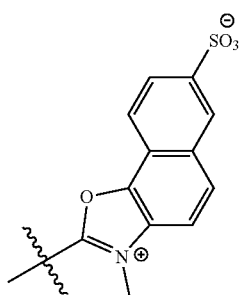
TA21
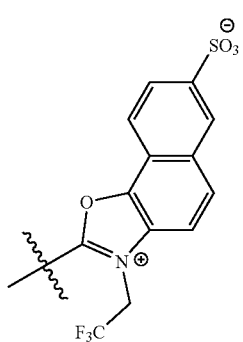
TA22
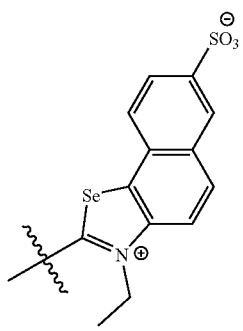
TA23
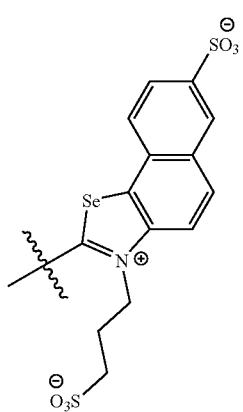
-continued
TA24
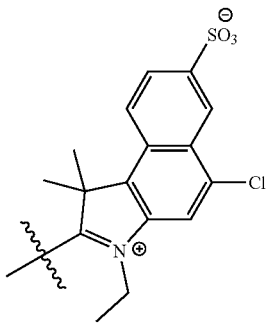
TA25
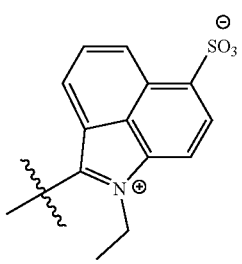
TA26
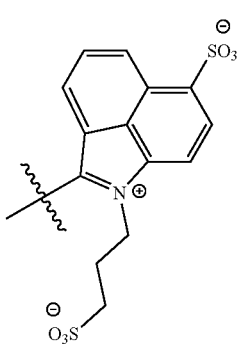
TA27
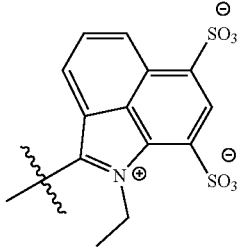
TA28

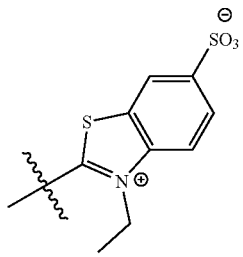

TA29

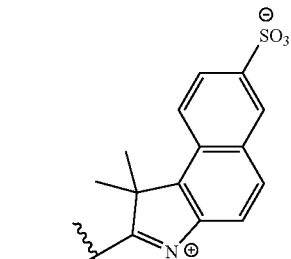

TA34

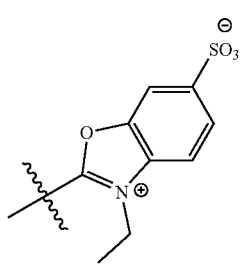

TA30

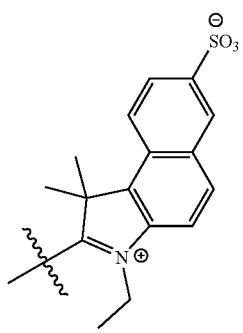

TA31

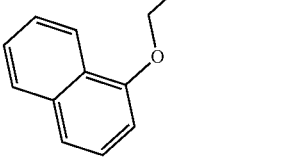

TA35

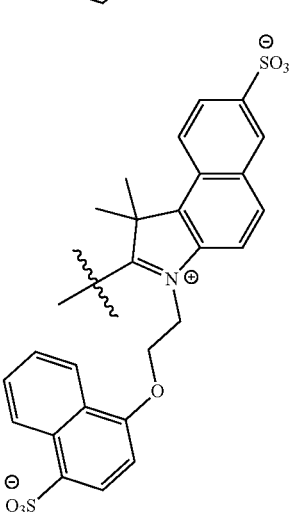

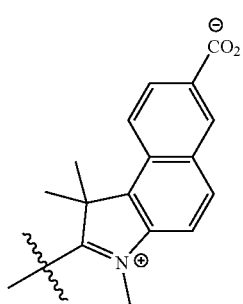

TA32

TA36

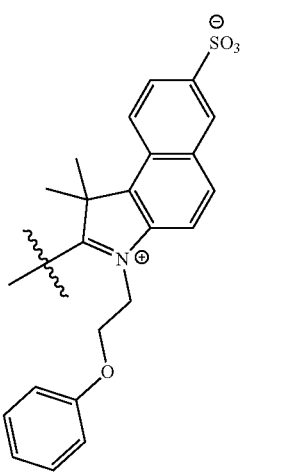

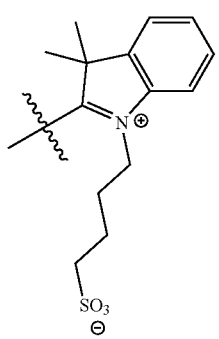

TA33

In Cy, from the viewpoint of ease of production, it is preferable that the basic nucleus 1 and the basic nucleus 2 have the same structure. The fact that the basic nucleus 1 and the basic nucleus 2 have the same structure means that constituent atoms are the same and a skeleton is the same. As described above, even in a case where the basic nucleus 1 and the basic nucleus 2 have the same structure, in the structural formula, one of them is described as a cationic structure and the other is described as a neutral structure.

From the viewpoint that the cyanine coloring agent is more likely to form an associate, the basic nucleus 1 and the basic nucleus 2 are preferably TA1 to TA13, TA16, TA28, TA29, or TA31 to TA36.

[$X^1$]

$X^1$ represents an organic cation represented by Formula 2-1, Formula 2-2, or Formula 2-3, or an organic cation having a structure represented by Formula 2-4.

<Formula 2-1>

(2-1)

In Formula 2-1, $A^{11}$ and $A^{12}$ each independently represent a nitrogen atom or a phosphorus atom. $B^{11}$'s each independently represent a divalent linking group. $R^{1a}$, $R^{1b}$, $R^{1c}$, $R^{1d}$, $E^{11}$, and $E^{12}$ each independently represent an aliphatic group or an aromatic group. $R^{1a}$, $R^{1b}$, $R^{1c}$, and $R^{1d}$ may be bonded to each other to form a ring. m1 is an integer of 1 or more.

$A^{11}$ and $A^{12}$ each independently represent a nitrogen atom or a phosphorus atom. $A^{11}$ and $A^{12}$ are preferably nitrogen atoms.

$A^{11}$ and $A^{12}$ may be the same or different from each other, but from the viewpoint of ease of production, it is preferable to be the same.

$B^{11}$'s each independently represent a divalent linking group. The divalent linking group represented by $B^{11}$ is preferably a group having 2 or more carbon atoms, and more preferably a group having 2 to 8 carbon atoms. In a case where the number of carbon atoms is 2 or more, since the molecular structure is more flexible, it is presumed that the group has a have high effect of binding the cyanine coloring agents to each other at a position where the associate can be appropriately formed. As a result, the associate is likely to be formed between the cyanine coloring agents, and the infrared absorbing ability tends to be maintained for a long period of time.

Examples of the divalent linking group represented by $B^{11}$ include an alkylene group having 1 to 30 carbon atoms, an arylene group having 6 to 30 carbon atoms, a heterocyclic linking group, —CH=CH—, —O—, —S—, —C(=O)—, —COO—, —NR—, —CONR—, —OCO—, —SO—, —SO$_2$—, and a linking group formed by linking two or more these groups. R represents a hydrogen atom, an alkyl group, an aryl group, or a heteroaryl group.

Among these, the divalent linking group represented by $B^{11}$ is preferably an alkylene group. The number of carbon atoms in the alkylene group is preferably 2 to 20, and more preferably 2 to 15. The alkylene group is preferably a linear alkylene group.

$R^{1a}$, $R^{1b}$, $R^{1c}$, $R^{1d}$, $E^{11}$, and $E^{12}$ each independently represent an aliphatic group or an aromatic group.

Examples of the aliphatic group include an alkyl group, an alkenyl group, an alkynyl group, and an aralkyl group. Examples of the aromatic group include an aryl group.

Among these, $R^{1a}$, $R^{1b}$, $R^{1c}$, and $R^{1d}$ are preferably alkyl groups. The number of carbon atoms in the alkyl group is preferably 1 to 10, and more preferably 1 to 6.

In addition, $E^{11}$ and $E^{12}$ are each independently preferably an alkyl group or an aryl group. The number of carbon atoms in the alkyl group is preferably 1 to 10, and more preferably 1 to 6. The aryl group is preferably a phenyl group.

m1 is an integer of 1 or more. m1 is preferably 1 to 3 and more preferably 1 or 2.

Among these, the organic cation represented by Formula 2-1 is more preferably an organic cation in which $A^{11}$ and $A^{12}$ are nitrogen atoms, $B^{11}$ is an alkylene group, $R^{1a}$, $R^{1b}$, $R^{1c}$, and $R^{1d}$ are alkyl groups, and $E^{11}$ and $E^{12}$ are alkyl groups.

Hereinafter, specific examples of the organic cation represented by Formula 2-1 will be shown, but the organic cation represented by Formula 2-1 is not limited to the following specific examples. Me represents a methyl group, Et represents an ethyl group, and Ph represents a phenyl group.

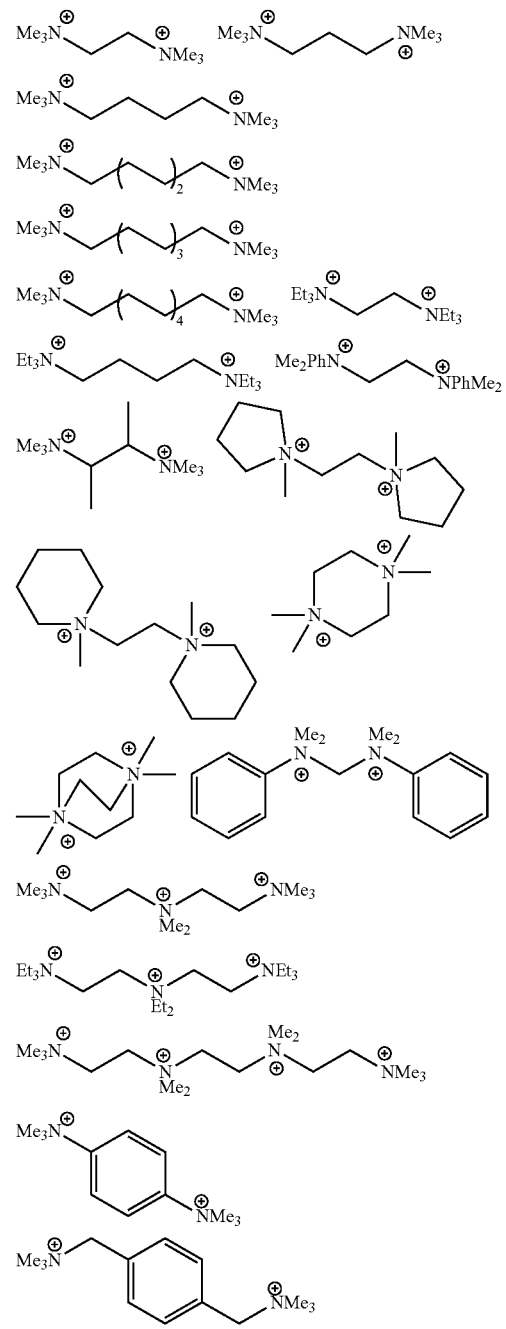

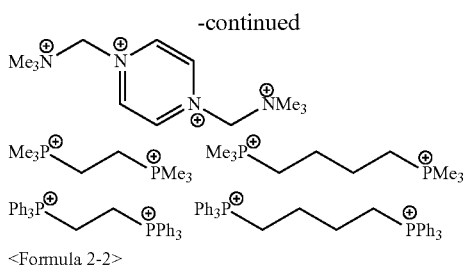

<Formula 2-2>

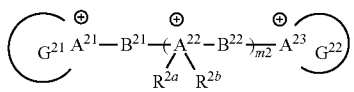
(2-2)

In Formula 2-2, $A^{21}$, $A^{22}$, and $A^{23}$ each independently represent a nitrogen atom or a phosphorus atom. $B^{21}$ and $B^{22}$ each independently represent a divalent linking group. $R^{2a}$ and $R^{2b}$ each independently represent an aliphatic group or an aromatic group. m2 is an integer of 0 or more. $G^{21}$ represents a non-metal atomic group forming an aromatic ring including $A^{21}$ in the ring. $G^{22}$ represents a non-metal atomic group forming an aromatic ring including $A^{23}$ in the ring.

$A^{21}$, $A^{22}$, and $A^{23}$ each independently represent a nitrogen atom or a phosphorus atom. $A^{21}$, $A^{22}$, and $A^{23}$ are preferably nitrogen atoms.

$A^{21}$, $A^{22}$, and $A^{23}$ may be the same or different from each other, but from the viewpoint of ease of production, it is preferable to be the same.

$B^{21}$ and $B^{22}$ each independently represent a divalent linking group. The divalent linking group represented by $B^{21}$ and $B^{22}$ is preferably a group having 2 or more carbon atoms, and more preferably a group having 2 to 8 carbon atoms. In a case where the number of carbon atoms is 2 or more, since the molecular structure is more flexible, it is presumed that the group has a have high effect of binding the cyanine coloring agents to each other at a position where the associate can be appropriately formed. As a result, the associate is likely to be formed between the cyanine coloring agents, and the infrared absorbing ability tends to be maintained for a long period of time.

Examples of the divalent linking group represented by $B^{21}$ and $B^{22}$ include an alkylene group having 1 to 30 carbon atoms, an arylene group having 6 to 30 carbon atoms, a heterocyclic linking group, —CH=CH—, —O—, —S—, —C(=O)—, —COO—, —NR—, —CONR—, —OCO—, —SO—, —SO$_2$—, and a linking group formed by linking two or more these groups. R represents a hydrogen atom, an alkyl group, an aryl group, or a heteroaryl group.

Among these, the divalent linking groups represented by $B^{21}$ and $B^{22}$ are each independently preferably an alkylene group. The number of carbon atoms in the alkylene group is preferably 2 to 20, and more preferably 2 to 15. The alkylene group is preferably a linear alkylene group.

$R^{2a}$ and $R^{2b}$ each independently represent an aliphatic group or an aromatic group.

Examples of the aliphatic group represented by $R^{2a}$ and $R^{2b}$ include an alkyl group, an alkenyl group, an alkynyl group, and an aralkyl group. Examples of the aromatic group include an aryl group.

Among these, $R^{2a}$ and $R^{2b}$ are each independently preferably an alkyl group. The number of carbon atoms in the alkyl group is preferably 1 to 10, and more preferably 1 to 6.

m2 is an integer of 0 or more. m2 is preferably an integer of 0 to 2.

$G^{21}$ represents a non-metal atomic group forming an aromatic ring including $A^{21}$ in the ring. $G^{22}$ represents a non-metal atomic group forming an aromatic ring including $A^{23}$ in the ring. The aromatic ring including $A^{21}$ in the ring is preferably a pyridine ring, an imidazole ring, an oxazole ring, or a thiazole ring. In addition, the aromatic ring including $A^{21}$ in the ring may be fused with another ring (an aliphatic ring, an aromatic ring, or a heterocyclic ring). Similarly, the aromatic ring including $A^{23}$ in the ring is preferably a pyridine ring, an imidazole ring, an oxazole ring, or a thiazole ring. In addition, the aromatic ring including $A^{23}$ in the ring may be fused with another ring (an aliphatic ring, an aromatic ring, or a heterocyclic ring).

Among these, in the organic cation represented by Formula 2-2, a case where $A^{21}$, $A^{22}$, and $A^{23}$ are nitrogen atoms, $B^{21}$ and $B^{22}$ are each independently an alkylene group, m2 is 0 or 1, and $G^{21}$ and $G^{22}$ are a pyridine ring, an imidazole ring, an oxazole ring, or a thiazole ring is more preferable.

Hereinafter, specific examples of the organic cation represented by Formula 2-2 will be shown, but the organic cation represented by Formula 2-2 is not limited to the following specific examples. Me represents a methyl group.

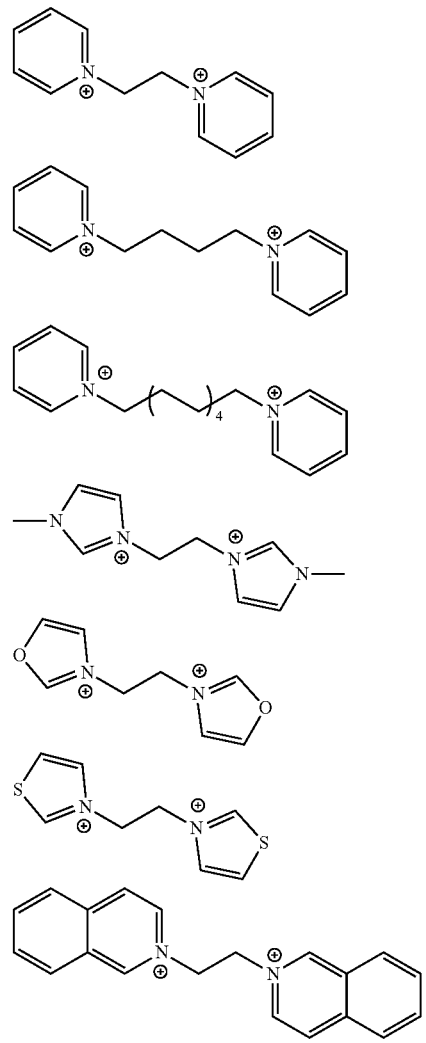

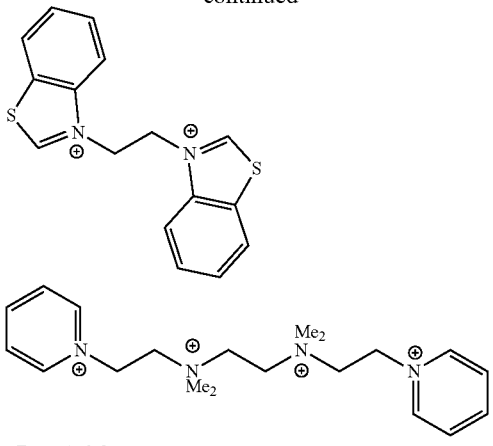

<Formula 2-3>

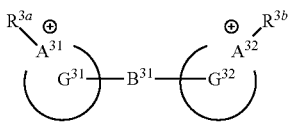

(2-3)

In Formula 2-3, $A^{31}$ and $A^{32}$ each independently represent a nitrogen atom or a phosphorus atom. $B^{31}$ represents a divalent linking group. $R^{3a}$ and $R^{3b}$ each independently represent an aliphatic group or an aromatic group. $G^{31}$ represents a non-metal atomic group forming an aromatic ring including $A^{31}$ in a ring. $G^{32}$ represents a non-metal atomic group forming an aromatic ring including $A^{32}$ in the ring.

$A^{31}$ and $A^{32}$ each independently represent a nitrogen atom or a phosphorus atom. $A^{31}$ and $A^{32}$ are preferably nitrogen atoms.

$A^{31}$ and $A^{32}$ may be the same or different from each other, but from the viewpoint of ease of production, it is preferable to be the same.

$B^{31}$ represents a divalent linking group. The divalent linking group represented by $B^{31}$ preferably has 2 or more carbon atoms, and more preferably has 2 to 8 carbon atoms. In a case where the number of carbon atoms is 2 or more, since the associate formed by the cyanine coloring agents is maintained at an appropriate position, the infrared absorbing ability tends to be maintained for a long period of time.

Examples of the divalent linking group represented by $B^{31}$ include an alkylene group having 1 to 30 carbon atoms, an arylene group having 6 to 30 carbon atoms, a heterocyclic linking group, —CH=CH—, —O—, —S—, —C(=O)—, —COO—, —NR—, —CONR—, —OCO—, —SO—, —SO$_2$—, and a linking group formed by linking two or more these groups. R represents a hydrogen atom, an alkyl group, an aryl group, or a heteroaryl group.

Among these, the divalent linking group represented by $B^{31}$ is preferably an alkylene group. The number of carbon atoms in the alkylene group is preferably 2 to 20, and more preferably 2 to 15. The alkylene group is preferably a linear alkylene group.

$R^{3a}$ and $R^{3b}$ each independently represent an aliphatic group or an aromatic group.

Examples of the aliphatic group include an alkyl group, an alkenyl group, an alkynyl group, and an aralkyl group. Examples of the aromatic group include an aryl group.

Among these, $R^{3a}$ and $R^{3b}$ are each independently preferably an alkyl group. The number of carbon atoms in the alkyl group is preferably 1 to 10, and more preferably 1 to 6.

$G^{31}$ represents a non-metal atomic group forming an aromatic ring including $A^{31}$ in a ring. $G^{32}$ represents a non-metal atomic group forming an aromatic ring including $A^{32}$ in the ring. The aromatic ring including $A^{31}$ in the ring is preferably a pyridine ring. In addition, the aromatic ring including $A^{31}$ in the ring may be fused with another ring (an aliphatic ring, an aromatic ring, or a heterocyclic ring). Similarly, the aromatic ring including $A^{32}$ in the ring is preferably a pyridine ring. In addition, the aromatic ring including $A^{32}$ in the ring may be fused with another ring (an aliphatic ring, an aromatic ring, or a heterocyclic ring).

The organic cation represented by Formula 2-3 is more preferably an organic cation in which $A^{31}$ and $A^{32}$ are nitrogen atoms, $B^{31}$ is an alkylene group, $R^{3a}$ and $R^{3b}$ are each independently an alkyl group, and $G^{31}$ and $G^{32}$ are pyridine rings.

Hereinafter, specific examples of the organic cation represented by Formula 2-3 will be shown, but the organic cation represented by Formula 2-3 is not limited to the following specific examples.

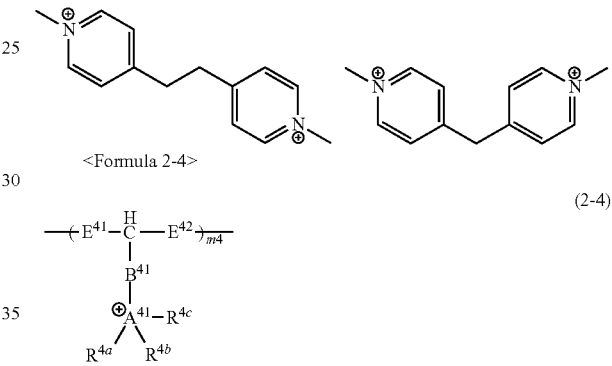

<Formula 2-4>

(2-4)

In Formula 2-4, $A^{41}$'s each independently represent a nitrogen atom or a phosphorus atom. $B^{41}$'s each independently represent a single bond or a divalent linking group. $R^{4a}$, $R^{4b}$, and $R^{4c}$ each independently represent an aliphatic group or an aromatic group. $E^{41}$ and $E^{42}$ each independently represent a single bond or an aliphatic group. One of $R^{4a}$, $R^{4b}$, and $R^{4c}$ may be bonded to $E^{41}$ or $E^{42}$ to form a ring. m4 is an integer of 2 or more.

Since the organic cation having the structure represented by Formula 2-4 has a flexible molecular structure and the cation sites are regularly arranged, it is considered that the cyanine coloring agents are regularly arranged at appropriate positions and the associate is formed. As a result, the infrared absorbing ability tends to be maintained for a long period of time.

$A^{41}$'s each independently represent a nitrogen atom or a phosphorus atom. $A^{41}$ is preferably a nitrogen atom.

$B^{41}$'s each independently represent a single bond or a divalent linking group. Examples of the divalent linking group represented by $B^{41}$ include an alkylene group having 1 to 30 carbon atoms, an arylene group having 6 to 30 carbon atoms, a heterocyclic linking group, —CH=CH—, —O—, —S—, —C(=O)—, —COO—, —NR—, —CONR—, —OCO—, —SO—, —SO$_2$—, and a linking group formed by linking two or more these groups. R represents a hydrogen atom, an alkyl group, an aryl group, or a heteroaryl group.

Among these, the divalent linking group represented by $B^{41}$ is preferably an alkylene group. The number of carbon atoms in the alkylene group is preferably 1 to 6, and more preferably 1 to 4. The alkylene group is preferably a linear alkylene group.

$R^{4a}$, $R^{4b}$, and $R^{4c}$ each independently represent an aliphatic group or an aromatic group.

Examples of the aliphatic group include an alkyl group, an alkenyl group, an alkynyl group, and an aralkyl group. Examples of the aromatic group include an aryl group.

Among these, $R^{4a}$, $R^{4b}$, and $R^{4c}$ are each independently preferably an alkyl group. The number of carbon atoms in the alkyl group is preferably 1 to 6, and more preferably 1 to 4.

$E^{41}$ and $E^{42}$ each independently represent a single bond or an aliphatic group.

In addition, $E^{11}$ and $E^{12}$ are each independently preferably a single bond or an alkyl group. The number of carbon atoms in the alkyl group is preferably 1 to 6, and more preferably 1 to 4. The aryl group is preferably a phenyl group.

m4 is an integer of 2 or more. m4 is preferably 50 to 3,000, and more preferably 100 to 2,000.

Among these, the organic cation having the structure represented by Formula 2-4 is more preferably an organic cation in which $A^{41}$ is a nitrogen atom, and one of $R^{4a}$, $R^{4b}$, and $R^{4c}$ is bonded to $E^{41}$ or $E^{42}$ to form a ring.

Hereinafter, specific examples of the organic cation having the structure represented by Formula 2-4 will be shown, but the organic cation represented by $X^1$ is not limited to the following specific examples. Me represents a methyl group, and m4 has the same meaning as m4 in Formula 2-4.

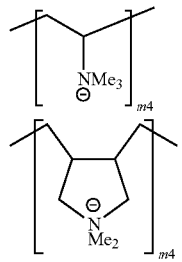

$X^1$ is preferably the organic cation represented by Formula 2-1 or the organic cation having the structure represented by Formula 2-4. It is considered that, by the organic cation represented by Formula 2-1 or the organic cation having the structure represented by Formula 2-4, the associate formed by the cyanine coloring agent is maintained at an appropriate position for a long period of time. In a case where $X^1$ is the organic cation represented by Formula 2-1 or the organic cation having the structure represented by Formula 2-4, the invisibility is excellent and the infrared absorbing ability is maintained for a longer period of time.

[n]

n represents a number required to neutralize charge, which is not 0. For example, in a case where the anionic moiety is a monovalent anion and the organic cation is a divalent cation, n is 0.5.

Since the coloring agent compound according to the embodiment of the present disclosure has excellent invisibility and maintains the infrared absorbing ability for a longer time than in the related art, the coloring agent compound according to the embodiment of the present disclosure is expected to be applied to various uses. The coloring agent compound according to the embodiment of the present disclosure can be mixed with other components to form a coloring composition.

Specific examples of the coloring agent compound represented by Formula 1 are shown below. However, the coloring agent compound represented by Formula 1 according to the embodiment of the present disclosure is not limited to the following specific examples.

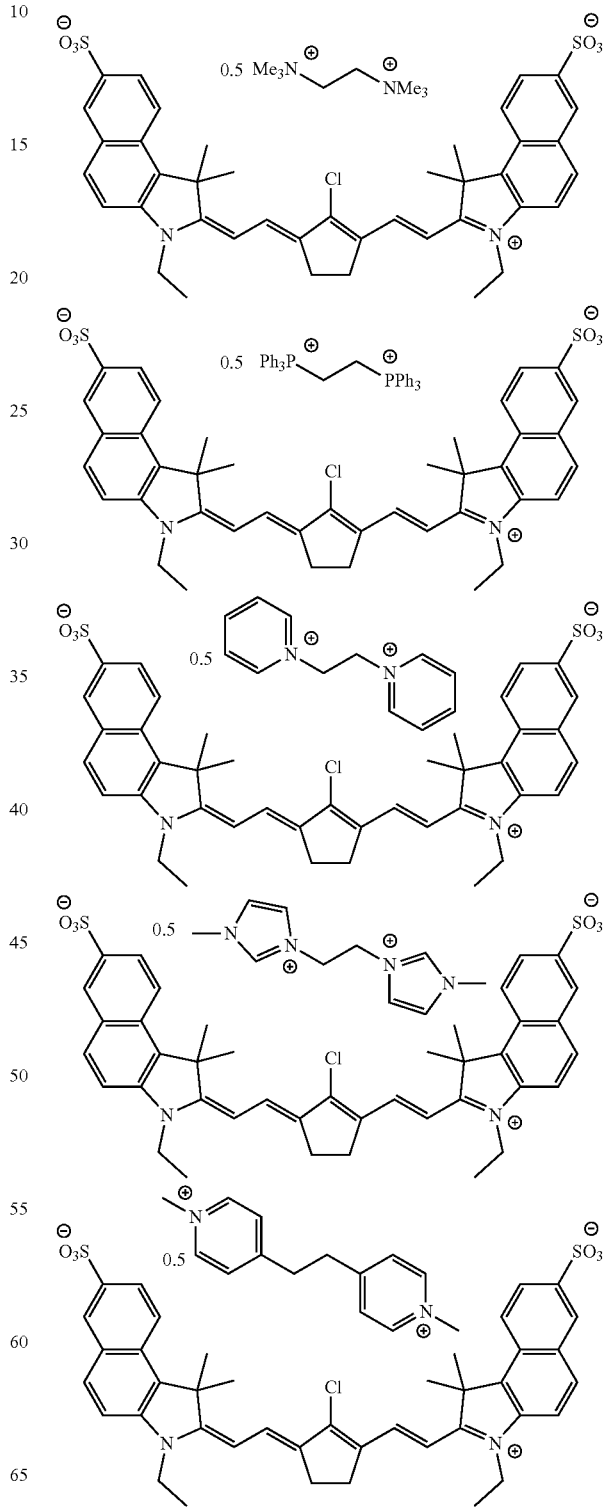

-continued
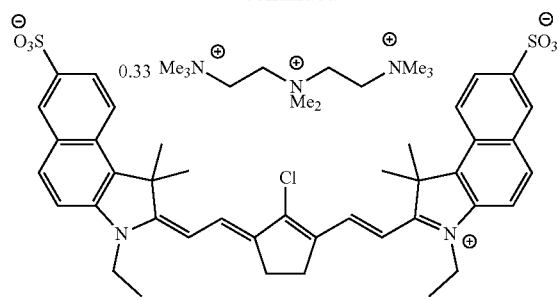
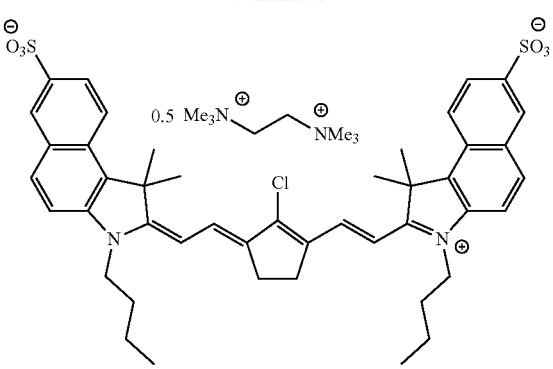
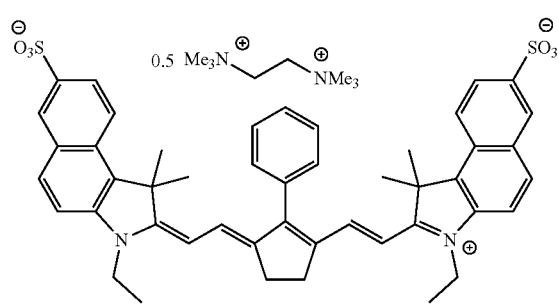
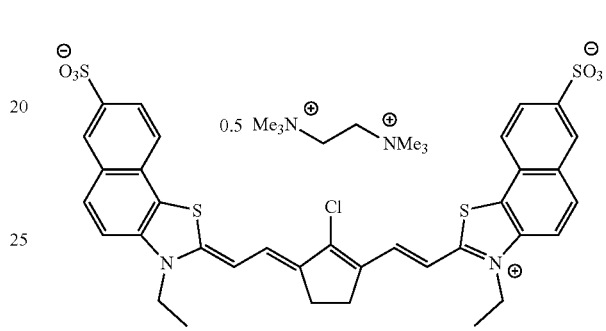
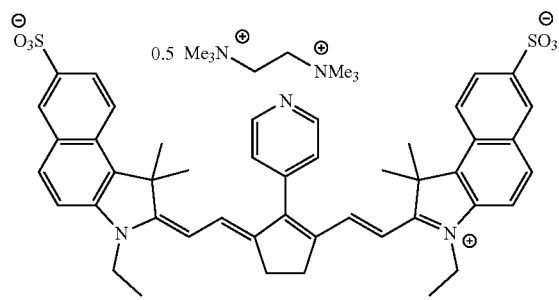
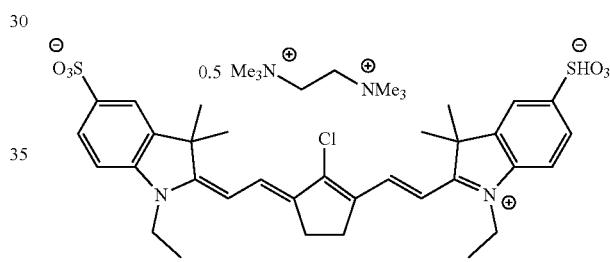
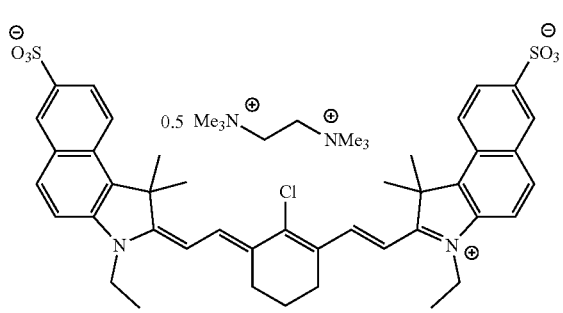
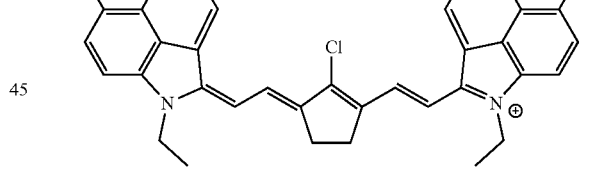
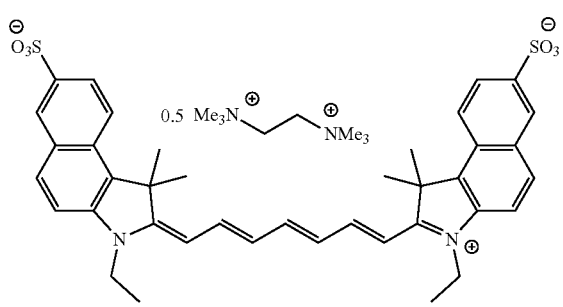
In Formula 1, in a case where Cy is represented by Formula 4, the coloring agent compound represented by Formula 1 can be synthesized by, for example, the following method.
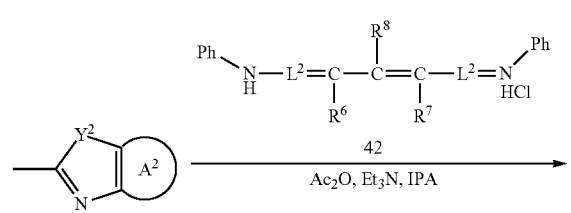

-continued

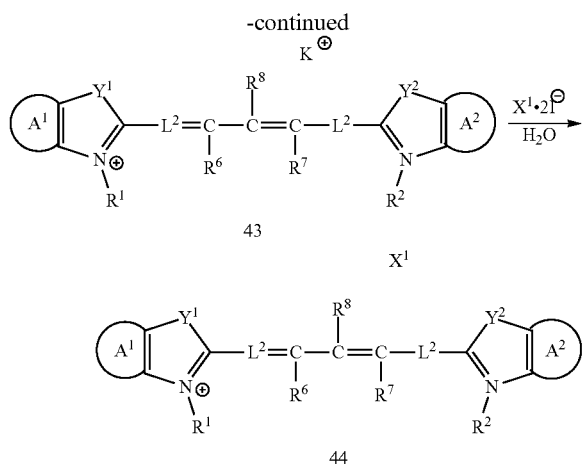

First, the compound 41, the compound 42, and 2-propanol are mixed, and then acetic acid anhydride and triethylamine are added thereto. Furthermore, an aqueous solution of potassium acetate and methanol are added thereto to obtain the compound 43. The compound 43 is a potassium salt. After purifying the compound 43, a cation exchange in which the potassium cation is exchanged with $X^1$ which is a counter cation of the target coloring agent compound is carried out to obtain the compound 44 as the target compound.

[Coloring Composition]

The coloring composition according to the embodiment of the present disclosure contains the above-described coloring agent compound represented by Formula 1 and a medium.

The medium is not particularly limited as long as it is a medium in which the coloring agent compound represented by Formula 1 can be dispersed, and examples thereof include water, an organic solvent, a resin, and a mixture of two or more kinds thereof.

The medium is preferably a liquid, and more preferably a liquid containing water.

In a case where a liquid is used as the medium, the coloring composition according to the embodiment of the present disclosure can be used as an ink. In addition, in a case where a liquid containing water is used as the medium, the coloring composition according to the embodiment of the present disclosure can be used as an aqueous ink, preferably as an aqueous ink for ink jet recording.

—Case where Medium is Other than Liquid—

In a case where a resin is used as the medium, the coloring composition according to the embodiment of the present disclosure can be a resin composition containing a coloring agent compound and a resin. The resin composition can be processed into a resin film or a resin molded article.

The type of the resin is not particularly limited, but from the viewpoint of ease of molding, a thermoplastic resin is preferable. Examples of the thermoplastic resin include polyester, polystyrene, polyamide, polyurethane, polycarbonate, cellulose acetate, polyacryl, polyacetal, polypropylene, polyvinyl, polysulfone, polyimide, and polyolefin. Among these, the resin is preferably at least one resin selected from the group consisting of polyester, polyamide, and polyurethane.

The resin includes a polymer and an oligomer, and can be appropriately selected from compounds having a weight-average molecular weight of 5,000 to 1,000,000.

The resin composition may contain only one kind of the resin, or may contain two or more kinds thereof. In a case where two or more kinds of resins are used, from the viewpoint of compatibility and moldability, it is preferable to use resins having glass transition temperatures, solubility parameters (SP values), and the like close to each other in combination.

In addition to the coloring agent compound represented by Formula 1 and the resin, the resin composition can contain various additives as long as the effects of the present disclosure are not impaired.

The coloring composition according to the embodiment of the present disclosure may contain at least one kind of a colorant.

By containing the colorant, a desired color can be imparted to the resin composition and the resin molded article produced from the resin composition.

The colorant may be either a dye or a pigment. As the dye and the pigment, known dyes and pigments in the related art can be used.

A content of the colorant is preferably 0.0001% by mass to 20% by mass, and more preferably 0.001% by mass to 10% by mass with respect to the total amount of the resin composition.

An inorganic filler may be optionally contained in the resin composition in order to improve physical properties such as impact resistance, antibacterial property, gas barrier properties, conductivity, magnetism, piezoelectricity, damping properties, sound insulating properties, smoothness, electromagnetic wave absorption properties, flame retardance, dewaterability, deodorization, anti-blocking properties, oil absorptiveness, water absorption properties, and moldability.

Examples of the inorganic filler include carbon fiber, glass fiber, glass flake, zeolite, mica, graphite, metal powder, ferrite, alumina, barium titanate, potassium titanate, barium sulfate, Teflon (registered trade name) powder, talc, charcoal powder, carbon nanotube (CNT), carbon microcoil (CMC), antimony oxide, aluminum hydroxide, magnesium hydroxide, hydrotalcite, calcium oxide, silica, and calcium carbonate. The inorganic filler is preferably contained in a content that does not reduce transparency of the resin molded article described later.

In addition, the resin composition may contain various known additives such as a leveling agent, a pigment dispersant, an ultraviolet absorber, an antioxidant, a viscosity improver, a light stabilizer, a heat-resistance stabilizer, a metal deactivator, a peroxide decomposer, a processing stabilizer, a nucleating agent, a crystallization accelerator, a crystallization retarder, an antigelling agent, a filler, a reinforcing agent, a plasticizer, a lubricant, a flame retardant, a rust inhibitor, a fluorescence brightening agent, a fluidity improver, and an antistatic agent.

A method for preparing the resin composition is not particularly limited, and for example, in order to contain the coloring agent compound represented by Formula 1 1, the coloring agent compound represented by Formula 1 may be directly kneaded into a masterbatch or a resin pellet, which is used as a raw material for the resin, and then melt-molded. In addition, the coloring agent compound represented by Formula 1 may be attached to the resin by a method such as coating and dipping.

Among these, in a case where the coloring agent compound represented by Formula 1 is directly kneaded into the resin and then melt-molded, the coloring agent compound represented by Formula 1 is less likely to be detached from the resin surface, and the infrared absorbing ability is maintained for a longer period of time.

In addition, in a case of producing the resin molded article, it is preferable that the coloring agent compound represented by Formula 1 and the resin are mixed and uniformly dispersed before forming a molded article. Examples of a method of mixing the coloring agent compound represented by Formula 1 and the resin include a method of heating and kneading the resin and the coloring agent compound represented by Formula 1, and a method of stirring and mixing the resin, the coloring agent compound represented by Formula 1, and a solvent.

The shape and use of the resin molded article are not particularly limited. Examples of an aspect of the resin molded article include a resin film; a synthetic fiber; a resin container such as a bottle, a cosmetic container, or a food container; a resin plate; a lens; a toner; an exterior component of various home appliances including general decorative materials, an electronic device, or the like; a housing construction component such as an interior material or an exterior material; and interior and exterior components of an aircraft, a vehicle, or the like.

A method for manufacturing the resin molded article is not particularly limited, and a known resin molding method can be appropriately used.

—Case where Medium is Liquid—

The coloring composition according to the embodiment of the present disclosure preferably contains a liquid as the medium. Hereinafter, the liquid as the medium is referred to as a liquid medium.

The type of the liquid medium is not particularly limited, and can be appropriately selected depending on the intended use of the coloring composition. Among these, in a case where the coloring composition according to the embodiment of the present disclosure is applied to an ink (for example, an ink for ink jet recording), the liquid medium preferably contains water, and more preferably contains water and an organic solvent.

In addition, in consideration of the application of the coloring composition to the ink for ink jet recording, from the viewpoint of jetting stability, the liquid medium preferably contains water and an organic solvent having a boiling point of 100° C. or higher. The boiling point means a boiling point at 1 atmospheric pressure (101,325 Pa). The boiling point is measured by a boiling point meter, and is measured using, for example, a boiling point measuring device (product name "DosaTherm 300") manufactured by TITAN TECHNOLOGIES, K.K.

From the viewpoint that the amount of impurities is small, the water is preferably a distilled water, an ion exchange water, an ion exchange distilled water, or pure water.

Examples of the organic solvent having a boiling point of 100° C. or higher include:
polyhydric alcohols such as ethylene glycol (boiling point: 198° C.), propylene glycol (boiling point: 188° C.), 1,2-butanediol (boiling point: 194° C.), 2,3-butanediol (boiling point: 183° C.), 2-methyl-1,3-propanediol (boiling point: 124° C.), 2-methyl-2,4-pentanediol (boiling point: 198° C.), 1,2,6-hexanetriol (boiling point: 178° C.), 1,2,3-butanetriol (boiling point: 175° C.), 1,2,4-butanetriol (boiling point: 170° C.), diethylene glycol (boiling point: 244° C.), dipropylene glycol (boiling point: 231° C.), 1,3-propanediol (boiling point: 214° C.), 1,3-butanediol (boiling point: 208° C.), 1,4-butanediol (boiling point: 230° C.), 1,2-pentanediol (boiling point: 206° C.), 2,4-pentanediol (boiling point: 201° C.), 2-methyl-1,3-butanediol (boiling point: 203° C.), 3-methyl-1,3-butanediol (boiling point: 203° C.), 1,5-pentanediol (boiling point: 242° C.), 2,2-dimethyl-1,3-propanediol (boiling point: 208° C.), 1,2-hexanediol (boiling point: 223° C.), 1,6-hexanediol (boiling point: 250° C.), 2,5-hexanediol (boiling point: 217° C.), 2-ethyl-1,3-hexanediol (boiling point: 243° C.), triethylene glycol (boiling point: 287° C.), tripropylene glycol (boiling point: 273° C.), and glycerin (boiling point: 290° C.);

polyhydric alcohol alkyl ethers such as ethylene glycol monomethyl ether (boiling point: 124° C.), ethylene glycol monoethyl ether (boiling point: 135° C.), ethylene glycol-n-propyl ether (boiling point: 150° C.), ethylene glycol monobutyl ether (boiling point: 171° C.), propylene glycol monomethyl ether (boiling point: 120° C.), propylene glycol monoethyl ether (boiling point: 133° C.), propylene glycol-n-butyl ether (boiling point: 171° C.), propylene glycol-t-butyl ether (boiling point: 153° C.), tetraethylene glycol monomethyl ether (boiling point: 159° C.), diethylene glycol methyl ether (boiling point: 194° C.), diethylene glycol diethyl ether (boiling point: 162° C.), diethylene glycol-n-butyl ether (boiling point: 230° C.), dipropylene glycol monomethyl ether (boiling point: 188° C.), diethylene glycol monoethyl ether (boiling point: 202° C.), diethylene glycol monobutyl ether (boiling point: 230° C.), triethylene glycol methyl ether (boiling point: 249° C.), dipropylene glycol-n-propyl ether (boiling point: 213° C.), tripropylene glycol methyl ether (boiling point: 243° C.), triethylene glycol ethyl ether (boiling point: 256° C.), diethylene glycol-n-hexyl ether (boiling point: 259° C.), tripropylene glycol-n-propyl ether (boiling point: 261° C.), and 3-methoxybutanol (boiling point: 161° C.);

polyhydric alcohol aryl ethers such as ethylene glycol phenyl ether (boiling point: 237° C.), propylene glycol phenyl ether (boiling point: 243° C.), and ethylene glycol monobenzyl ether (boiling point: 256° C.);

nitrogen-containing compounds such as ε-caprolactam (boiling point: 137° C.), N-methylformamide (boiling point: 199° C.), N,N-dimethylformamide (boiling point: 153° C.), N-methyl-2-pyrrolidone (boiling point: 204° C.), 2-pyrrolidone (boiling point: 245° C.), 1,3-dimethylimidazolidinone (boiling point: 220° C.), and N-methylpyrrolidinone (boiling point: 202° C.);

ester compounds such as propylene glycol monomethyl ether acetate (boiling point: 146° C.) and 3-methoxybutyl acetate (boiling point: 172° C.); and ketone compounds such as diacetone alcohol (boiling point: 169° C.) and γ-butyrolactone (boiling point: 204° C.).

In the present disclosure, a content of the water in the coloring composition is preferably 30% by mass or more, more preferably 40% by mass or more, and still more preferably 50% by mass or more with respect to the total mass of the coloring composition.

In the present disclosure, a content of the organic solvent having a boiling point of 100° C. or higher in the coloring composition is preferably 1% by mass to 50% by mass, and more preferably 2% by mass to 40% by mass with respect to the total mass of the coloring composition.

The coloring composition according to the embodiment of the present disclosure may contain a surfactant.

The surfactant may be any of an anionic surfactant, a cationic surfactant, an amphoteric surfactant, a nonionic surfactant, or a betaine-based surfactant.

Among these, in a case where the coloring composition is applied to an ink, from the viewpoint of suppressing droplet interference of the ink, the surfactant is preferably a non-ionic surfactant, and more preferably an acetylene glycol-based surfactant.

Examples of the acetylene glycol-based surfactant include 2,4,7,9-tetramethyl-5-decyne-4,7-diol and an alkylene oxide adduct of 2,4,7,9-tetramethyl-5-decyne-4,7-diol.

Examples of a commercially available product of the acetylene glycol-based surfactant include SURFYNOL series such as SURFYNOL 104PG manufactured by Nissin Chemical Co., Ltd. and E series such as OLFINE E1010 manufactured by Nissin Chemical Co., Ltd.

As a surfactant other than the acetylene glycol-based surfactant, a fluorine-based surfactant is preferable. Examples of the fluorine-based surfactant include Capstone (registered trade name) FS-63 and Capstone FS-61 (manufactured by Dupont); FTERGENT (registered trade name; hereinafter, the same shall be applied) 100, FTERGENT 110, and FTERGENT 150 (manufactured by Neos Co., Ltd.); and CHEMGUARD (registered trade name) S-760P (manufactured by Chemguard Inc.).

A content of the surfactant is preferably 0.1% by mass or more, more preferably 0.1% by mass to 10% by mass, and still more preferably 0.2% by mass to 3% by mass with respect to the total mass of the coloring composition.

The coloring composition according to the embodiment of the present disclosure may contain a polymerizable compound as the liquid medium. In a case where the coloring composition contains a polymerizable compound, the coloring composition can be cured by irradiating the coloring composition with active energy ray.

In a case where the coloring composition is applied to an ink, the coloring composition according to the embodiment of the present disclosure may further contain a known additive used in the ink.

Examples of the additive include a surfactant, a resin, an anti-drying agent (in other words, a wetting agent), a fading inhibitor, a discoloration preventer, an emulsification stabilizer, a penetration enhancer, a preservative, an antibacterial agent, a pH adjusting agent, a surface tension adjuster, an anti-foaming agent, a viscosity-adjusting agent, a dispersant, a rust inhibitor, and a chelating agent.

In a case where the coloring composition is applied to an ink, a coloring agent other than the coloring agent compound represented by Formula 1 may be contained. Other coloring agents are not particularly limited, and a coloring agent known in the field of ink can be used.

From the viewpoint of invisibility, a content of the other coloring agents is preferably 0.1% by mass or less, and more preferably 0.05% by mass or less with respect to the total mass of the ink.

In addition, by containing a coloring agent having absorption in the visible light region depending on the purpose, the coloring composition according to the embodiment of the present disclosure may be a coloring composition with which a visible image having absorption in the near-infrared region can be formed.

The coloring composition according to the embodiment of the present disclosure can be applied to an ink. The ink is preferably for ink jet recording.

From the viewpoint of jetting stability, a pH of the ink is preferably 7 to 10 and more preferably 7.5 to 9.5. The pH of the ink is measured at 25° C. using a pH meter, for example, a pH meter (model number "HM-31") manufactured by DKK-Toa Corporation.

A viscosity of the ink is preferably 0.5 mPa·s to 30 mPa·s, more preferably 2 mPa·s to 20 mPa·s, still more preferably 2 mPa·s to 15 mPa·s, and even more preferably 3 mPa·s to 10 mPa·s. The viscosity of the ink is measured at 25° C. using a viscometer, for example, a TV-22 type viscometer manufactured by Toki Sangyo Co., Ltd.

A surface tension of the ink is preferably 60 mN/m or less, more preferably 20 mN/m to 50 mN/m, and still more preferably 25 mN/m to 45 mN/m. The surface tension of the ink is measured at 25° C. by a plate method using a surface tension meter, for example, an automatic surface tension meter (product name "CBVP-Z") manufactured by Kyowa Interface Science Co., Ltd.

In addition, examples of the application of the coloring composition according to the embodiment of the present disclosure include an image recording material for recording an image, particularly an invisible image. Specific examples of the image recording material include an ink jet recording material, a heat-sensitive recording material, a pressure-sensitive recording material, a recording material using an electrophotographic method, a transfer-type silver halide photosensitive material, a printing ink, and a recording pen. The coloring composition according to the embodiment of the present disclosure is preferably used as an ink jet recording material, a heat-sensitive recording material, or a recording material using an electrophotographic method.

In addition, the coloring composition according to the embodiment of the present disclosure can be applied to a solid-state imaging element such as a charge coupled device (CCD) and a complementary metal oxide film semiconductor (CMOS); an infrared sensor; various devices such as an image display device; an infrared cut filter used in a display such as a plasma display panel (PDP); or a staining solution for dyeing various fibers. In addition, the coloring composition according to the embodiment of the present disclosure can also be applied to a recordable optical disc or a photothermal conversion material such as a flash welding development material. In addition, since the coloring composition according to the embodiment of the present disclosure has absorption in the near-infrared region excellent in human body permeability, the coloring composition according to the embodiment of the present disclosure can be also be applied to a diagnostic marker and a drug for photodynamic therapy, in addition to the above-described applications.

Furthermore, the coloring composition according to the embodiment of the present disclosure can also be applied to a fiber (heat-retaining and heat-storing properties); camouflage properties against reconnaissance by infrared rays (camouflage performance); prevention of eye fatigue; or a marking agent for positioning such as a photograph and a film. In addition, by using the coloring composition according to the embodiment of the present invention as a cured film, the applications can be expanded.

In addition, the coloring composition according to the embodiment of the present disclosure can be applied to a lens having a function to absorb or cut near-infrared rays (for example, a camera lens for a digital camera, a mobile phone, a vehicle camera, or the like, and an optical lens such as an f-θ lens and a pickup lens); an optical filter for a semiconductor photodetector; an agricultural coating agent for selective use of sunlight; a recording medium utilizing near-infrared absorption heat; a near-infrared filter for an electronic equipment or photography; a protective glass; a sunglass; a heat-blocking filter; optical character reading and recording; security document copying prevention applications; electrophotographic photoreceptors; or laser welding.

In addition, the coloring composition according to the embodiment of the present disclosure is also useful as a noise cut filter for a CCD camera or a filter for a CMOS image sensor.

[Ink Jet Recording Method]

The ink jet recording method according to the embodiment of the present disclosure includes a step of applying the above-described ink to a substrate.

The substrate is not particularly limited as long as an image can be formed thereto, and examples thereof include paper, cloth, wood, a metal plate, and a resin film. The substrate may be surface-treated in advance.

Examples of the paper include pure white roll paper, kraft paper, paperboard, high-quality paper, OCR paper, art paper, coated paper, mirror-coated paper, condenser paper, and paraffin paper.

Examples of the resin film include a polyester film, a polypropylene (PP) film, a cellophane, an acetate film, a polycarbonate (PC) film, an acrylic resin film, a polyethylene terephthalate (PET) film, a biaxially oriented polystyrene (OPS) film, a biaxially oriented polypropylene (OPP) film, a biaxially oriented nylon (ONy) film, a polyvinyl chloride (PVC) film, a polyethylene (PE) film, and a triacetate (TAC) film.

The ink jet recording method is not particularly limited as long as it is a method capable of recording an image. The ink jet recording method may be any of known methods, for example, an electric charge control method of jetting an ink by using electrostatic attraction force, a drop-on-demand method using the vibration pressure of a piezo element (pressure pulse method), an acoustic ink jet method of jetting an ink by using radiation pressure by means of converting electric signals into acoustic beams and irradiating the ink with the acoustic beams, and a thermal ink jet (Bubble Jet (registered trade name)) method of forming air bubbles by heating an ink and using the generated pressure.

As the ink jet recording method, particularly, it is possible to effectively use the method described in JP1979-59936A (JP-S54-59936A), which is an ink jet recording method of causing an ink to experience a rapid volume change by the action of thermal energy and jetting the ink from a nozzle by using the acting force resulting from the change of state.

Regarding the ink jet recording method, the method described in paragraphs 0093 to 0105 of JP2003-306623A can also be referred to.

Examples of ink jet heads used in the ink jet recording method include ink jet heads for a shuttle method of using short serial heads that are caused to scan a substrate in a width direction of the substrate so as to perform recording and ink jet heads for a line method of using line heads that each consist of recording elements arranged for the entire area of each side of a substrate.

In the line method, pattern formation can be performed on the entire surface of a substrate by scanning the substrate in a direction perpendicular to a direction in which the recording elements are arranged, and a transport system such as a carriage that scans a short head is unnecessary.

In addition, the movement of the carriage and complex scanning control on the substrate are not necessary, and only the substrate moves. Therefore, an increase in the recording speed can be realized as compared to the shuttle method.

From the viewpoint of obtaining an image with high definition, an amount of droplets of the ink ejected from the ink jet head is preferably 1 pL (picoliter) to 20 pL, and more preferably 1.5 pL to 10 pL.

The ink jet recording method according to the embodiment of the present disclosure may include a step other than the step of recording an image on the substrate by the ink jet recording method. Examples of other steps include a step of drying the image after recording the image. In addition, in a case where a polymerizable compound is contained in the ink, the image recording method according to the present disclosure may include a step of irradiating the ink with active energy ray.

[Image Recorded Material]

The image recorded material according to the embodiment of the present disclosure includes a substrate and an infrared absorbing image which is a solidified product of the above-described ink and is disposed on the substrate.

The solidified product includes a dried product of the ink and a cured product obtained by subjecting the polymerizable compound in the ink to a polymerization reaction.

In addition, the image recorded material according to the embodiment of the present disclosure includes a substrate and an infrared absorbing image disposed on the substrate, in which the infrared absorbing image contains the coloring agent compound represented by Formula 1 described above, and the maximal absorption wavelength of the infrared absorbing image is in a range of 700 nm to 1,300 nm.

The substrate is as described above, and the description thereof will be omitted. A pattern of the infrared absorbing image disposed on the substrate is not particularly limited, and is appropriately selected depending on the intended use.

The maximal absorption wavelength of the infrared absorbing image is determined by measuring an optical density (OD) of the infrared absorbing image using a spectrometer UV-3100PC equipped with LISR-3100, a 150 mm large integrating sphere attachment manufactured by Shimadzu Corporation. From the viewpoint of invisibility and readability of the infrared absorbing image, the maximal absorption wavelength of the infrared absorbing image is preferably in a range of 700 nm to 1,300 nm.

The image recorded material according to the embodiment of the present disclosure can be applied to a security system for the purpose of preventing counterfeiting. Since the image recorded material according to the embodiment of the present disclosure has excellent invisibility and maintains the infrared absorbing ability for a longer time than in the related art, the image recorded material according to the embodiment of the present disclosure can retain security for a long time.

EXAMPLES

Hereinafter, the present disclosure will be described in more detail using Examples. However, the present disclosure is not limited to the following examples as long as it does not exceed the gist of the present invention.

First, compounds 1 to 60 shown in Tables 1 to 3 and comparative compounds 1 to 3 were prepared. Methods for synthesizing the compound 9, the compound 12, the compound 23, the compound 46, and the compound 50 are shown below. Compounds other than the compound 9, the compound 12, the compound 23, the compound 46, and the compound 50 were also synthesized by the same method as that of the compound 9, the compound 12, the compound 23, the compound 46, and the compound 50, except for changing raw materials.

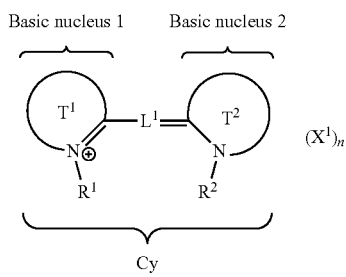

(1)

All of the compounds 1 to 60 are the coloring agent compound represented by Formula 1, in which the basic nucleus 1 and the basic nucleus 2 have the same structure. Tables 1 to 3 show $L^1$, the basic nucleus 1 and the basic nucleus 2 (in the tables, referred to as "Two basic nucleui in Cy"), and $X^1$.

21.0 g of a compound 9-A, 11.4 g of a compound 9-B, and 114.8 g of 2-propanol were charged into a flask. Thereafter, 20.3 g of acetic acid anhydride and 13.4 g of triethylamine were added thereto at 10° C., and the mixture was stirred at room temperature for 2 hours. A mixed solution of 6.5 g of potassium acetate and 16.2 g of water, and 28.2 g of methanol were added to the obtained reaction solution. The reaction solution was stirred at 50° C. for 30 minutes and at room temperature for 1 hour. Precipitated crystals in the reaction solution were filtered to obtain 15.0 g of a crude product of a compound 9-C.

15.0 g of the obtained crude product of the compound 9-C and 465.7 g of methanol were charged into a flask, and the mixture was stirred at 65° C. for 30 minutes. After returning to room temperature, a mixed solution of 6.5 g of potassium acetate and 16.2 g of water, and 28.2 g of methanol were added thereto, and the mixture was stirred for 1 hour. Precipitated crystals in the dispersion liquid were filtered to obtain 10.5 g of the compound 9-C.

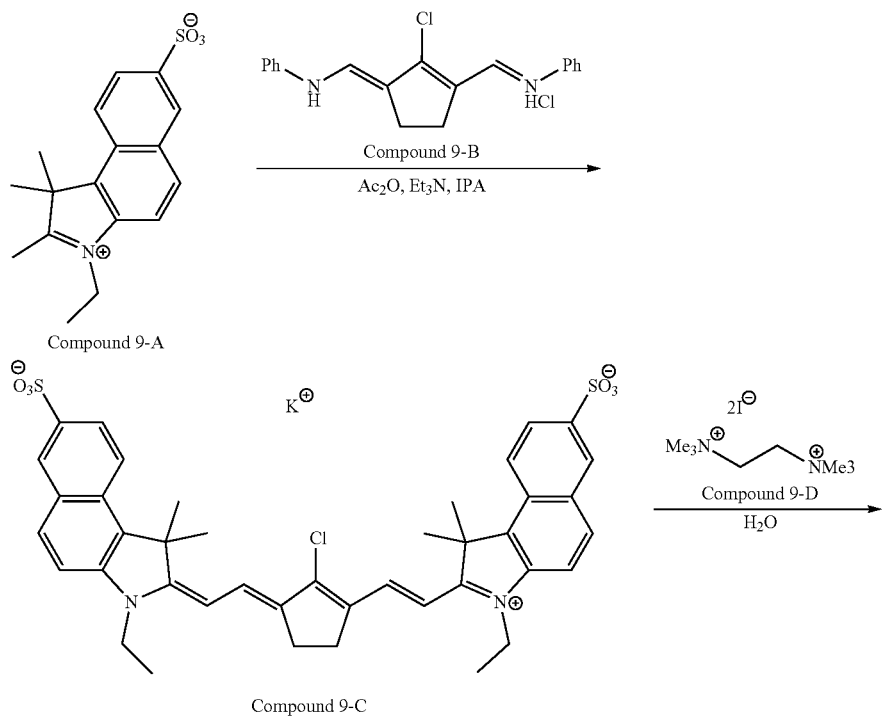

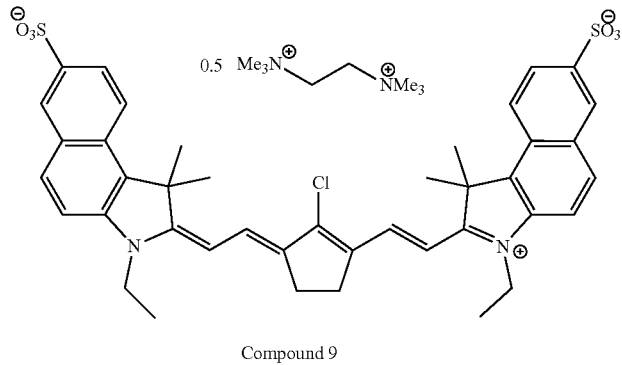

Compound 9

4.0 g of the obtained compound 9-C and 266.7 g of water were charged into a flask, and the mixture was stirred at room temperature for 12 hours. 1.1 g of a compound 9-D was added to the obtained aqueous solution, and the mixture was stirred at room temperature for 12 hours. Thereafter, 156.2 g of methanol was added thereto, and the mixture was stirred at room temperature for 30 minutes. Precipitated crystals in the reaction solution were filtered to obtain 4.0 g of the compound 9.

NMR spectrum of compound 9: $^1$H-NMR (deuterated THF/deuterated water/30% NaOD) δ 8.2 to 8.0 (2H, m), 8.0 to 7.6 (6H, m), 7.2 to 6.8 (4H, m), 5.8 (1H, d), 5.3 (11H, d), 4.0 (2H, s), 3.8 to 3.7 (2H, m), 3.3 (9H, s), 3.3 to 3.0 (2H, m), 2.7 to 2.5 (4H, m), 1.8 (6H, s), 1.5 (3H, s), 1.3 to 1.1 (9H, m)

The structure of the obtained compound 9 was confirmed by the $^1$H-NMR spectrum.

21.0 g of a compound 12-A, 12.8 g of a compound 12-B, and 114.8 g of 2-propanol were charged into a flask. Thereafter, 20.3 g of acetic acid anhydride and 13.4 g of triethylamine were added thereto at 10° C., and the mixture was stirred at room temperature for 2 hours. A mixed solution of 6.5 g of potassium acetate and 16.2 g of water, and 28.2 g of methanol were added to the obtained reaction solution. The reaction solution was stirred at 50° C. for 30 minutes and at room temperature for 1 hour. Precipitated crystals in the reaction solution were filtered to obtain 14.8 g of a crude product of a compound 12-C.

14.8 g of the obtained crude product of the compound 12-C and 465.7 g of methanol were charged into a flask, and the mixture was stirred at 65° C. for 30 minutes. After returning to room temperature, a mixed solution of 6.5 g of potassium acetate and 16.2 g of water, and 28.2 g of methanol were added thereto, and the mixture was stirred for

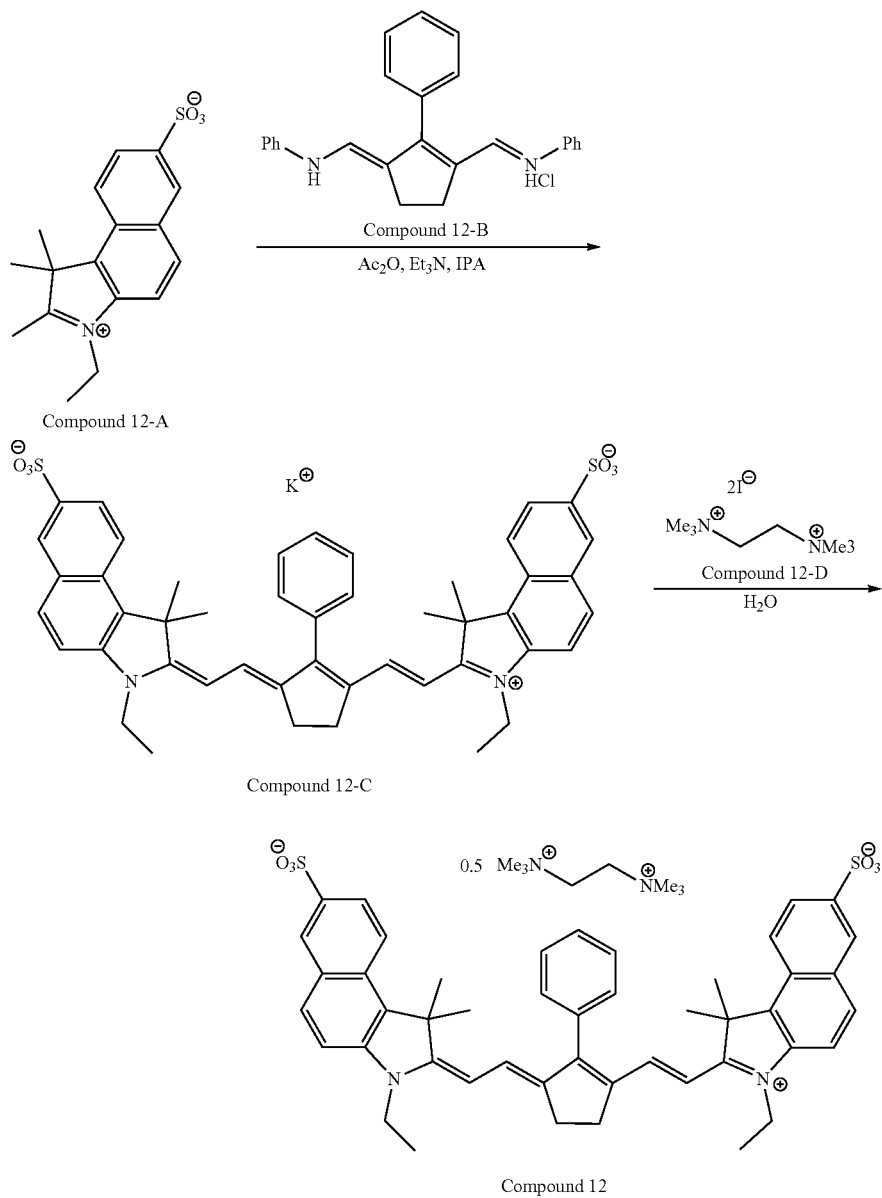

1 hour. Precipitated crystals in the dispersion liquid were filtered to obtain 10.2 g of the compound 12-C.

4.0 g of the obtained compound 12-C and 266.7 g of water were charged into a flask, and the mixture was stirred at room temperature for 12 hours. 1.1 g of a compound 12-D was added to the obtained aqueous solution, and the mixture was stirred at room temperature for 12 hours. Thereafter, 156.2 g of methanol was added thereto, and the mixture was stirred at room temperature for 30 minutes. Precipitated crystals in the reaction solution were filtered to obtain 3.9 g of the compound 12.

NMR spectrum of compound 12: $^1$H-NMR (deuterated THF/deuterated water/30% NaOD) δ 8.2 to 8.0 (2H, m), 8.0 to 7.6 (6H, m), 7.4 to 7.3 (3H, m), 7.2 to 6.8 (6H, m), 5.8 (1H, d), 5.3 (11H, d), 4.0 (2H, s), 3.8 to 3.7 (2H, m), 3.3 (9H, s), 3.3 to 3.0 (2H, m), 2.7 to 2.5 (4H, m), 1.8 (6H, s), 1.5 (3H, s), 1.3 to 1.1 (9H, m)

The structure of the obtained compound 12 was confirmed by the $^1$H-NMR spectrum.

21.0 g of a compound 23-A, 11.8 g of a compound 23-B, and 114.8 g of 2-propanol were charged into a flask. Thereafter, 20.9 g of acetic acid anhydride and 13.8 g of triethylamine were added thereto at 10° C., and the mixture was stirred at room temperature for 2 hours. A mixed solution of 6.7 g of potassium acetate and 16.2 g of water, and 28.2 g of methanol were added to the obtained reaction solution. The reaction solution was stirred at 50° C. for 30 minutes and at room temperature for 1 hour. Precipitated crystals in the reaction solution were filtered to obtain 14.0 g of a crude product of a compound 23-C.

14.0 g of the obtained crude product of the compound 23-C and 465.7 g of methanol were charged into a flask, and the mixture was stirred at 65° C. for 30 minutes. After returning to room temperature, a mixed solution of 6.7 g of potassium acetate and 16.2 g of water, and 28.2 g of methanol were added thereto, and the mixture was stirred for 1 hour. Precipitated crystals in the dispersion liquid were filtered to obtain 10.2 g of the compound 23-C.

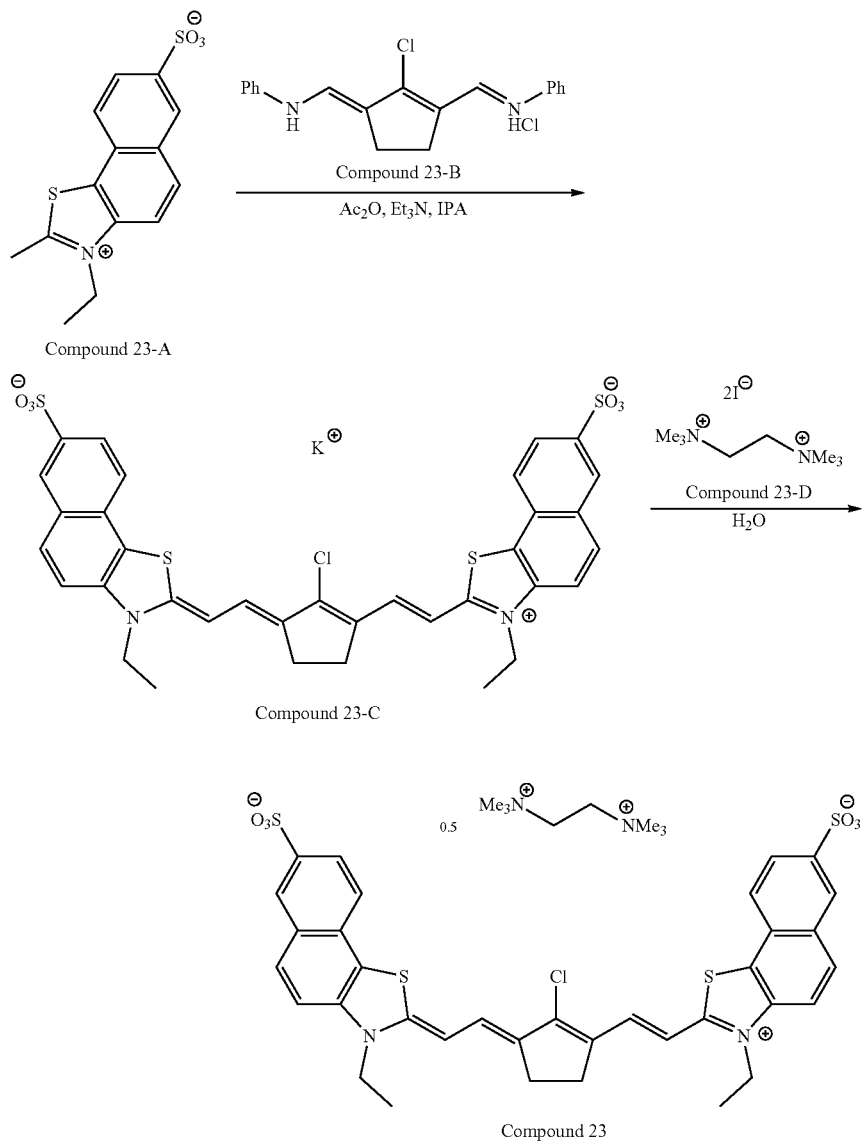

<Synthesis of compound 23>

4.0 g of the obtained compound 23-C and 266.7 g of water were charged into a flask, and the mixture was stirred at room temperature for 12 hours. 1.1 g of a compound 23-D was added to the obtained aqueous solution, and the mixture was stirred at room temperature for 12 hours. Thereafter, 156.2 g of methanol was added thereto, and the mixture was stirred at room temperature for 30 minutes. Precipitated crystals in the reaction solution were filtered to obtain 4.0 g of the compound 23.

NMR spectrum of compound 23: $^1$H-NMR (deuterated THF/deuterated water/30% NaOD) δ 8.0 to 7.6 (8H, m), 7.2 to 6.8 (4H, m), 6.5 (1H, d), 5.5 (1H, d), 4.0 (2H, s), 3.8 to 3.7 (2H, m), 3.3 (9H, s), 3.3 to 3.0 (2H, m), 2.7 to 2.5 (4H, m), 1.2 (6H, t)

The structure of the obtained compound 23 was confirmed by the $^1$H-NMR spectrum.

4.0 g of the compound 9-C and 266.7 g of water were charged into a flask, and the mixture was stirred at room temperature for 12 hours. 0.96 g of a compound 46-D was added to the obtained aqueous solution, and the mixture was stirred at room temperature for 12 hours. Thereafter, 156.2 g of methanol was added thereto, and the mixture was stirred at room temperature for 30 minutes. Precipitated crystals in the reaction solution were filtered to obtain 4.1 g of the compound 46.

NMR spectrum of compound 46: $^1$H-NMR (deuterated THF/deuterated water/30% NaOD) δ 8.7 to 8.6 (2H, m), 8.2 to 8.0 (2H, m), 8.0 to 7.6 (7H, m), 7.5 to 7.4 (2H, m), 7.2 to 6.8 (4H, m), 5.8 (1H, d), 5.3 (1H, d), 4.0 (2H, s), 3.8 to 3.7 (2H, m), 3.3 to 3.0 (2H, m), 2.7 to 2.5 (4H, m), 1.8 (6H, s), 1.5 (3H, s), 1.3 to 1.1 (9H, m)

<Synthesis of compound 46>

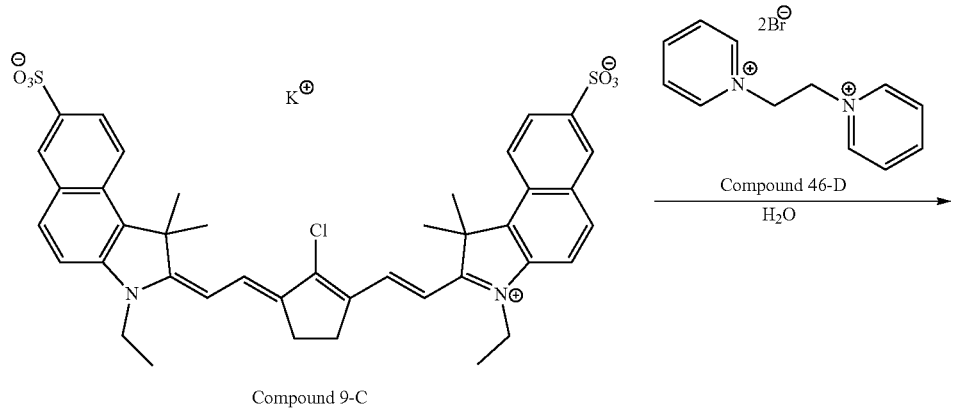

Compound 9-C

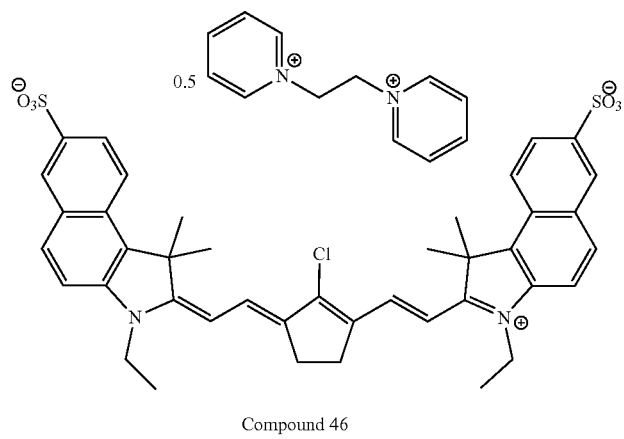

Compound 46

The structure of the obtained compound 46 was confirmed by the H-NMR spectrum.

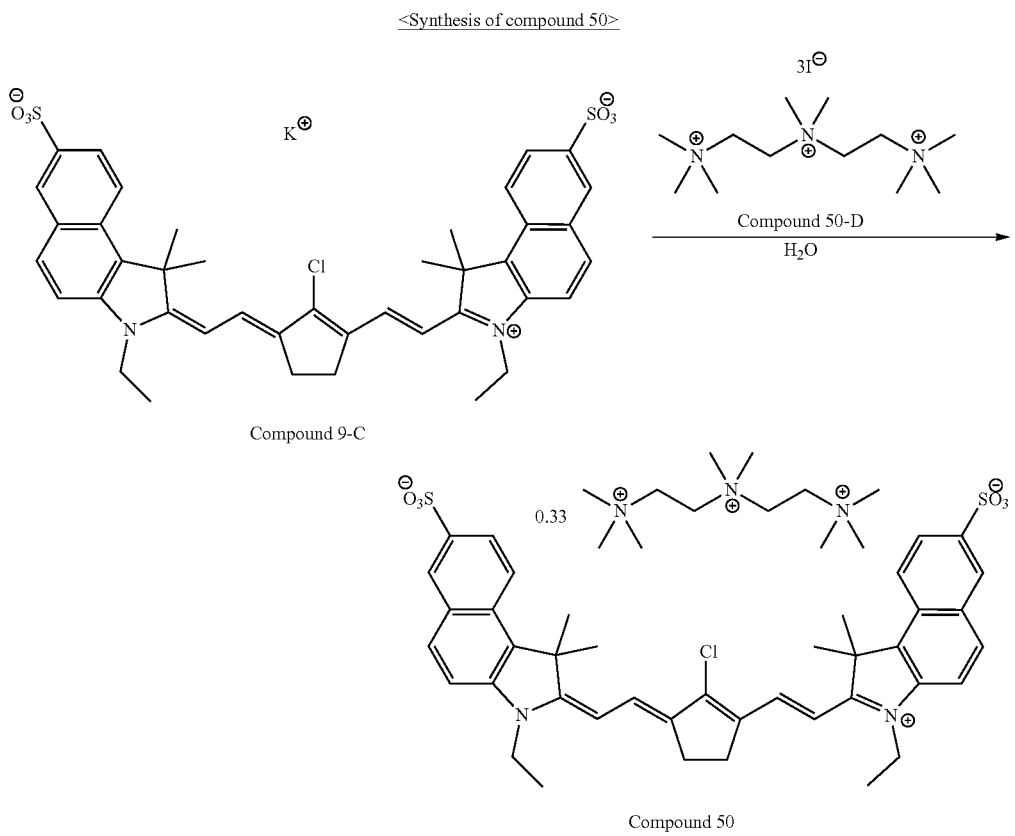

<Synthesis of compound 50>

Compound 9-C

Compound 50

4.0 g of the compound 9-C and 266.7 g of water were charged into a flask, and the mixture was stirred at room temperature for 12 hours. 1.1 g of a compound 50-D was added to the obtained aqueous solution, and the mixture was stirred at room temperature for 12 hours. Thereafter, 156.2 g of methanol was added thereto, and the mixture was stirred at room temperature for 30 minutes. Precipitated crystals in the reaction solution were filtered to obtain 3.9 g of the compound 50.

NMR spectrum of compound 50: $^1$H-NMR (deuterated THF/deuterated water/30% NaOD) δ 8.2 to 8.0 (2H, m), 8.0 to 7.6 (6H, m), 7.2 to 6.8 (4H, m), 5.8 (1H, d), 5.3 (1H, d), 4.0 (2.7H, s), 3.8 to 3.7 (2H, m), 3.3 (8H, s), 3.3 to 3.0 (2H, m), 2.7 to 2.5 (4H, m), 1.8 (6H, s), 1.5 (3H, s), 1.3 to 1.1 (9H, m)

The structure of the obtained compound 50 was confirmed by the $^1$H-NMR spectrum.

TABLE 1

| Compound No | $L^1$ | Two basic nuclei in Cy | $X^1$ |
|---|---|---|---|
| 1 | LA1 | TA1 | Me$_3$N$^\oplus$–(CH$_2$)$_4$–$^\oplus$NMe$_3$ |
| 2 | LA1 | TA1 | Py$^\oplus$–(CH$_2$)$_4$–$^\oplus$Py |
| 3 | LA1 | TA1 | Ph$_3$P$^\oplus$–CH$_2$CH$_2$–$^\oplus$PPh$_3$ |
| 4 | LA1 | TA1 | Me$_3$P$^\oplus$–CH$_2$CH$_2$–$^\oplus$PMe$_3$ |
| 5 | LA25 | TA1 | Me$_3$N$^\oplus$–CH$_2$CH$_2$–$^\oplus$NMe$_3$ |
| 6 | LA1 | TA14 | Me$_3$N$^\oplus$–CH$_2$CH$_2$–$^\oplus$NMe$_3$ |
| 7 | LA1 | TA15 | Me$_3$N$^\oplus$–CH$_2$CH$_2$–$^\oplus$NMe$_3$ |

TABLE 1-continued
| Compound No | L¹ | Two basic nuclei in Cy | X¹ |
|---|---|---|---|
| 8 | LA4 | TA1 | 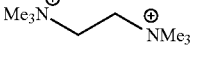 |
| 9 | LA1 | TA1 | 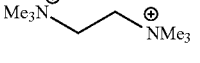 |
| 10 | LA3 | TA1 | 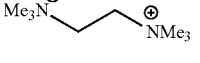 |
| 11 | LA5 | TA1 | 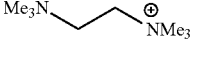 |
| 12 | LA7 | TA1 | 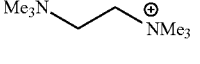 |
| 13 | LA8 | TA1 | 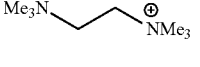 |
| 14 | LA15 | TA1 | 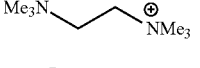 |
| 15 | LA13 | TA1 | 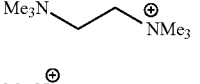 |
| 16 | LA14 | TA1 | 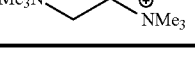 |
TABLE 2
| Compound No | L¹ | Two basic nuclei in Cy | X¹ |
|---|---|---|---|
| 17 | LA16 | TA1 | 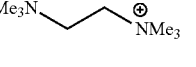 |
| 18 | LA2 | TA1 | 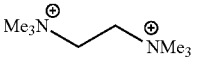 |
| 19 | LA17 | TA1 | 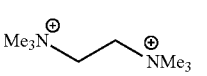 |
| 20 | LA23 | TA1 |  |
| 21 | LA21 | TA1 |  |
| 22 | LA1 | TA19 | 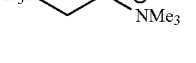 |
| 23 | LA1 | TA16 | 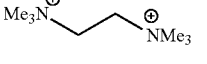 |
| 24 | LA1 | TA6 | 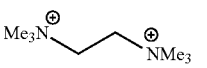 |
| 25 | LA1 | TA3 | 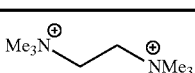 |
| 26 | LA1 | TA4 | 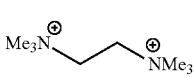 |
| 27 | LA1 | TA31 | 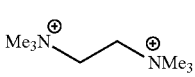 |
| 28 | LA1 | TA5 | 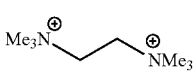 |
| 29 | LA1 | TA8 | 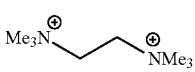 |
| 30 | LA1 | TA7 | |
| 31 | LA1 | TA2 | |
| 32 | LA1 | TA9 | |
| 33 | LA1 | TA10 | 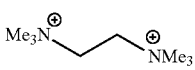 |
| 34 | LA1 | TA11 | |
| 35 | LA1 | TA13 | |
| 36 | LA1 | TA32 | 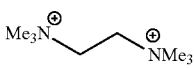 |
| 37 | LA1 | TA28 | 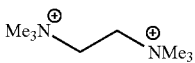 |
| 38 | LA1 | TA29 | 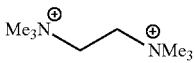 |

TABLE 3
| Compound No | L¹ | Two basic nucleui in Cy | X¹ |
|---|---|---|---|
| 39 | LA1 | TA1 | 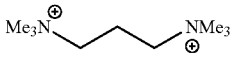 |
| 40 | LA1 | TA1 | 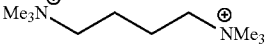 |
| 41 | LA1 | TA1 | 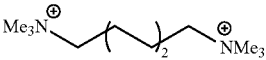 |
| 42 | LA1 | TA1 | 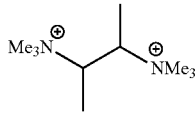 |
| 43 | LA1 | TA1 | 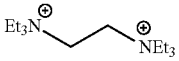 |
| 44 | LA1 | TA1 | 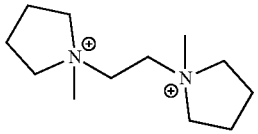 |
| 45 | LA1 | TA1 | 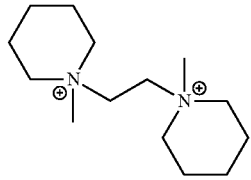 |
| 46 | LA1 | TA1 | 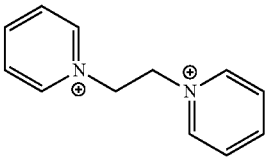 |
| 47 | LA1 | TA1 | 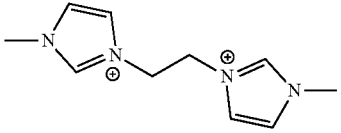 |
| 48 | LA1 | TA1 | 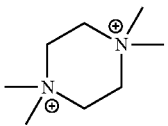 |
| 49 | LA1 | TA1 |  |
| 50 | LA1 | TA1 | 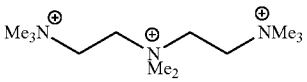 |
| 51 | LA1 | TA1 | 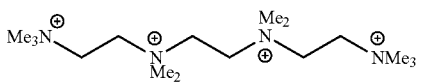 |

TABLE 3-continued
| Compound No | L¹ | Two basic nucleui in Cy | X¹ |
|---|---|---|---|
| 52 | LA1 | TA1 | 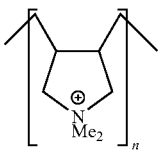 |
| 53 | LA27 | TA1 | 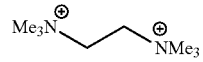 |
| 54 | LA27 | TA33 | 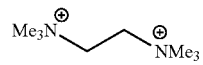 |
| 55 | LA1 | TA1 | 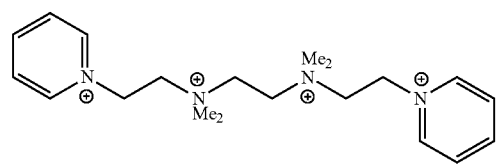 |
| 56 | LA1 | TA1 | 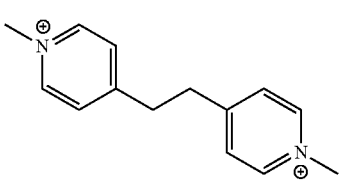 |
| 57 | LA1 | TA1 | 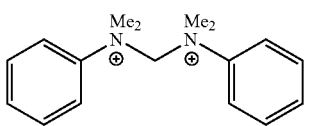 |
| 58 | LA1 | TA1 | 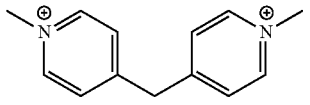 |
| 59 | LA11 | TA1 | 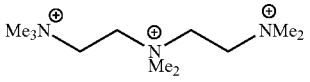 |
| 60 | LA12 | TA1 | 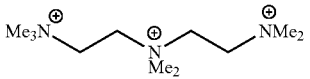 |
| 61 | LA1 | TA12 | 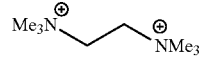 |
| 62 | LA16 | TA17 | 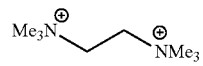 |

<Comparative Compounds 1 to 3>
  Comparative compound 1 . . . compound No. 2 described in JP2017-226820A
  Comparative compound 2 . . . compound (I-13) described in JP2002-90521A
  Comparative compound 3 . . . combination of a compound A-1 and a compound B-19 described in JP2000-292758A Structures of the comparative compounds 1 to 3 are as follows.

(Comparative compound 1)

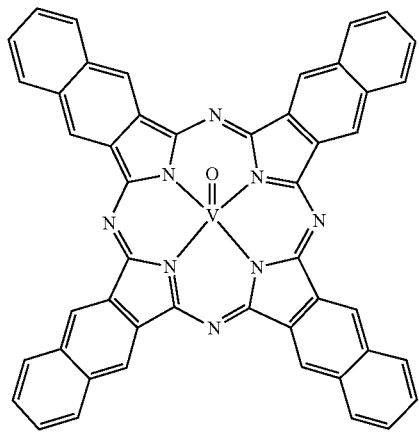

(Comparative compound 2)

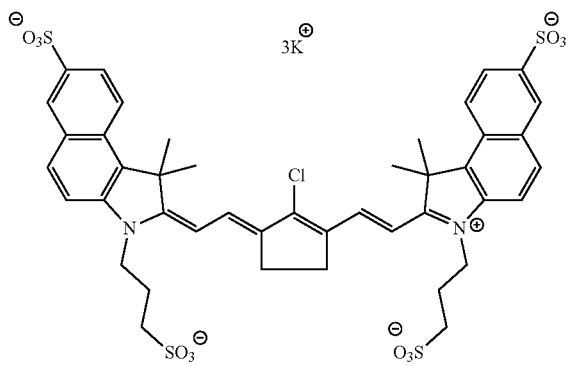

(Comparative compound 3)

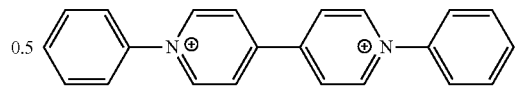

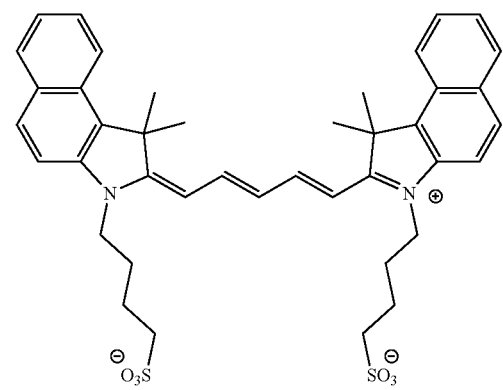

Next, using the coloring agent compound (any of the compounds 1 to 60 or the comparative compounds 1 to 3), an ink was prepared. Each component was mixed so as to have the following composition. Furthermore, 100 parts by mass of zirconia beads having a diameter of 0.1 mm was added thereto, and a dispersion treatment was performed at 400 rpm (rotation/min) for 5 hours using a planetary ball mill to obtain an ink.

Coloring agent compound . . . 0.5 parts by mass
Ultrapure water (specific resistance value: 18 MΩ·cm or more) . . . 78.8 parts by mass
Organic solvent: propylene glycol . . . 19.7 parts by mass
Acetylene glycol-based surfactant: OLFINE E1010 (manufactured by Nissin Chemical Co., Ltd.) . . . 1 part by mass <Production of Image Recorded Material>

The prepared ink was charged into an ink tank of an ink jet recording device (product name "DMP-2831", manufactured by Fujifilm Dimatix Inc.). As a substrate, OK TOP coated paper (manufactured by Oji Paper Co., Ltd.) was prepared. After ejecting the ink onto the substrate, the ink was dried with hot air at 100° C. for 1 minute, and a solid image was recorded.

Invisibility, light resistance, and moist heat resistance were evaluated using the obtained image recorded material. The evaluation methods are as follows.

[Invisibility]

An optical density (OD) at 450 nm and an optical density (OD) at the maximal absorption wavelength were measured using a spectrophotometer UV-3100PC (manufactured by Shimadzu Corporation) equipped with a 150 mmφ large integrating sphere attachment LISR-3100 (manufactured by Shimadzu Corporation). The invisibility was evaluated based on a ratio P (OD at 450 nm/OD at maximal absorption wavelength) of the OD at 450 nm to the OD at the maximal absorption wavelength. The evaluation standard was as follows. It can be said that, as the ratio P is smaller, the invisibility is more excellent. The evaluation standard was as follows. A, B, and C are levels which do not cause any problems in practical use.

A: ratio P was 1/10 or less.
B: ratio P was more than 1/10 and 1/7 or less.
C: ratio P was more than 1/7 and 1/5 or less.
D: ratio P was more than 1/5.

[Light Resistance]

Using the prepared ink, three types of image recorded materials having optical densities (OD) at the maximal absorption wavelength of 0.5, 1.0, and 1.5 were produced. The OD was adjusted by adjusting the ejection amount of the ink.

Each of the produced image recorded materials was irradiated with xenon light having an illuminance of 85,000 lux for one day using a xenon weather meter (ATLAS C. I65). The optical density (OD) at the maximal absorption wavelength of the image recorded material after the light irradiation was measured. A coloring agent residual rate was calculated based on the following expression. It can be said that, as the coloring agent residual rate is higher, the light resistance is more excellent.

Coloring agent residual rate (%)=(OD after light irradiation)÷(OD before light irradiation)×100

All the optical densities were measured using a spectrometer UV-3100PC equipped with a 150 mm large integrating sphere attachment LISR-3100 manufactured by Shimadzu Corporation.

The evaluation standard was as follows. A, B, and C are levels which do not cause any problems in practical use.
- A: coloring agent residual rate was 90% or more in all three types of image recorded materials.
- B: coloring agent residual rate was 75% or more and less than 90% in all three types of image recorded materials.
- C: coloring agent residual rate was less than 75% in at least one of the three types of image recorded materials, and the coloring agent residual rate was 60% or more in all three types of image recorded materials.
- D: coloring agent residual rate was less than 60% in one or two of the three types of image recorded materials.
- E: coloring agent residual rate was less than 60% in all three types of image recorded materials.

[Moist Heat Resistance]

Using the prepared ink, three types of image recorded materials having optical densities (OD) at the maximal absorption wavelength of 0.5, 1.0, and 1.5 were produced. The OD was adjusted by adjusting the ejection amount of the ink.

Each of the produced image recorded materials was stored in a box set at a temperature of 45° C. and a humidity of 85% for 7 days. The optical density (OD) at the maximal absorption wavelength of the image recorded material after the storage was measured. A coloring agent residual rate was calculated based on the following expression. It can be said that, as the coloring agent residual rate is higher, the light resistance is more excellent.

Coloring agent residual rate (%)=(OD after storage)÷(OD before storage)×100

All the optical densities were measured using a spectrometer UV-3100PC equipped with a 150 mm large integrating sphere attachment LISR-3100 manufactured by Shimadzu Corporation.

The evaluation standard was as follows. A, B, and C are levels which do not cause any problems in practical use.
- A: coloring agent residual rate was 90% or more in all three types of image recorded materials.
- B: coloring agent residual rate was 75% or more and less than 90% in all three types of image recorded materials.
- C: coloring agent residual rate was less than 75% in at least one of the three types of image recorded materials, and the coloring agent residual rate was 60% or more in all three types of image recorded materials.
- D: coloring agent residual rate was less than 60% in one or two of the three types of image recorded materials.
- E: coloring agent residual rate was less than 60% in all three types of image recorded materials.

The evaluation results are shown in Tables 4 and 5.

TABLE 4

| | Coloring agent compound | Invisibility | Light resistance | Moist heat resistance |
|---|---|---|---|---|
| Example 1 | Compound 1 | A | B | B |
| Example 2 | Compound 2 | A | C | B |
| Example 3 | Compound 3 | A | B | A |
| Example 4 | Compound 4 | A | B | A |
| Example 5 | Compound 5 | A | B | B |
| Example 6 | Compound 6 | A | B | B |
| Example 7 | Compound 7 | A | B | B |
| Example 8 | Compound 8 | A | A | A |
| Example 9 | Compound 9 | A | A | A |
| Example 10 | Compound 10 | A | A | A |
| Example 11 | Compound 11 | A | A | A |
| Example 12 | Compound 12 | A | A | A |
| Example 13 | Compound 13 | A | A | A |
| Example 14 | Compound 14 | A | A | A |
| Example 15 | Compound 15 | A | A | A |
| Example 16 | Compound 16 | A | A | A |
| Example 17 | Compound 17 | A | A | A |
| Example 18 | Compound 18 | A | A | A |
| Example 19 | Compound 19 | A | A | A |
| Example 20 | Compound 20 | A | B | A |
| Example 21 | Compound 21 | A | B | A |
| Example 22 | Compound 22 | A | A | A |
| Example 23 | Compound 23 | A | A | A |
| Example 24 | Compound 24 | A | A | A |
| Example 25 | Compound 25 | A | A | A |
| Example 26 | Compound 26 | A | A | A |
| Example 27 | Compound 27 | A | A | A |
| Example 28 | Compound 28 | A | B | A |
| Example 29 | Compound 29 | A | A | A |
| Example 30 | Compound 30 | A | A | A |
| Example 31 | Compound 31 | A | A | A |
| Example 32 | Compound 32 | A | B | B |

TABLE 5

| | Coloring agent compound | Invisibility | Light resistance | Moist heat resistance |
|---|---|---|---|---|
| Example 33 | Compound 33 | A | B | B |
| Example 34 | Compound 34 | A | B | B |
| Example 35 | Compound 35 | A | B | A |
| Example 36 | Compound 36 | A | B | A |
| Example 37 | Compound 37 | A | A | A |
| Example 38 | Compound 38 | A | A | A |
| Example 39 | Compound 39 | A | A | A |
| Example 40 | Compound 40 | A | A | A |
| Example 41 | Compound 41 | A | A | A |
| Example 42 | Compound 42 | A | A | A |
| Example 43 | Compound 43 | A | A | A |
| Example 44 | Compound 44 | A | A | A |
| Example 45 | Compound 45 | A | A | A |
| Example 46 | Compound 46 | A | B | A |
| Example 47 | Compound 47 | A | B | A |
| Example 48 | Compound 48 | A | A | A |
| Example 49 | Compound 49 | A | A | A |
| Example 50 | Compound 50 | A | A | A |
| Example 51 | Compound 51 | A | A | A |
| Example 52 | Compound 52 | A | A | A |
| Example 53 | Compound 53 | A | B | A |
| Example 54 | Compound 54 | A | B | B |
| Example 55 | Compound 55 | A | A | A |
| Example 56 | Compound 56 | A | A | A |
| Example 57 | Compound 57 | A | B | B |
| Example 58 | Compound 58 | A | B | A |
| Example 59 | Compound 59 | A | A | A |
| Example 60 | Compound 60 | A | A | A |
| Example 61 | Compound 61 | A | A | A |
| Example 62 | Compound 62 | A | A | A |
| Comparative Example 1 | Comparative compound 1 | D | A | A |
| Comparative Example 2 | Comparative compound 2 | A | E | E |
| Comparative Example 3 | Comparative compound 3 | C | E | E |

As shown in Tables 4 and 5, in Examples 1 to 60, since the coloring agent compound represented by Formula 1 was contained, an image recorded material which was excellent in invisibility and maintained the infrared absorbing ability for a longer time than in the related art was obtained.

On the other hand, in Comparative Example 1, since the coloring agent compound was a phthalocyanine coloring agent, it was found that the invisibility was deteriorated.

In Comparative Example 2, since the coloring agent compound did not have an organic cation, it was found that the light resistance and the moist heat resistance were deteriorated.

In Comparative Example 3, since the coloring agent compound had an organic cation having a bipyridine skeleton, it was found that the light resistance and the moist heat resistance were deteriorated.

Example 100

0.02 g of the compound 9 and 10 g of a polyethylene terephthalate resin (Tg: 60° C.) were put into a hopper of a twin-screw kneader, and kneaded for 5 minutes under the conditions of a temperature of 120° C. and a screw rotation speed of 200 revolutions per minute (rpm) to produce a resin kneaded material.

In the absorption spectrum of the obtained resin kneaded material, the maximal absorption wavelength was 900 nm or more and a value of absorbance at 450 nm/absorbance at maximal absorption wavelength was 1/10 or less, and it was found that the invisibility was excellent. In addition, in a case where the light resistance of the obtained resin kneaded material was evaluated as described above, the coloring agent residual rate was 90% or more in all three types of image recorded materials, and it was found that the light resistance was excellent.

The disclosure of Japanese Patent Application No. 2020-147010 filed on Sep. 1, 2020 is incorporated in the present specification by reference. In addition, all documents, patent applications, and technical standards described in the present specification are incorporated herein by reference to the same extent as in a case of being specifically and individually noted that individual documents, patent applications, and technical standards are incorporated by reference.

What is claimed is:

1. A coloring composition comprising:
a coloring agent compound represented by Formula 1; and
a medium, wherein

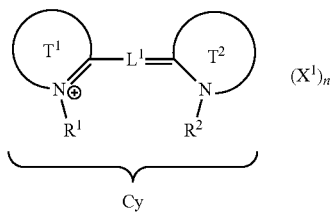

in Formula 1, $L^1$ represents a methine chain consisting of an odd number of methine groups, $R^1$ and $R^2$ each independently represent an unsubstituted aliphatic group or an unsubstituted aromatic group, $T^1$ and $T^2$ each independently represent a non-metal atomic group forming a 5-membered or 6-membered nitrogen-containing heterocyclic ring which may be fused, Cy is an anionic moiety, and $X^1$ represents an organic cation represented by Formula 2-1, Formula 2-2, or Formula 2-3, or an organic cation having a structure represented by Formula 2-4, and n represents a number required to neutralize charge, which is not 0,

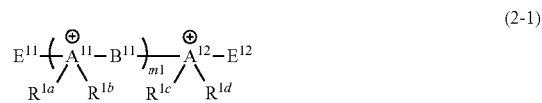

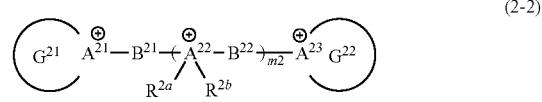

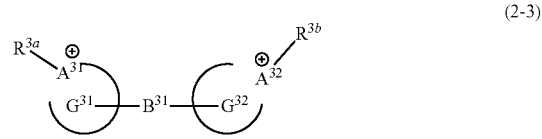

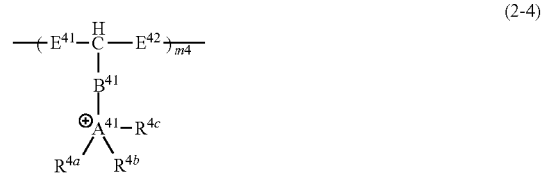

in Formula 2-1, $A^{11}$ and $A^{12}$ each independently represent a nitrogen atom or a phosphorus atom, $B^{11}$'s each independently represent an unsubstituted divalent linking group, $R^{1a}$, $R^{1b}$, $R^{1c}$, $R^{1d}$, $E^{11}$, and $E^{12}$ each independently represent an unsubstituted aliphatic group or an unsubstituted aromatic group, where $R^{1a}$, $R^{1b}$, $R^{1c}$, and $R^{1d}$ may be bonded to each other to form a ring, and m1 is an integer of 1 or more, in Formula 2-2, $A^{21}$, $A^{22}$, and $A^{23}$ each independently represent a nitrogen atom or a phosphorus atom, $B^{21}$ and $B^{22}$ each independently represent a divalent linking group, $R^{2a}$ and $R^{2b}$ each independently represent an aliphatic group or an aromatic group, m2 is an integer of 0 or more, $G^{21}$ represents a non-metal atomic group forming an aromatic ring including $A^{21}$ in the ring, and $G^{22}$ represents a non-metal atomic group forming an aromatic ring including $A^{23}$ in the ring, in Formula 2-3, $A^{31}$ and $A^{32}$ each independently represent a nitrogen atom or a phosphorus atom, $B^{31}$ represents a divalent linking group, $R^{3a}$ and $R^{3b}$ each independently represent an aliphatic group or an aromatic group, $G^{31}$ represents a non-metal atomic group forming an aromatic ring including $A^{31}$ in a ring, and $G^{32}$ represents a non-metal atomic group forming an aromatic ring including $A^{32}$ in the ring, and in Formula 2-4, $A^{41}$'s each independently represent a nitrogen atom or a phosphorus atom, $B^{41}$'s each independently represent a single bond or a divalent linking group, $R^{4a}$, $R^{4b}$, and $R^{4c}$ each independently represent an aliphatic group or an aromatic group, $E^{41}$ and $E^{42}$ each independently represent a single bond or an aliphatic group, where one of $R^{4a}$, $R^{4b}$, and $R^{4c}$ may be bonded to $E^{41}$ or $E^{42}$ to form a ring, and m4 is an integer of 2 or more.

2. The coloring composition according to claim 1, wherein in Formula 2-1, Formula 2-2, and Formula 2-3, $B^{11}$, $B^{21}$, $B^{22}$, and $B^{31}$ are each independently the divalent linking group having 2 to 8 carbon atoms.

3. The coloring composition according to claim 1, wherein in Formula 2-1, Formula 2-2, Formula 2-3, and Formula 2-4, $A^{11}$, $A^{12}$, $A^{21}$, $A^{22}$, $A^{23}$, $A^{31}$, $A^{32}$, and $A^{41}$ are nitrogen atoms.

4. The coloring composition according to claim 1, wherein $X^1$ in Formula 1 represents the organic cation represented by Formula 2-1 or the organic cation having the structure represented by Formula 2-4.

5. The coloring composition according to claim 1, wherein Cy in Formula 1 is represented by Formula 4,

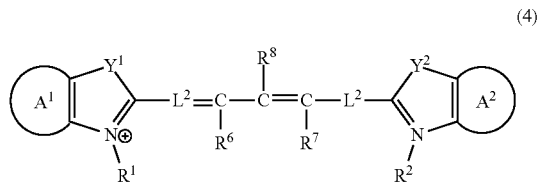

(4)

wherein in Formula 4, $Y^1$ and $Y^2$ each independently represent $CR^3R^4$—, —O—, —S—, —Se—, or —$NR^5$—, where $R^3$, $R^4$, and $R^5$ each independently represent a hydrogen atom, an aliphatic group, or an aromatic ring group and $R^3$ and $R^4$ may be bonded to each other to form a ring, $A^1$ and $A^2$ each independently represent a non-metal atomic group forming an aromatic ring or an aromatic heterocyclic ring, $L^2$'s each independently represent a methine chain consisting of one, two, or three methine groups, where $L^2$ does not have a substituent, $R^6$ and $R^7$ each independently represent a hydrogen atom or an aliphatic group, where $R^6$ and $R^7$ may be linked to each other to form a ring, and $R^8$ is represented by Formula A,

 Formula A and wherein in Formula A, $S^A$ represents a single bond, an alkylene group, an alkenylene group, an alkynylene group, —O—, —S—, —$NR^{L1}$—, —C(=O)—, —C(=O)O—, —C(=O)$NR^{L1}$, —S(=O)$_2$—, —$OR^{L2}$—, or a group including a combination of at least two of these groups, where $R^{L1}$'s each independently represent a hydrogen atom, a halogen atom, an alkyl group, an aryl group, or a monovalent heterocyclic group and $R^{L2}$ represents an alkylene group, an arylene group, or a divalent heterocyclic group, and $T^A$ represents a hydrogen atom, a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group.

6. The coloring composition according to claim 5, wherein $A^1$ and $A^2$ in Formula 4 each independently represent a non-metal atomic group forming a benzene ring or a naphthalene ring.

7. The coloring composition according to claim 1, wherein the medium is a liquid.

8. The coloring composition according to claim 1, wherein the medium is a liquid comprising water.

9. The coloring composition according to claim 1 wherein the medium comprises water and an organic solvent having a boiling point of 100° C. or higher.

10. The coloring composition according to claim 1, wherein the coloring composition is an ink.

11. The coloring composition according to claim 10, wherein the coloring composition is for ink jet recording.

12. An ink jet recording method comprising: applying the coloring composition according to claim 11 onto a substrate.

13. An image recorded material comprising: a substrate; and
an infrared absorbing image which is a solidified product of the coloring composition according to claim 10 and is disposed on the substrate.

14. An image recorded material comprising: a substrate; and
an infrared absorbing image disposed on the substrate, wherein the infrared absorbing image comprises a coloring agent compound represented by Formula 1, a maximal absorption wavelength of the infrared absorbing image is in a range of 700 nm to 1,300 nm,

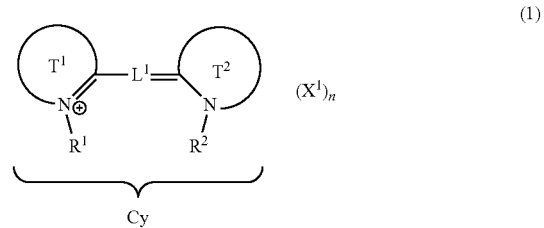

(1)

in Formula 1, $L^1$ represents a methine chain consisting of an odd number of methine groups, $R^1$ and $R^2$ each independently represent an unsubstituted aliphatic group or an unsubstituted aromatic group, $T^1$ and $T^2$ each independently represent a non-metal atomic group forming a 5-membered or 6-membered nitrogen-containing heterocyclic ring which may be fused, Cy is an anionic moiety, and $X^1$ represents an organic cation represented by Formula 2-1, Formula 2-2, or Formula 2-3, or an organic cation having a structure represented by Formula 2-4, and n represents a number required to neutralize charge, which is not 0,

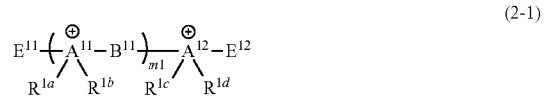

(2-1)

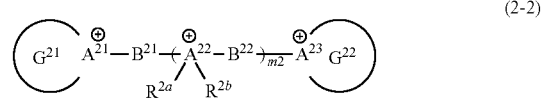

(2-2)

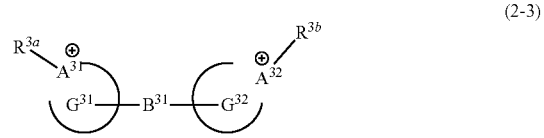

(2-3)

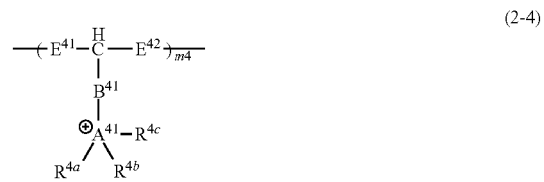

(2-4)

in Formula 2-1, $A^{11}$ and $A^{12}$ each independently represent a nitrogen atom or a phosphorus atom, $B^{11}$'s each independently represent an unsubstituted divalent linking group, $R^{1a}$, $R^{1b}$, $R^{1c}$, $R^{1d}$, $E^{11}$, and $E^{12}$ each independently represent an unsubstituted aliphatic group or an unsubstituted aromatic group, where $R^{1a}$, $R^{1b}$, $R^{1c}$, and $R^{1d}$ may be bonded to each other to form a ring, and m1 is an integer of 1 or more, in Formula 2-2, $A^{21}$, $A^{22}$, and $A^{23}$ each independently represent a nitrogen atom or a phosphorus atom, $B^{21}$ and $B^{22}$ each independently represent a divalent linking group, $R^{2a}$ and $R^{2b}$ each independently represent an aliphatic group or an aromatic group, m2 is an integer of 0 or more, $G^{21}$ represents a non-metal atomic group forming an aromatic ring including $A^{21}$ in the ring, and $G^{22}$ represents a non-metal atomic group forming an aromatic ring including $A^{23}$ in the ring, in Formula 2-3, $A^{31}$ and $A^{32}$ each independently represent a nitrogen atom or a phosphorus atom, $B^{31}$ represents a divalent linking group, $R^{3a}$ and $R^{3b}$ each independently represent an aliphatic group or an aromatic group, $G^{31}$ represents a non-metal atomic group forming an aromatic ring including $A^{31}$ in a ring, and $G^{32}$ represents a non-metal atomic group forming an aromatic ring including $A^{32}$ in the ring, and in Formula 2-4, $A^{41}$'s each independently represent a nitrogen atom or a phosphorus atom, $B^{41}$'s each independently represent a single bond or a divalent linking group, $R^{4a}$, $R^{4b}$, and $R^{4c}$ each independently represent an aliphatic group or an aromatic group, $E^{41}$ and $E^{42}$ each independently represent a single bond or an aliphatic group, where one of $R^{4a}$, $R^{4b}$, and $R^{4c}$ may be bonded to $E^{41}$ or $E^{42}$ to form a ring, and m4 is an integer of 2 or more.

15. A coloring agent compound represented by Formula 1,

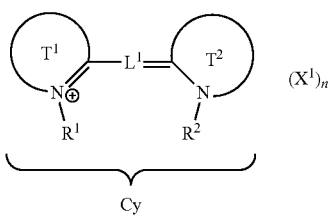

(1)

wherein in Formula 1, $L^1$ represents a methine chain consisting of an odd number of methine groups, $R^1$ and $R^2$ each independently represent an unsubstituted aliphatic group or an unsubstituted aromatic group, $T^1$ and $T^2$ each independently represent a non-metal atomic group forming a 5-membered or 6-membered nitrogen-containing heterocyclic ring which may be fused, Cy is an anionic moiety, and $X^1$ represents an organic cation represented by Formula 2-1, Formula 2-2, or Formula 2-3, or an organic cation having a structure represented by Formula 2-4, and n represents a number required to neutralize charge, which is not 0,

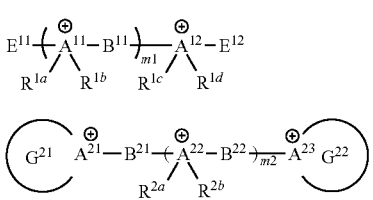

(2-1)

(2-2)

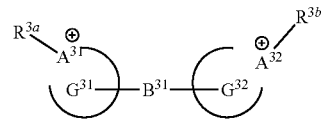

(2-3)

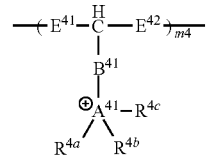

(2-4)

in Formula 2-1, $A^{11}$ and $A^{12}$ each independently represent a nitrogen atom or a phosphorus atom, $B^1$'s each independently represent an unsubstituted divalent linking group, $R^{1c}$, $R^{1b}$, $R^{1c}$, $R^{1d}$, $E^{11}$, and $E^{12}$ each independently represent an unsubstituted aliphatic group or an unsubstituted aromatic group, where $R^{1a}$, $R^{1b}$, $R^{1c}$, and $R^{1d}$ may be bonded to each other to form a ring, and m1 is an integer of 1 or more, in Formula 2-2, $A^{21}$, $A^{22}$, and $A^{23}$ each independently represent a nitrogen atom or a phosphorus atom, $B^{21}$ and $B^{22}$ each independently represent a divalent linking group, $R^{2a}$ and $R^{2b}$ each independently represent an aliphatic group or an aromatic group, m2 is an integer of 0 or more, $G^{21}$ represents a non-metal atomic group forming an aromatic ring including $A^{21}$ in the ring, and $G^{22}$ represents a non-metal atomic group forming an aromatic ring including $A^{23}$ in the ring, in Formula 2-3, $A^{31}$ and $A^{32}$ each independently represent a nitrogen atom or a phosphorus atom, $B^{31}$ represents a divalent linking group, $R^{3a}$ and $R^{3b}$ each independently represent an aliphatic group or an aromatic group, $G^{31}$ represents a non-metal atomic group forming an aromatic ring including $A^{31}$ in a ring, and $G^{32}$ represents a non-metal atomic group forming an aromatic ring including $A^{32}$ in the ring, and in Formula 2-4, $A^{41}$'s each independently represent a nitrogen atom or a phosphorus atom, $B^{41}$'s each independently represent a single bond or a divalent linking group, $R^{4a}$, $R^{4b}$, and $R^{4c}$ each independently represent an aliphatic group or an aromatic group, $E^{41}$ and $E^{42}$ each independently represent a single bond or an aliphatic group, where one of $R^{4a}$, $R^{4b}$, and $R^{4c}$ may be bonded to $E^{41}$ or $E^{42}$ to form a ring, and m4 is an integer of 2 or more.

16. The coloring agent compound according to claim 15, wherein in Formula 2-1, Formula 2-2, and Formula 2-3, $B^{11}$, $B^{21}$, $B^{22}$, and $B^{31}$ are each independently the divalent linking group having 2 to 8 carbon atoms.

17. The coloring agent compound according to claim 15, wherein in Formula 2-1, Formula 2-2, Formula 2-3, and Formula 2-4, $A^{11}$, $A^{12}$, $A^{21}$, $A^{22}$, $A^{23}$, $A^{31}$, $A^{32}$, and $A^{41}$ are nitrogen atoms.

18. The coloring agent compound according to claim 15, wherein $X^1$ in Formula 1 represents the organic cation represented by Formula 2-1 or the organic cation having the structure represented by Formula 2-4.

19. The coloring agent compound according to claim 15, wherein Cy in Formula 1 is represented by Formula 4,

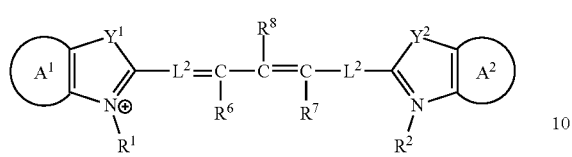

(4)

wherein in Formula 4, $Y^1$ and $Y^2$ each independently represent $CR^3R^4$—, —O—, —S—, —Se—, or —$NR^5$—, where $R^3$, $R^4$, and $R^5$ each independently represent a hydrogen atom, an aliphatic group, or an aromatic ring group and $R^3$ and $R^4$ may be bonded to each other to form a ring, $A^1$ and $A^2$ each independently represent a non-metal atomic group forming an aromatic ring or an aromatic heterocyclic ring, $L^2$'s each independently represent a methine chain consisting of one, two, or three methine groups, where $L^2$ does not have a substituent, $R^6$ and $R^7$ each independently represent a hydrogen atom or an aliphatic group, where $R^6$ and $R^7$ may be linked to each other to form a ring, and $R^8$ is represented by Formula A, —$S^A$-$T^A$    Formula A and wherein in Formula A, $S^A$ represents a single bond, an alkylene group, an alkenylene group, an alkynylene group, —O—, —S—, —$NR^{L1}$—, —C(=O)—, —C(=O)O—, —C(=O)$NR^{L1}$—, —S(=O)$_2$—, —$OR^{L2}$—, or a group including a combination of at least two of these groups, where $R^{L1}$'s each independently represent a hydrogen atom, a halogen atom, an alkyl group, an aryl group, or a monovalent heterocyclic group and $R^{L2}$ represents an alkylene group, an arylene group, or a divalent heterocyclic group, and $T^A$ represents a hydrogen atom, a halogen atom, an alkyl group, an aryl group, a monovalent heterocyclic group, a cyano group, a hydroxy group, a formyl group, a carboxy group, an amino group, a thiol group, a sulfo group, a phosphoryl group, a boryl group, a vinyl group, an ethynyl group, a trialkylsilyl group, or a trialkoxysilyl group.

20. The coloring agent compound according to claim 19, wherein $A^1$ and $A^2$ in Formula 4 each independently represent a non-metal atomic group forming a benzene ring or a naphthalene ring.

* * * * *